(12) United States Patent
Ellenby et al.

(10) Patent No.: US 7,031,875 B2
(45) Date of Patent: Apr. 18, 2006

(54) POINTING SYSTEMS FOR ADDRESSING OBJECTS

(75) Inventors: Thomas William Ellenby, San Francisco, CA (US); John Ellenby, San Francisco, CA (US); Peter Malcolm Ellenby, San Francisco, CA (US); Jeffrey Alan Jay, Petaluma, CA (US); Joseph Page, La Jolla, CA (US)

(73) Assignee: Geo Vector Corporation, San Francisco, CA (US)

( * ) Notice: Subject to any disclaimer, the term of this patent is extended or adjusted under 35 U.S.C. 154(b) by 418 days.

(21) Appl. No.: 09/769,012

(22) Filed: Jan. 24, 2001

(65) Prior Publication Data

US 2002/0140745 A1    Oct. 3, 2002

(51) Int. Cl.
G01C 17/00    (2006.01)

(52) U.S. Cl. ..................................................... 702/150

(58) Field of Classification Search ................. 702/33, 702/150, 185; 33/357, 520, 355 R; 73/865.9; 707/10; 345/156; 342/357.09, 418, 457, 342/848; 473/407; 700/9; 701/202, 207, 701/211; 711/100, 206; 715/776; 709/224
See application file for complete search history.

(56) References Cited

U.S. PATENT DOCUMENTS

| | | | |
|---|---|---|---|
| 2,994,971 A | 8/1961 | Meisenheimer et al. |
| 3,729,315 A | 4/1973 | Conklin et al. |
| 3,769,894 A | 11/1973 | Conklin |
| 3,923,370 A | 12/1975 | Mostrom |
| RE28,847 E | 6/1976 | Vizenor |
| 3,990,296 A | 11/1976 | Erikson |
| 4,322,726 A | 3/1982 | Collier et al. |
| 4,380,024 A | 4/1983 | Olofsson |
| 4,425,581 A | 1/1984 | Schweppe et al. |
| 4,439,755 A | 3/1984 | La Russa |
| 4,489,389 A | 12/1984 | Beckwith et al. |
| 4,572,203 A | 2/1986 | Feinstein |
| 4,600,200 A | 7/1986 | Oka et al. |
| 4,645,459 A | 2/1987 | Graf et al. |
| 4,662,635 A | 5/1987 | Enokian |
| 4,684,990 A | 8/1987 | Oxley |
| 4,710,873 A | 12/1987 | Breslow et al. |
| 4,736,306 A | 4/1988 | Christensen et al. |
| 4,805,121 A | 2/1989 | Scott et al. |
| 4,807,158 A | 2/1989 | Blanton et al. |
| 4,835,532 A | 5/1989 | Fant |
| 4,855,822 A | 8/1989 | Narenda et al. |
| 4,894,922 A | 1/1990 | Lovelock |
| 4,939,661 A | 7/1990 | Barker et al. |
| 4,940,972 A | 7/1990 | Mouchot et al. |
| 4,947,323 A | 8/1990 | Smith |

(Continued)

*Primary Examiner*—Michael Nghiem
*Assistant Examiner*—Xiuqin Sun
(74) *Attorney, Agent, or Firm*—Page Lomr Associates

(57) ABSTRACT

Systems are arranged to provide a user information which relates to objects of interest. A user may point a hand held device toward an object to address it. The device determines which objects are being addressed by making position and attitude measurements and further a reference and search of a database containing preprogrammed information relating to objects. Information relating to objects determined as objects presently being addressed is thereafter presented at a user interface. Devices of these systems include a point reference, a direction reference, a position determining support, attitude determining support, a computer processor and database, and a user interface. Methods of systems include the steps of addressing an object, determining position and attitude, searching a database, and presenting information to a user.

13 Claims, 60 Drawing Sheets

U.S. PATENT DOCUMENTS

| | | |
|---|---|---|
| 4,970,666 A | 11/1990 | Welsh et al. |
| 4,992,866 A | 2/1991 | Morgan |
| 5,020,902 A | 6/1991 | Kits van Jevningen et al. |
| 5,034,812 A | 7/1991 | Rawlings |
| 5,072,218 A | 12/1991 | Spero et al. |
| 5,115,398 A | 5/1992 | DeJong |
| 5,124,915 A | 6/1992 | Krenzel |
| 5,182,641 A | 1/1993 | Diner et al. |
| 5,189,630 A | 2/1993 | Barstow et al. |
| 5,252,950 A | 10/1993 | Saunders et al. |
| 5,269,065 A | 12/1993 | Ida |
| 5,296,854 A | 3/1994 | Hamilton et al. |
| 5,311,203 A | 5/1994 | Norton |
| 5,320,351 A | 6/1994 | Suzuki |
| 5,322,441 A | 6/1994 | Lewis et al. |
| 5,333,874 A | 8/1994 | Arnold et al. |
| 5,342,051 A | 8/1994 | Rankin et al. |
| 5,353,134 A | 10/1994 | Michel et al. |
| 5,354,063 A | 10/1994 | Chuchod |
| 5,367,578 A | 11/1994 | Golem et al. |
| 5,394,517 A | 2/1995 | Kalawsky |
| 5,410,649 A | 4/1995 | Gove |
| 5,454,043 A | 9/1995 | Freeman |
| 5,455,689 A | 10/1995 | Taylor et al. |
| 5,457,447 A | 10/1995 | Ghaem et al. |
| 5,462,275 A | 10/1995 | Lowe et al. |
| 5,467,444 A | 11/1995 | Kawamura et al. |
| 5,479,597 A | 12/1995 | Fellous |
| 5,528,232 A | 6/1996 | Verma et al. |
| 5,528,518 A | 6/1996 | Bradshaw et al. |
| 5,553,864 A | 9/1996 | Sitrick |
| 5,564,194 A * | 10/1996 | Fujita et al. ............... 33/355 R |
| 5,625,765 A | 4/1997 | Ellenby et al. |
| 5,682,332 A | 10/1997 | Ellenby et al. |
| 5,696,837 A | 12/1997 | Green |
| 5,703,961 A | 12/1997 | Rooina et al. |
| 5,742,521 A | 4/1998 | Ellenby et al. |
| 5,796,386 A | 8/1998 | Lipscomb et al. |
| 5,801,704 A | 9/1998 | Oohara et al. |
| 5,825,480 A | 10/1998 | Udagawa |
| 5,870,741 A | 2/1999 | Kawabe et al. |
| 5,902,347 A | 5/1999 | Backman et al. |
| 5,929,848 A | 7/1999 | Albukerk et al. |
| 6,009,629 A * | 1/2000 | Gnepf et al. .................... 33/357 |
| 6,173,239 B1* | 1/2001 | Ellenby ...................... 702/150 |
| 6,381,603 B1* | 4/2002 | Chan et al. ................... 707/10 |
| 6,396,475 B1* | 5/2002 | Ellenby et al. ............. 345/156 |
| 2002/0171581 A1* | 11/2002 | Sheynblat et al. ...... 342/357.09 |

* cited by examiner

POINTING SYSTEMS FOR ADDRESSING OBJECTS

BACKGROUND OF THESE INVENTIONS

1. Field

The field of these inventions is best characterized as pointing systems for addressing objects and is more specifically characterized as computer pointing systems for addressing objects and for manipulating information relating to such objects.

2. Prior Art

Definition of Pointing Systems

For purposes of this disclosure, 'pointing systems' include apparatus and methods arranged to address objects. A thing is the subject of a pointing system address action when the pointing system is manipulated in a manner which causes it to suggest an alignment or association (generally a spatial relationship) with the thing via pointing and position references of the system. An object can be said to be 'addressed' when a pointing system is pointing thereto.

Examples of Common Pointing Systems

Finger Pointing

Perhaps the simplest of pointing systems is the forefinger of the human hand. A common gesture in communication involves the pointing of ones finger toward an object of interest to indicate the object. For example:

"'The bridge on the left' a man says while pointing to the Handford State Bridge distinguishing it from the Overton Bridge which is frequently mistaken as the Handford."

Thus, in communications, a person sometimes arrives at a need to indicate and distinguish one object from another and further to pass that indication in the conveyance of a message.

Computer Mouse

By the time of this writing, most computer users are familiar with an action described as 'point-and-click'. Even casual use of a computer requires one to operate a pointing peripheral device, another example of a pointing system, typically a mouse, to cause a cursor to point at a region of a computer display, for example the region occupied by a certain icon image, and to trigger a mouse button whereby a 'click' event is raised and detected in a computer programming code. A computer is programmed to take appropriate responses to such point-and-click actions in accordance with a program running on a computer. Responses may depend upon the region pointed to, or 'addressed', and sometimes the precise type of 'click' action, for example a 'double-click'; or a 'right click'.

Therefore, we say that a computer has a 'pointing device' which is commonly a mouse type periphery; but may be a track-ball, PowerPoint®, touch screen, et cetera. With a computer pointing device, a user is provided the opportunity to interface with the display of a computer by making 'point-and-click' actions, among others.

In some systems, a cursor position within the display region is driven by tactile inputs from a user's hand. Such is the case with a mouse type periphery where spatial position is driven in two dimensions by the movements of a handheld orb.

Touch Screen

A 'Touch Screen' type pointing system is interesting because it is not a cursor icon device which is doing the pointing but rather the tip of a physical object, a user's finger. Contact made with the screen as a finger taps the screen's surface causes an event which may be detected and measured by tranduction apparatus, typically a resistive matrix membrane.

Lecturer's Pointing Stick/Laser Pointer

One will certainly recall a schoolhouse lecture where an elongated stick is used by a lecturer to point to various portions of a chalkboard. Modem lecturers may prefer a high-tech pointing 'stick' comprising a beam of laser light. These pointing systems are interesting in the sense that the pointing stick or laser pointer has a direction reference associated therewith. Thus, two lecturers standing in different positions before a blackboard may both point to and therefore address the identical object. This notion of pointing from various perspectives will be carried forward in the following disclosure. It is important to note that some pointing systems have associated therewith a direction reference while others such as the computer mouse do not.

Limitations of Current Pointing Systems

Because we do not live in the two dimensional world of a computer display sometimes referred to as 'cyberspace', but rather, we live in a three (spatial) dimensional world where objects of interest may be located in well defined spaces distributed about the Earth, the present invention concerns a pointer for addressing real objects anywhere rather than objects represented in two space on a computer's display screen such as an icon.

While the systems and inventions of the art are designed to achieve particular goals and objectives, some of those being no less than remarkable, these inventions have limitations which prevent their use in new ways now possible. These inventions of the art are not used and cannot be used to realize the advantages and objectives of the present invention.

One would be wise to review in detail the inventor's previous patents which relate in part to these inventions taught here as a more full understanding can be realized in view of that information. These patents include U.S. Pat. Nos. 6,173,239; 6,098,118; 6,064,398; 6,037,936; 6,031,545; 5,991,827; 5,815,411; 5,742,521; 5,682,332; and 5,625,765.

It should be understood that all of the herein referenced materials provide considerable definition of elements of the present invention. Therefore, those materials are incorporated herein by reference whereby the instant specification can rely upon them for enablement of the particular teachings of each.

SUMMARY OF THESE INVENTIONS

Comes now, Thomas Ellenby, Peter Ellenby, John Ellenby, Jeffrey Alan Jay, and Joseph Page with inventions of pointing systems including devices and methods of addressing objects. It is a primary function of these systems to provide users means of indicating to a computer an object of interest and to further process information relating to addressed objects.

Inventions presented in this disclosure are best characterized as pointing systems which operate in three orthonormal spatial dimensions. These pointing systems may be used to address objects and trigger computer responses relating to or depending upon the objects being addressed. Devices of these inventions may be envisaged as a mouse for the 'real-world'.

A device which is freely movable, a mobile unit, may be manipulated in a fashion to cause it to point towards or address an object of interest. A determination of position and orientation, among other parameters of the mobile unit uniquely defines an instantaneous address state of the device. In view of this instantaneous address state, described by an address indicator, a search of a database is performed to determine which objects are being addressed. Data relating to an object is stored in a database along with a geometric construct which describes a spatial body associated with the object, herein called a 'geometric descriptor'. When a geometric intersection occurs between an address indicator of a mobile unit and the geometric descriptor of an object, the object is said to be addressed by the mobile unit.

Any of an array of events which occur simultaneously while an object is being addressed can be used to cause a computer to take an action where the action relates to the particular objects being addressed. In this way, an extremely useful pointing system is created and may be used in a great plurality of ways.

By way of example, one superior version may be summarized as follows. A mobile telephone equipped with a Global Positioning System and an electronic compass is arranged to pass position and attitude measurement information to a computer. A computer, prepared with pre-programmed operating instruction and data relating to objects including geometric descriptors which define spatial bodies associated with various objects, is set to be responsive to particular address states as determined by the mobile telephone.

The pointing state of the telephone described by an address indicator may become known to the computer periodically upon certain stimuli, for example, expiration of a pre-set time period kept by a timer. In response to receipt of address indicator information, the computer performs a database search to determine which objects have geometric descriptors intersected by the address indicator. A result set is prepared in accordance with a program running on the computer in view of certain filters which may be applied to the recalled object data. The result set may be used as a computer takes an action, which relates to the results and thus the address state of the mobile unit, in agreement with particular programming running thereon.

In the case where a mobile telephone described above is precisely located at −117.201479 longitude, 32.725065 latitude, and is pointing level on the horizon in a direction described as 80 degrees on the compass, the object known as the Sheraton Grand Hotel of Harbor Island in San Diego, Calif. is being addressed. This is so because the address indicator described intersects a geometric description of the space occupied by the hotel building and such was determined in a test for intersection between the address indicator and a group of stored data elements relating to certain objects including the Sheraton Grand. In agreement with a computer program running on the mobile unit (telephone) computing facility, a user presses a special function key to cause the computer to report the telephone number of the Sheraton Grand to the user via a display screen and further to place a call to the hotel. Additional information relating to the hotel may also be available and passed to the mobile telephone user. Information such as vacancy, pricing, preferred room availability, et cetera. One will immediately recognize the utility of such systems because information which sensitive to frequent change is quickly available to users who may be on the move.

A computer action may also include those which do not occur at the telephone but rather at the hotel. For example, a user may cause a dinner reservation to be transmitted to the hotel in response to pointing to the hotel and pressing a certain reservation function key.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

Figure 5:
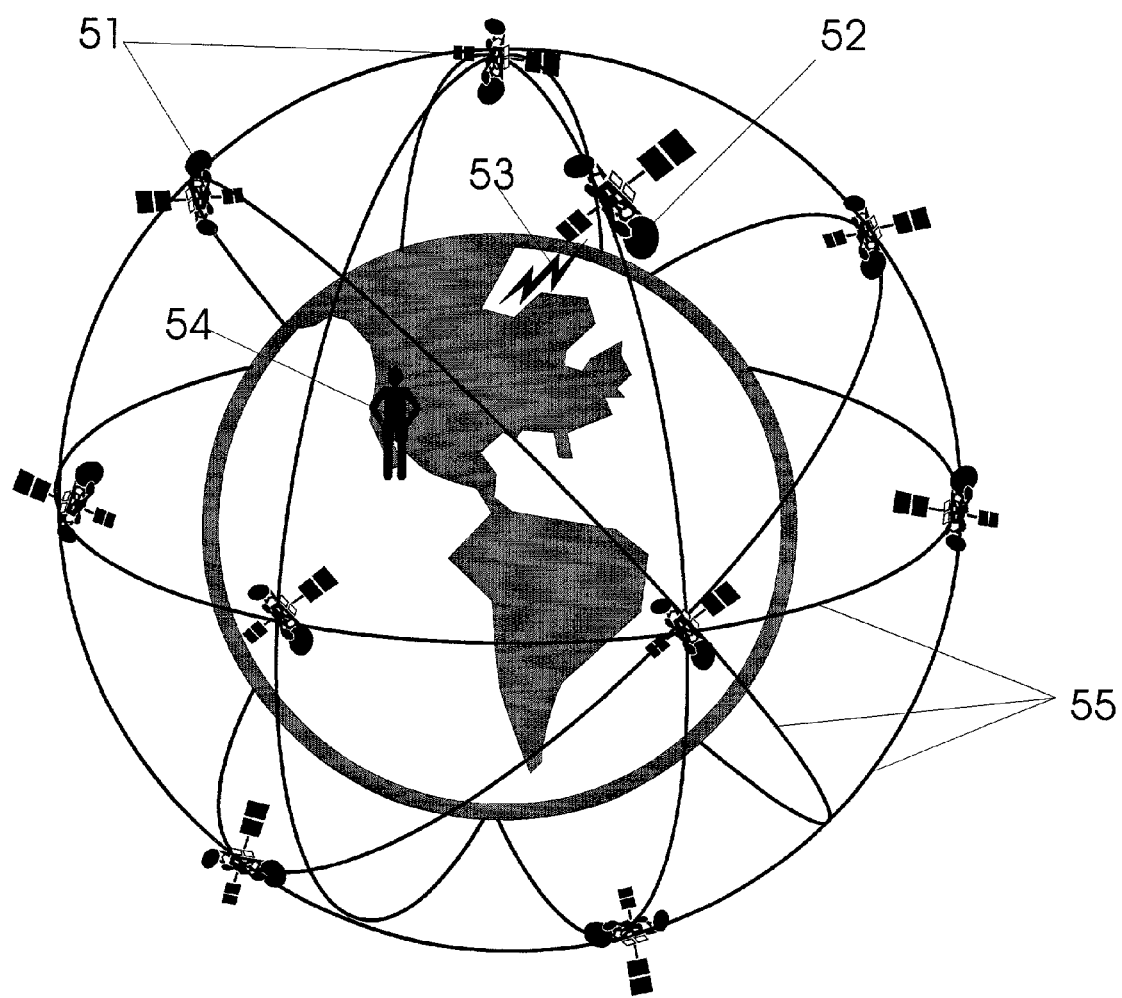
Figure 6:
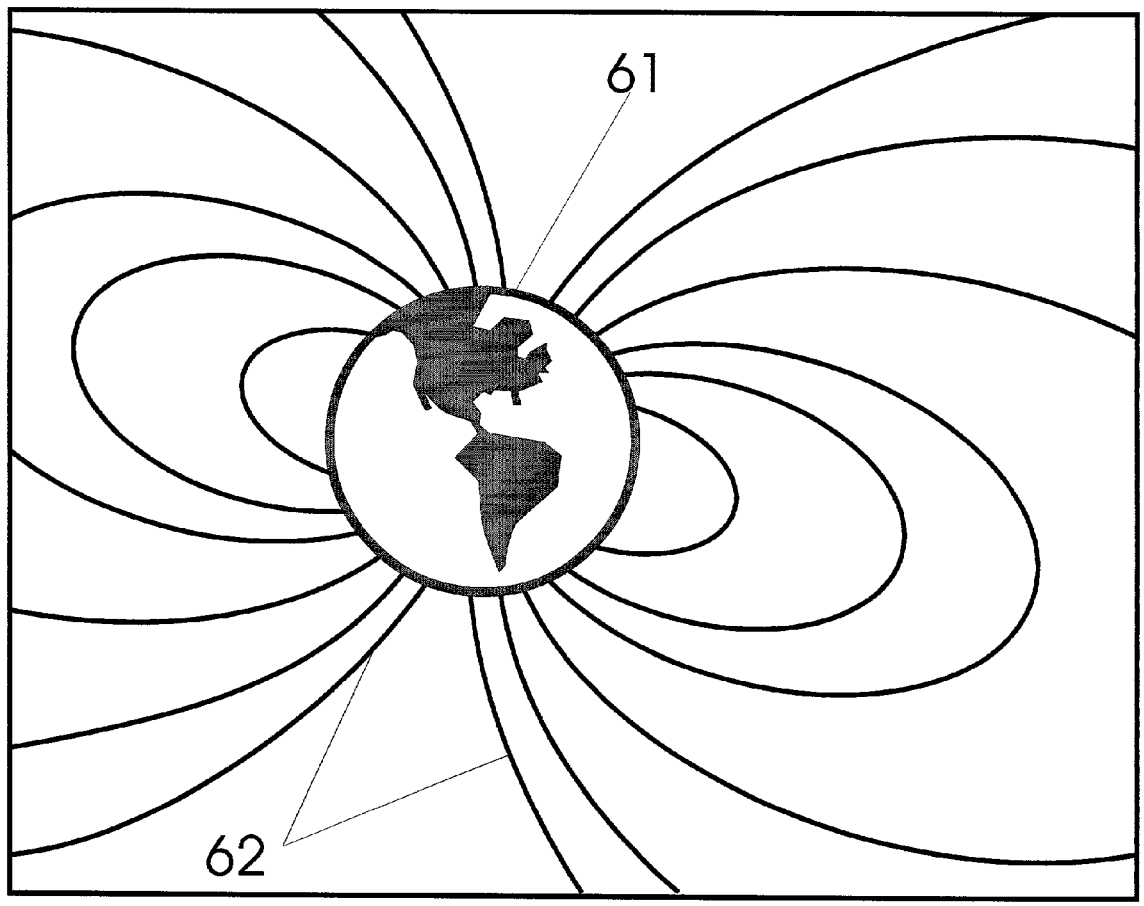
Figure 7:
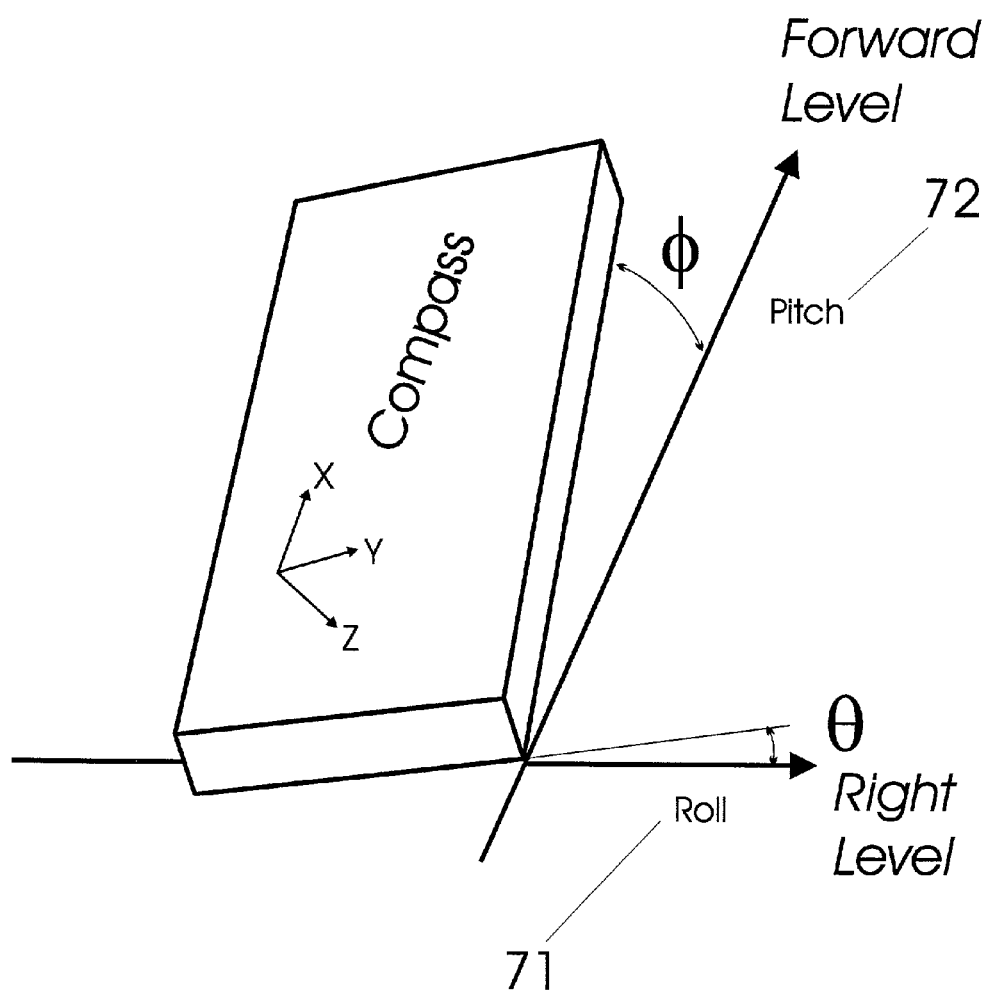
Figure 8:
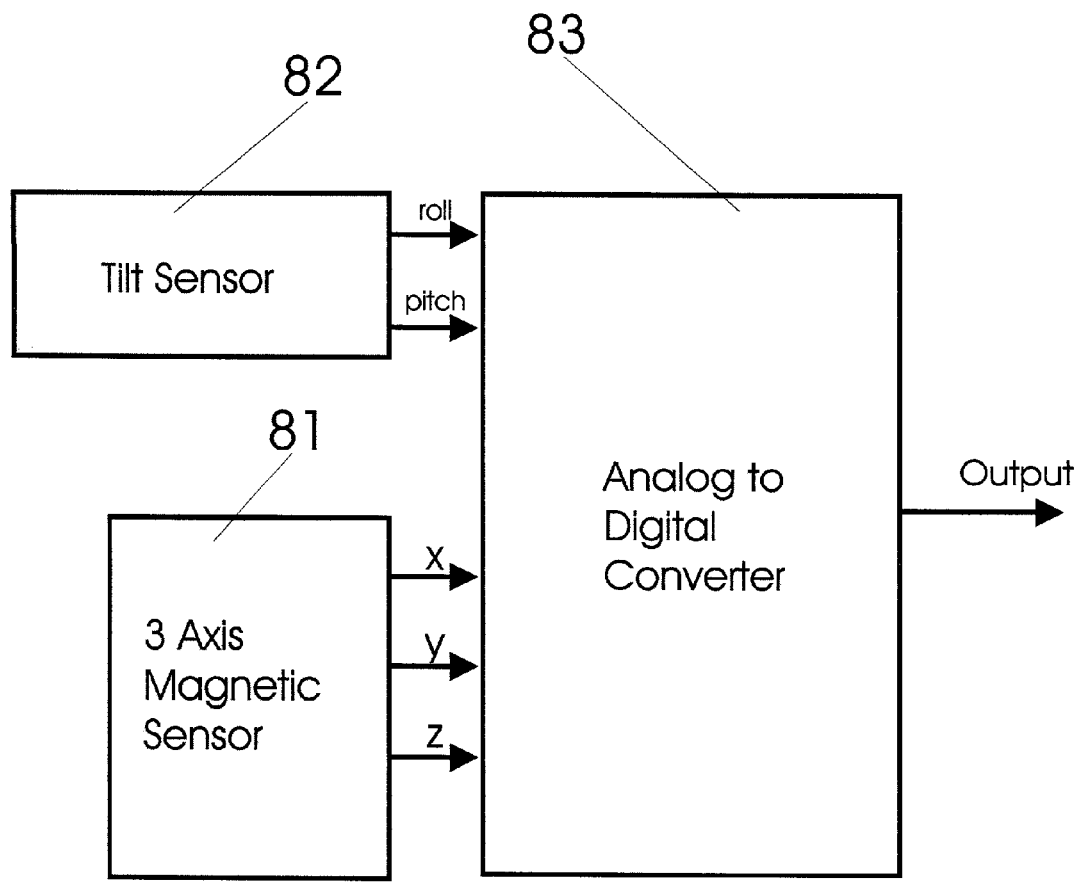
Figure 9:
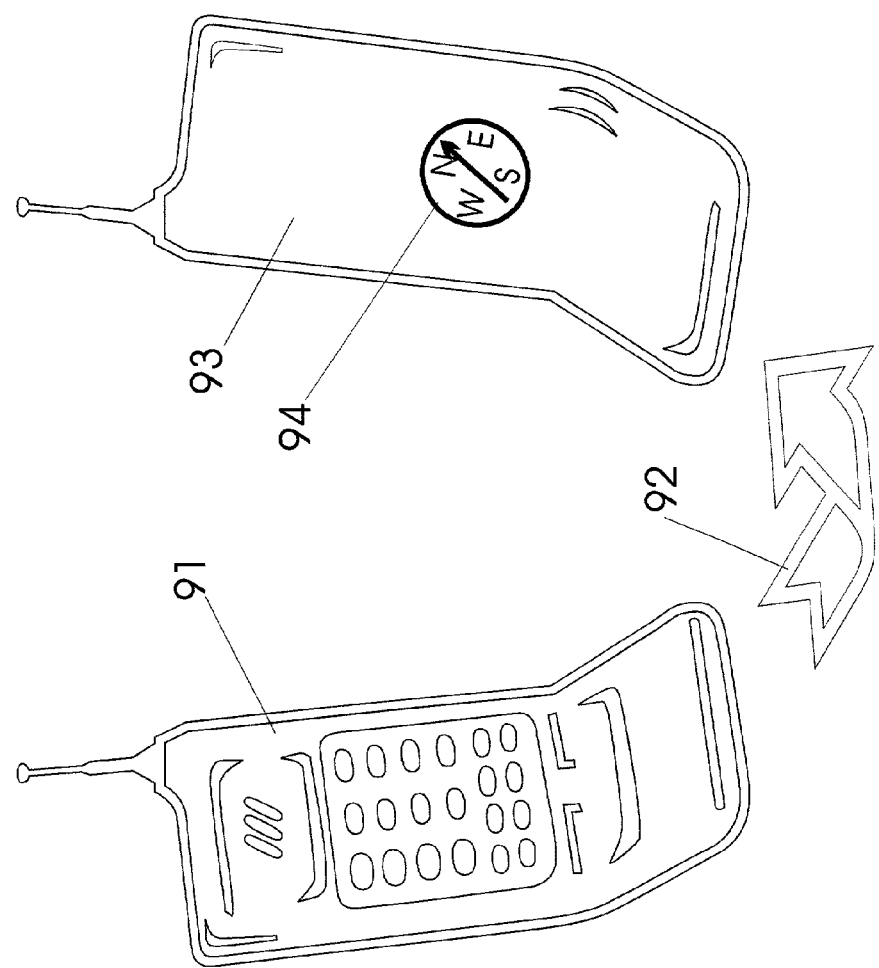
Figure 10:
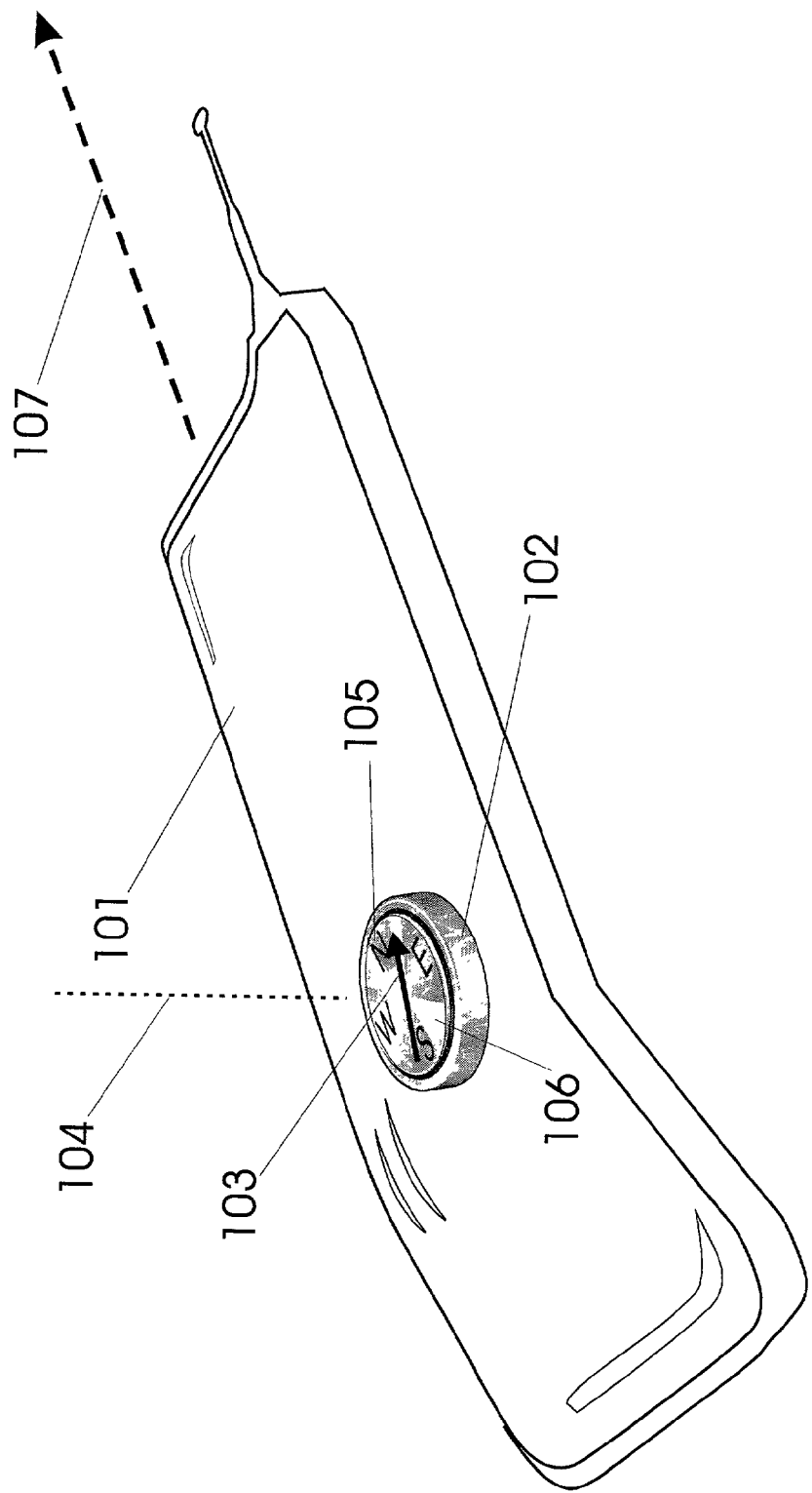
Figure 11:
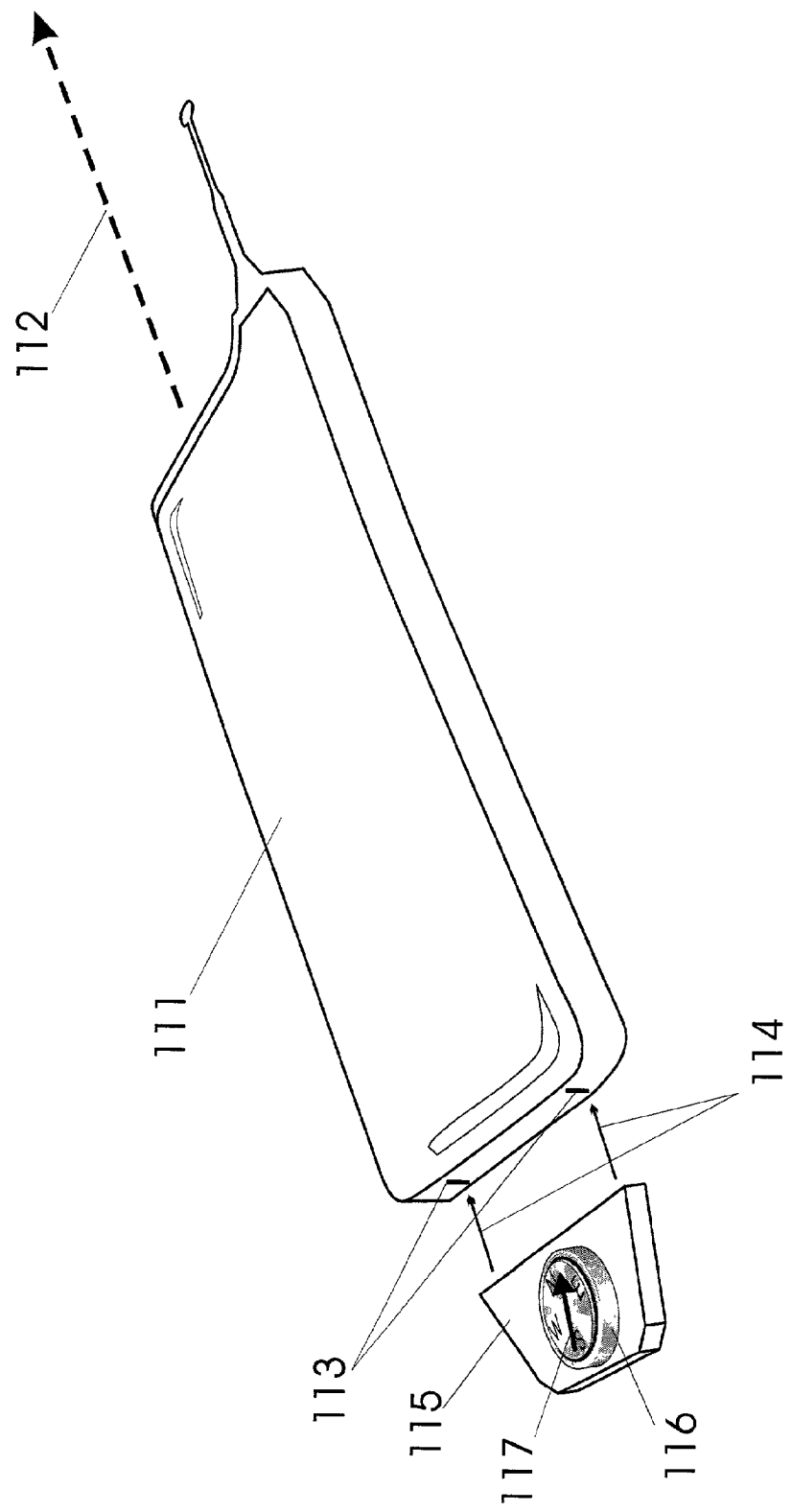
Figure 12:
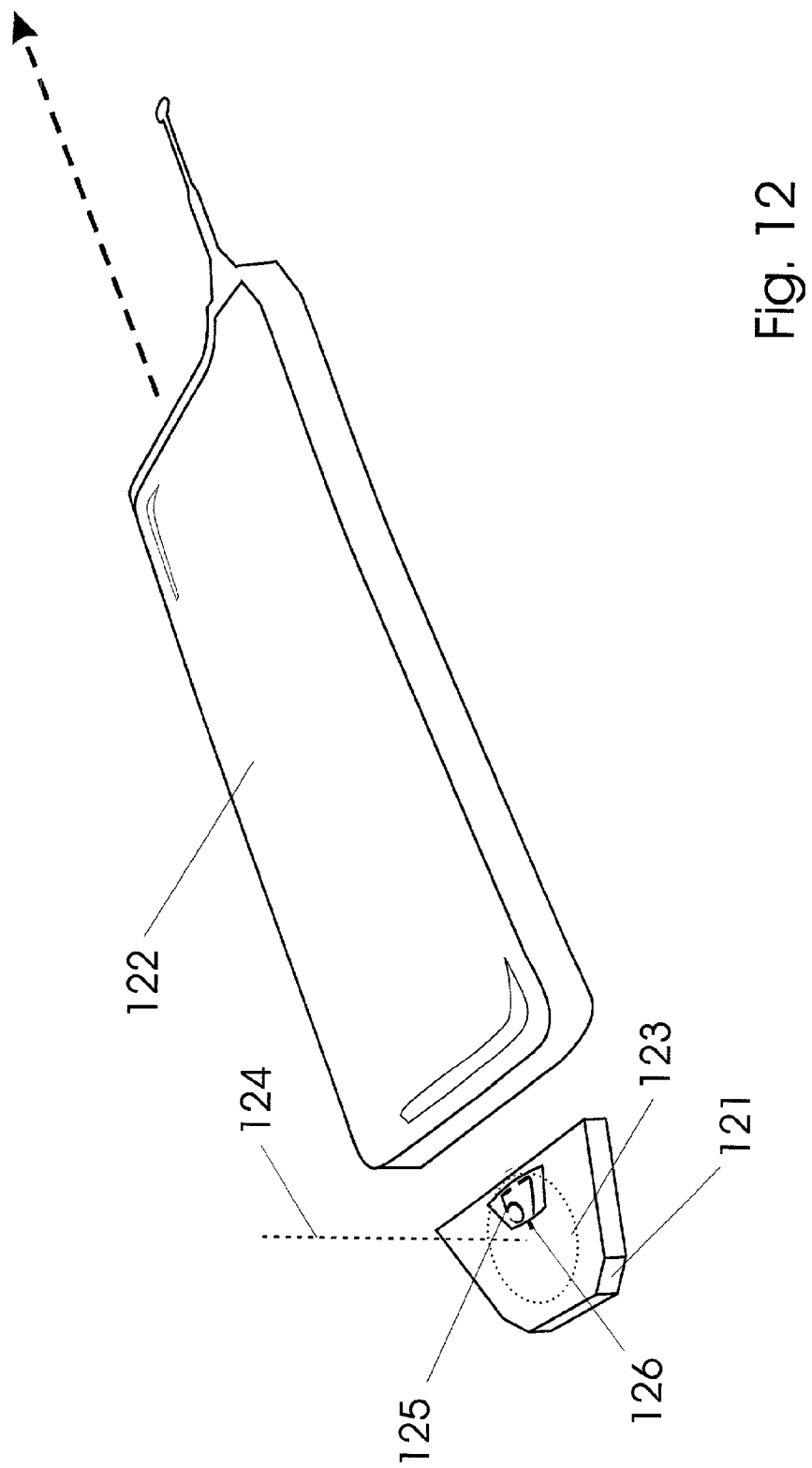
Figure 13:
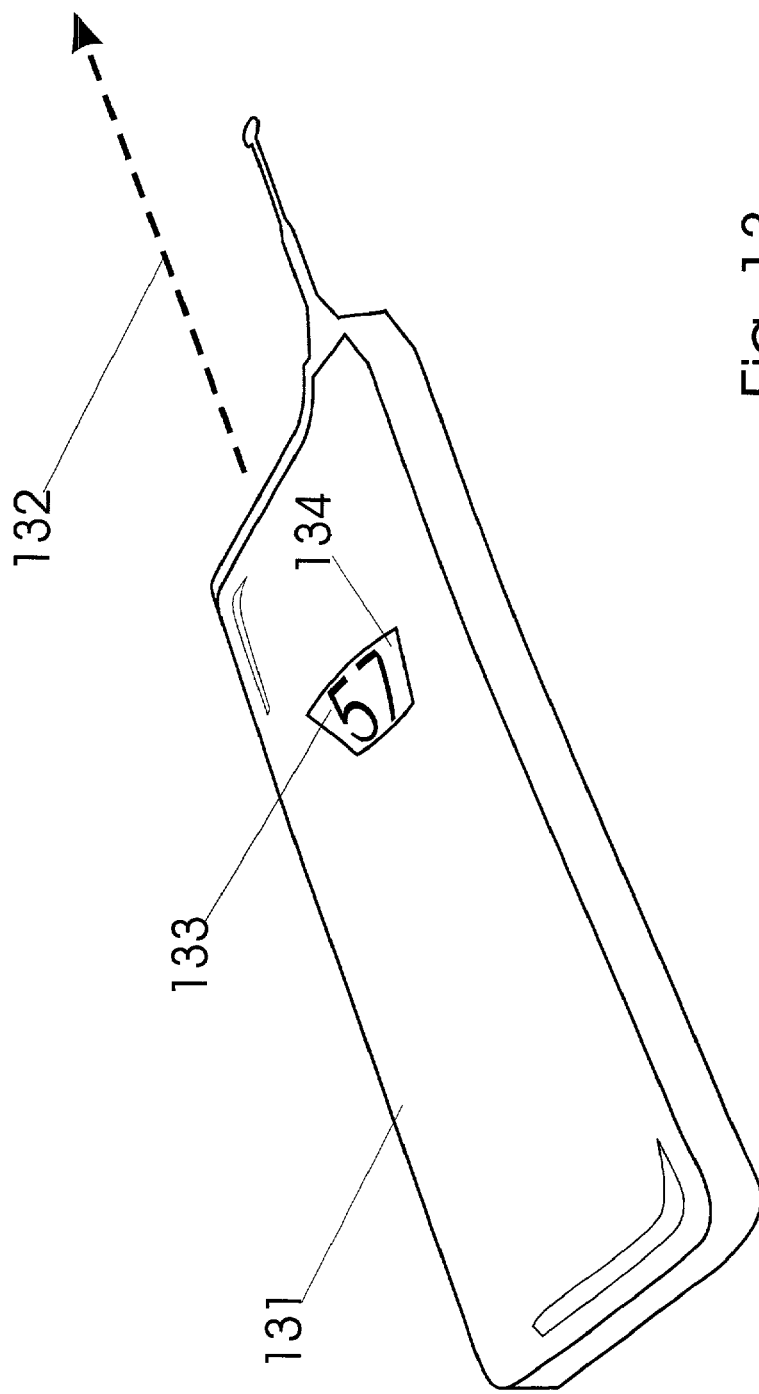
Figure 14:
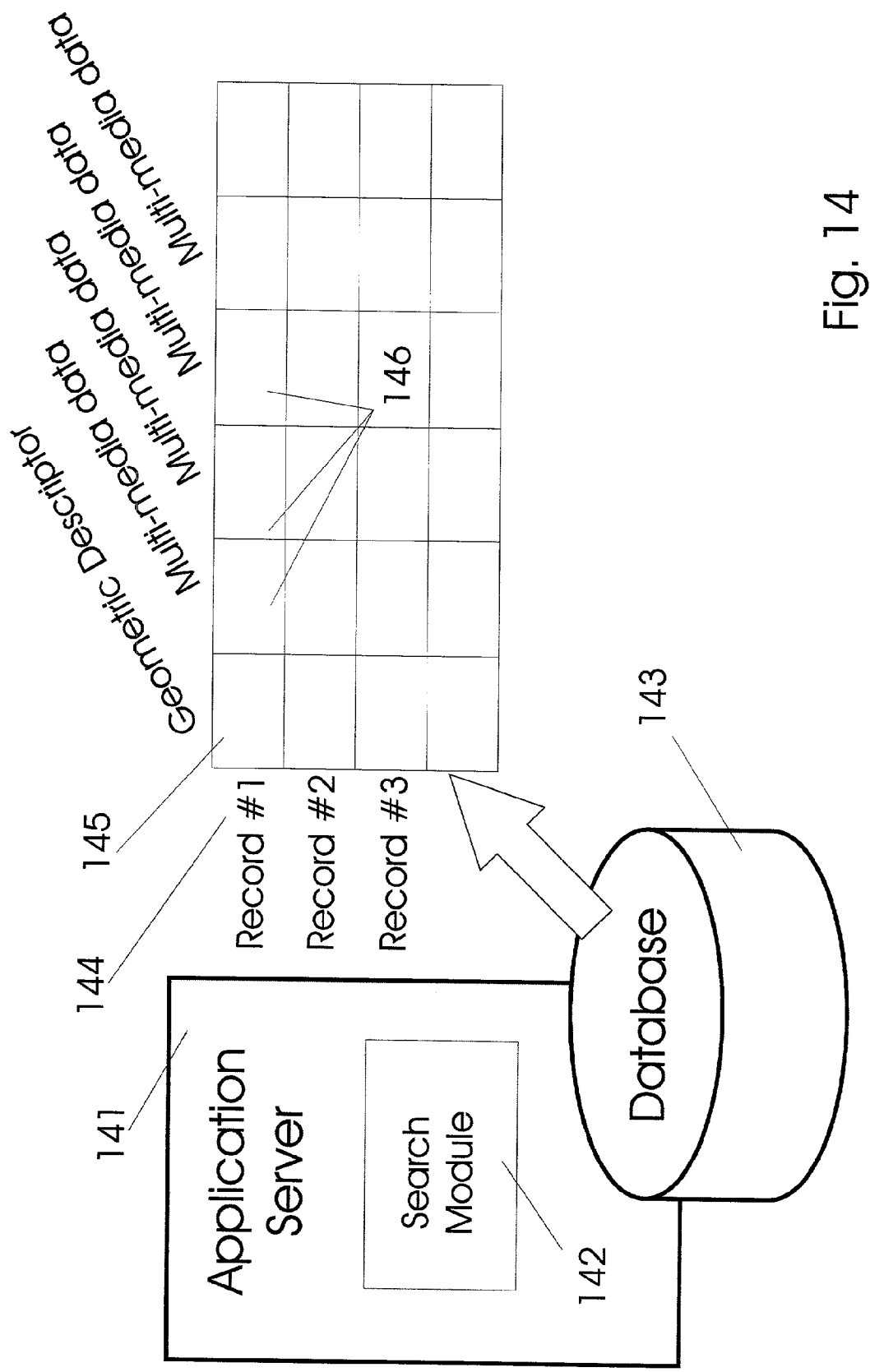
Figure 15:
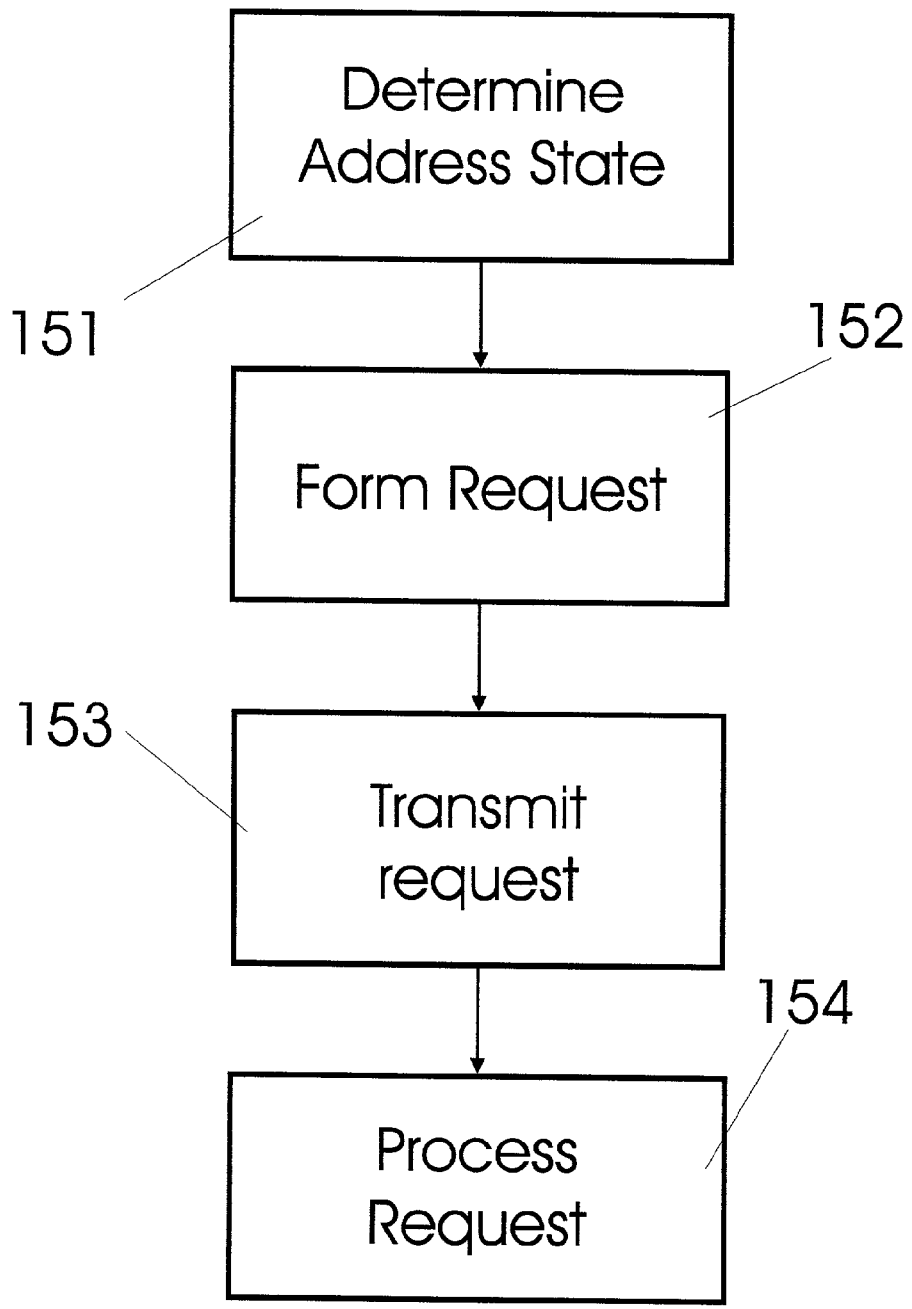
Figure 16:
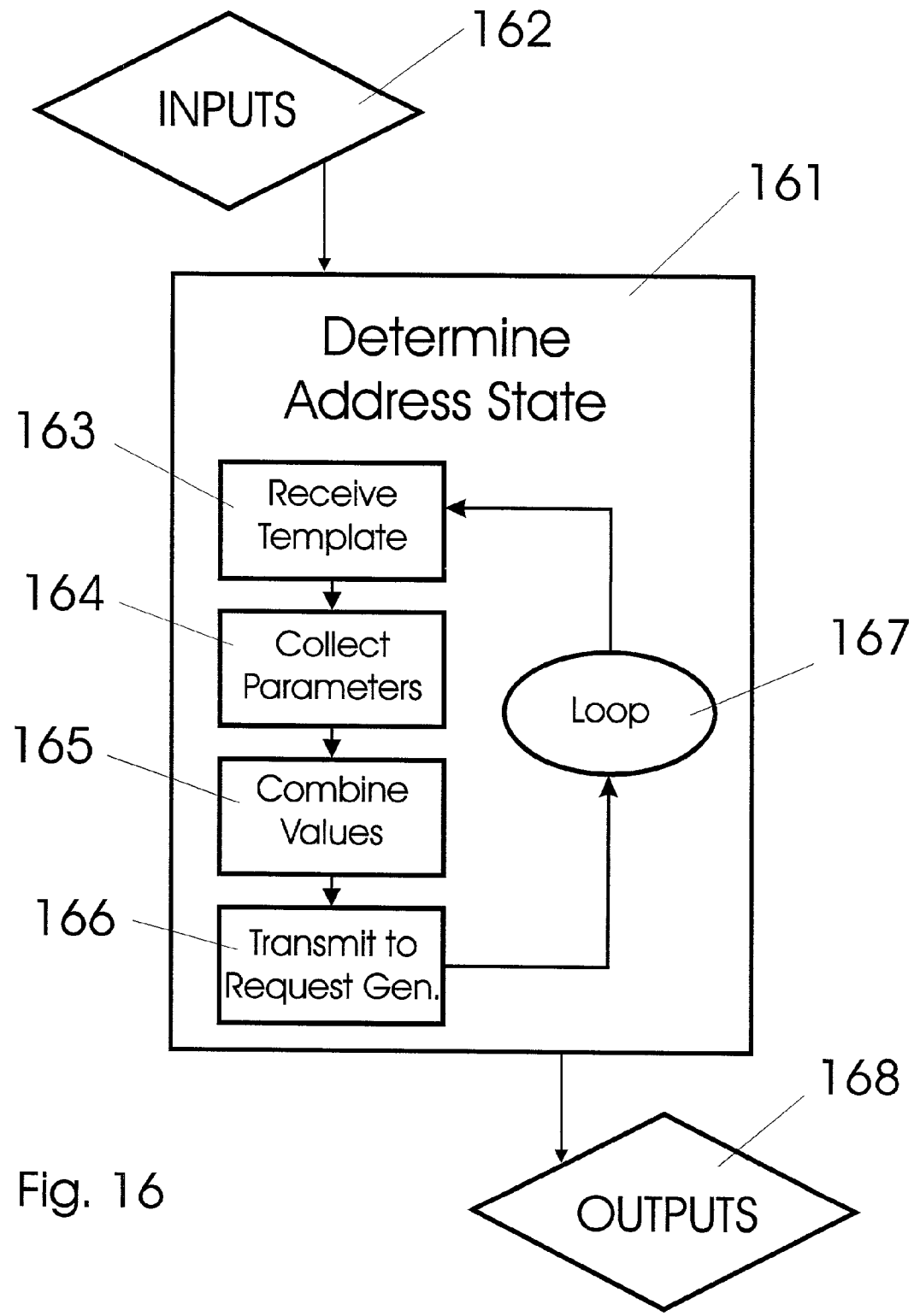
Figure 17:
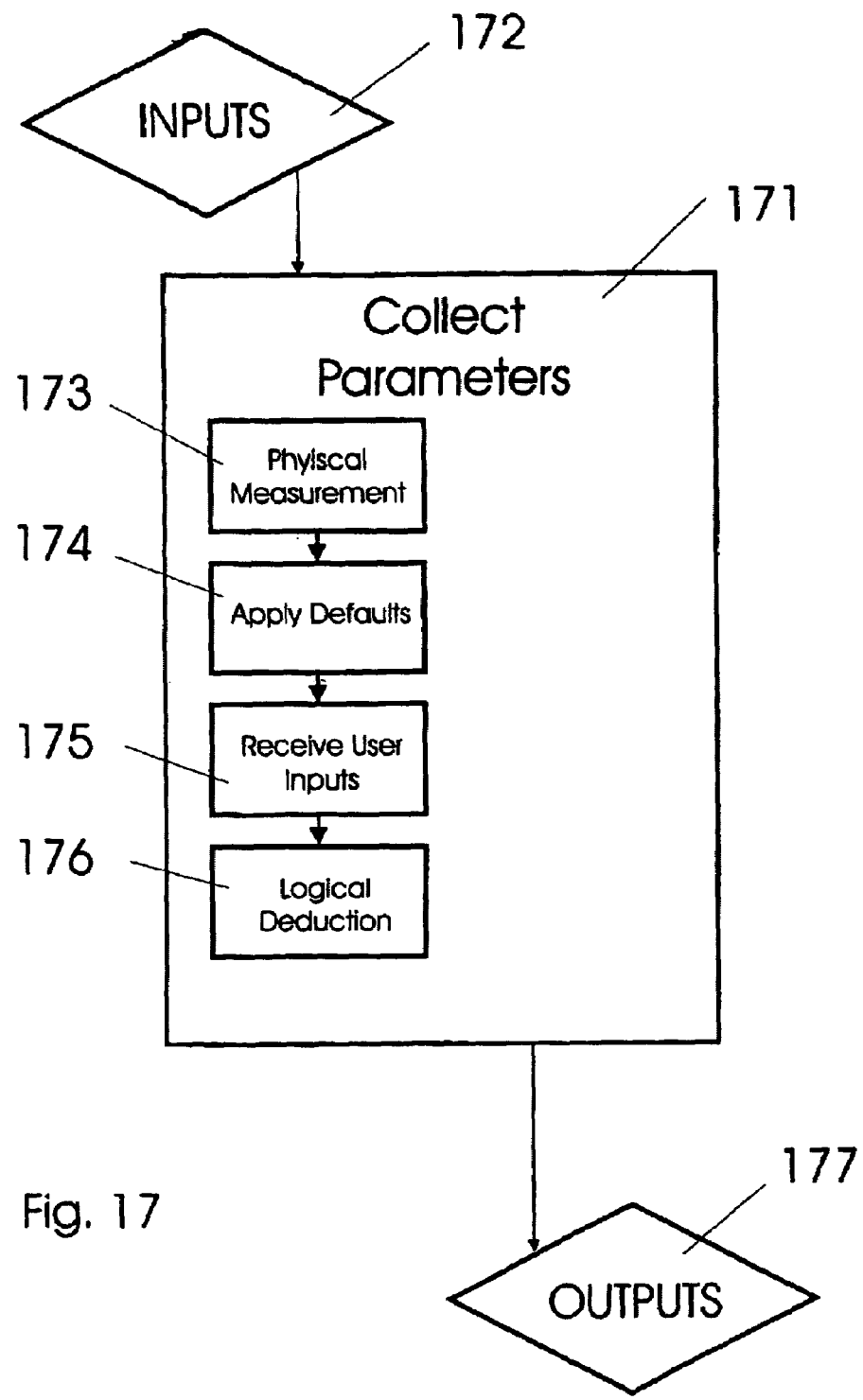
Figure 18:
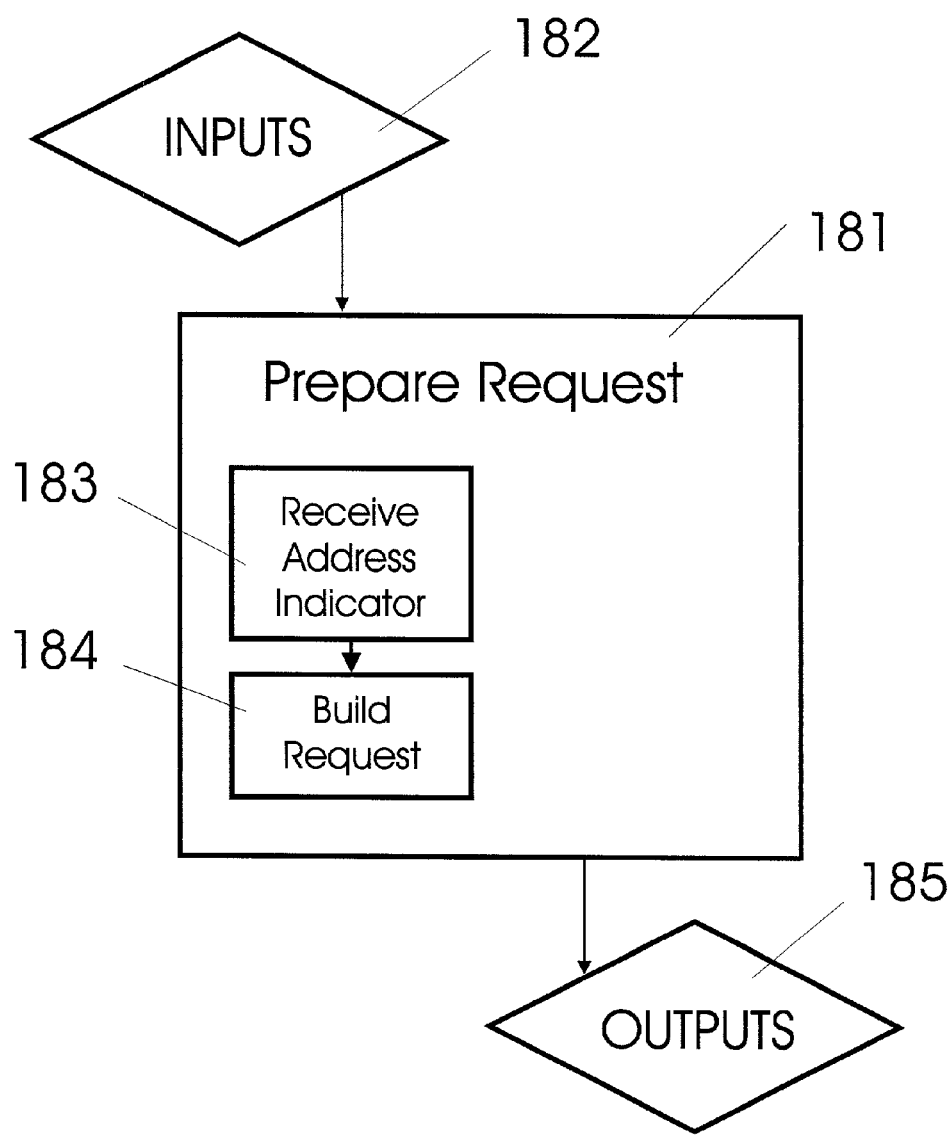
Figure 19:
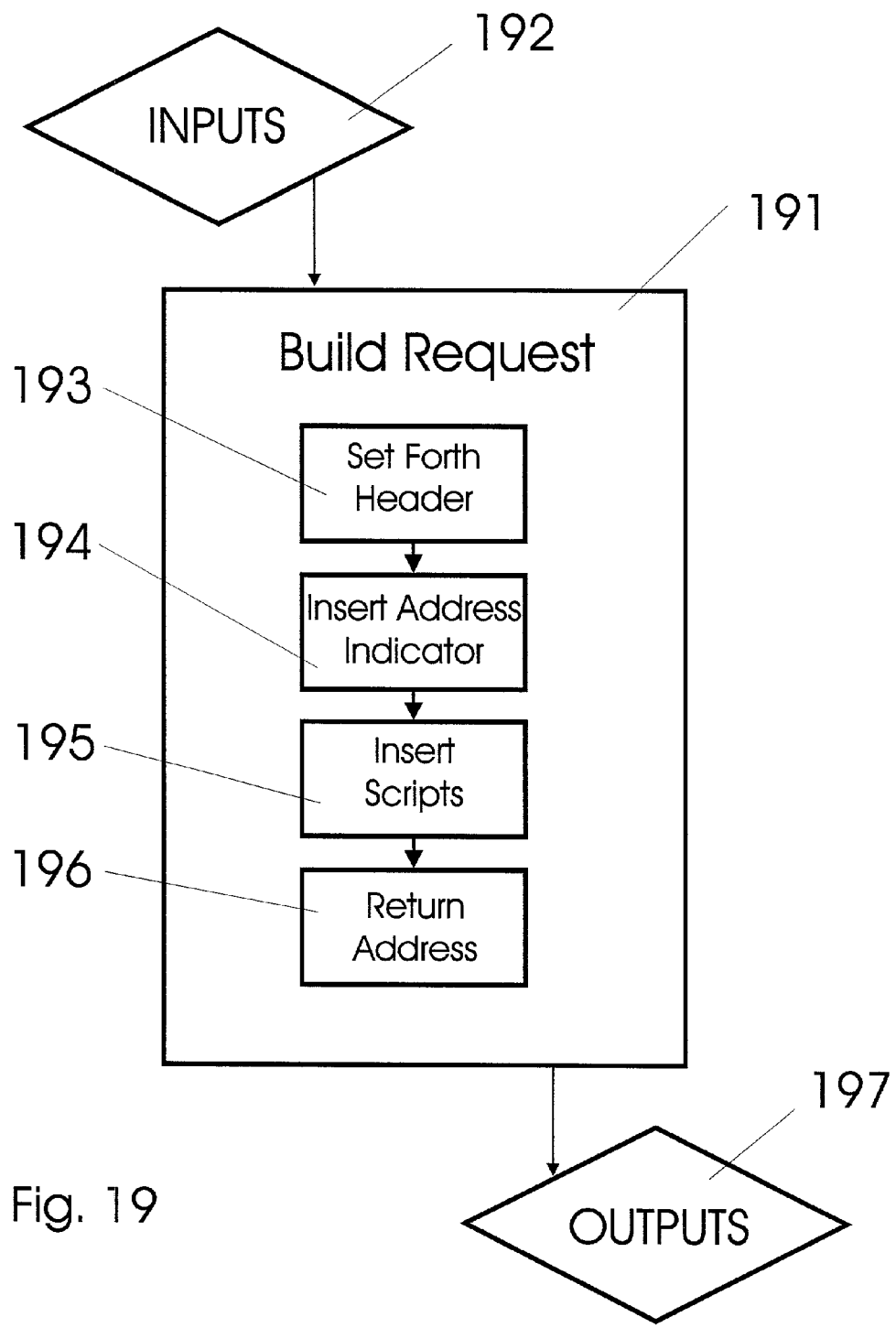
Figure 20:
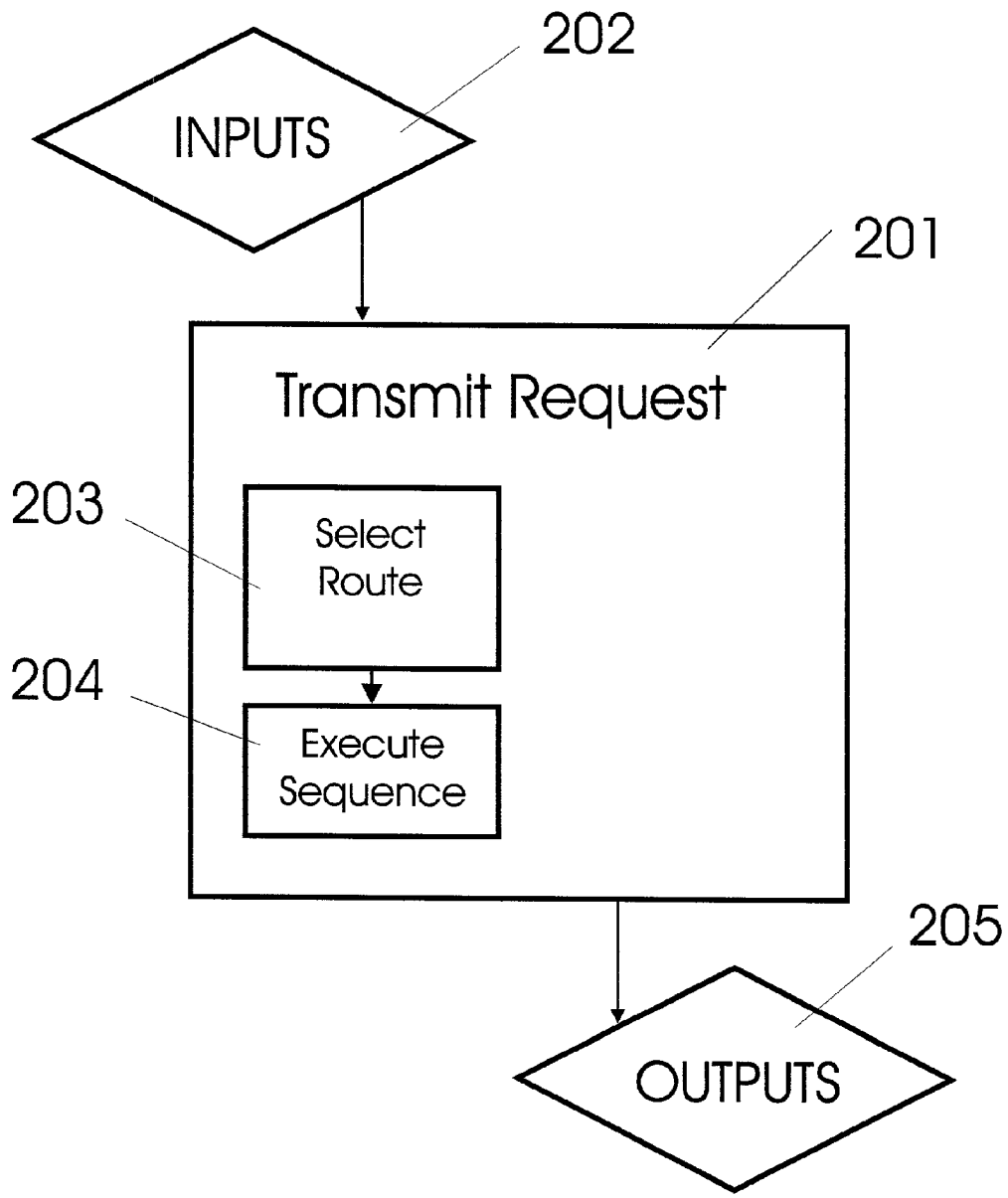
Figure 21:
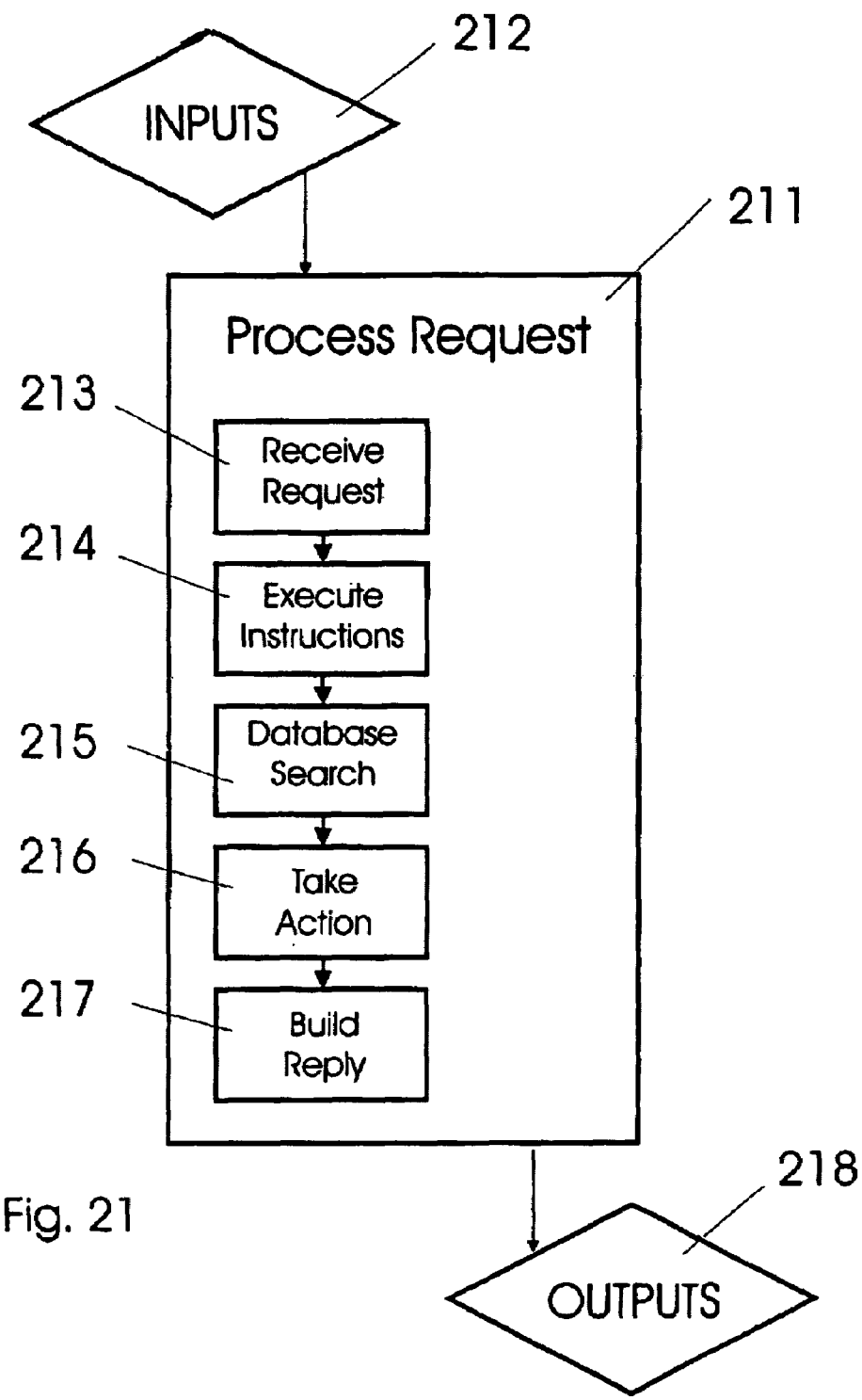
Figure 22:
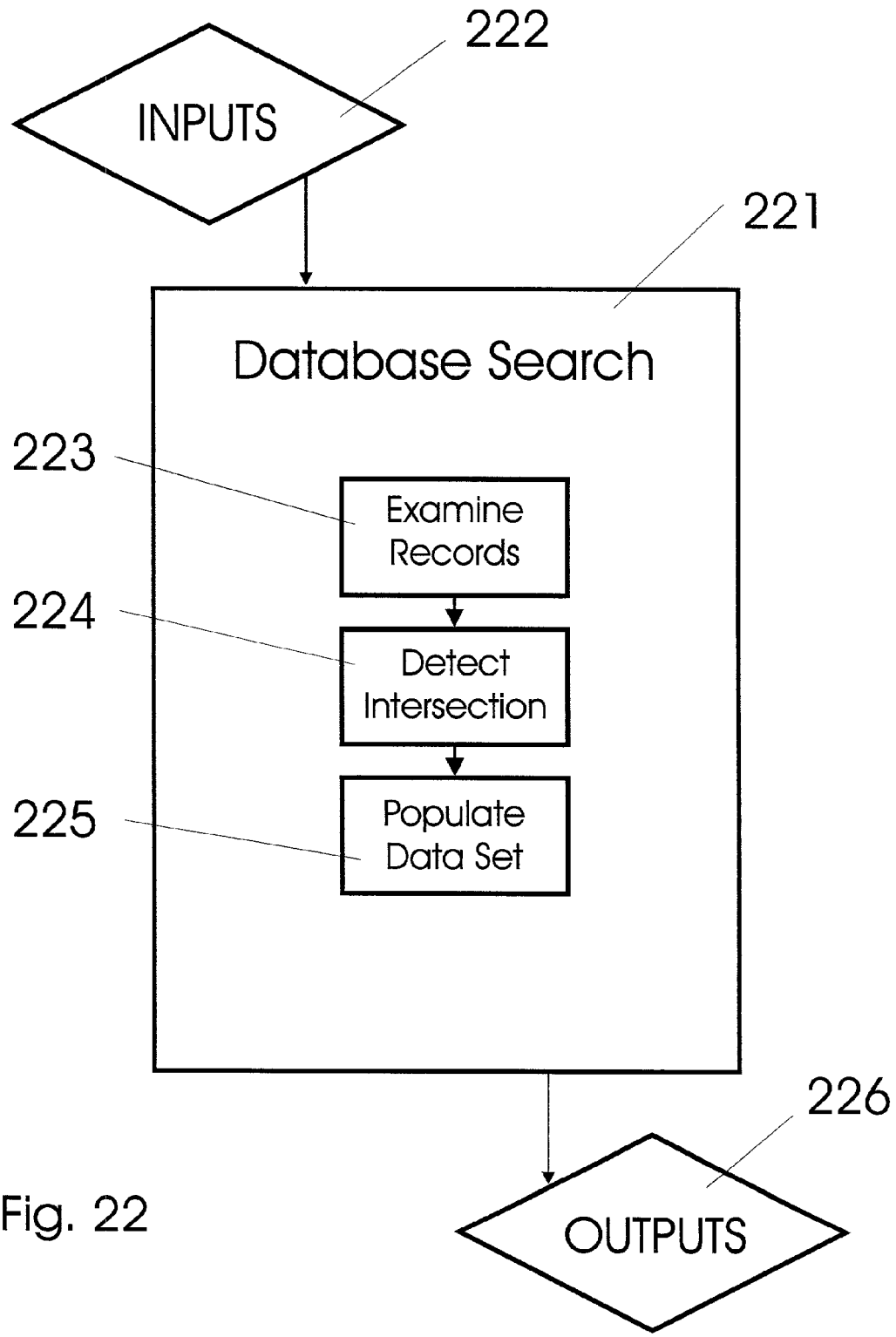
Figure 23:
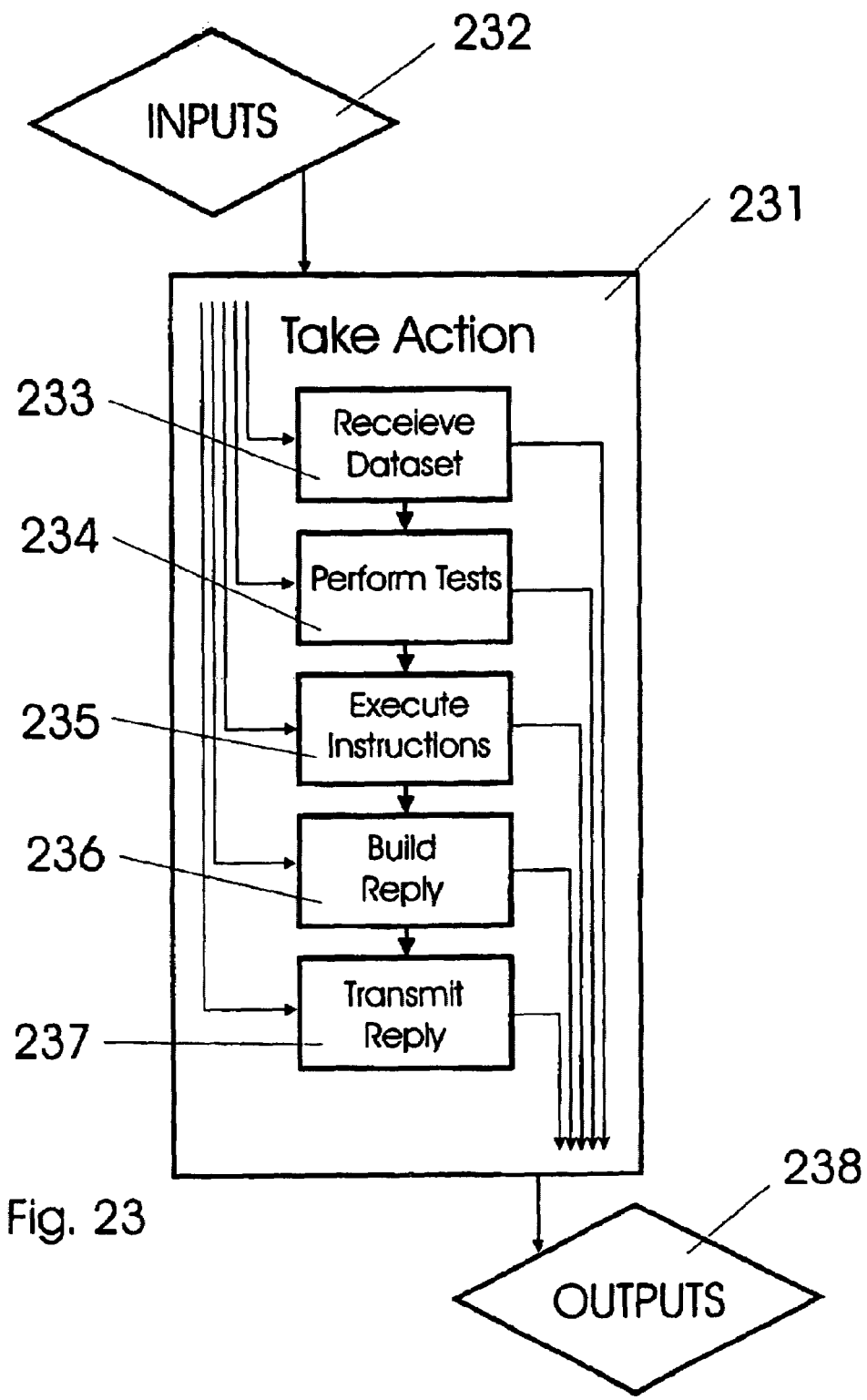
Figure 24:
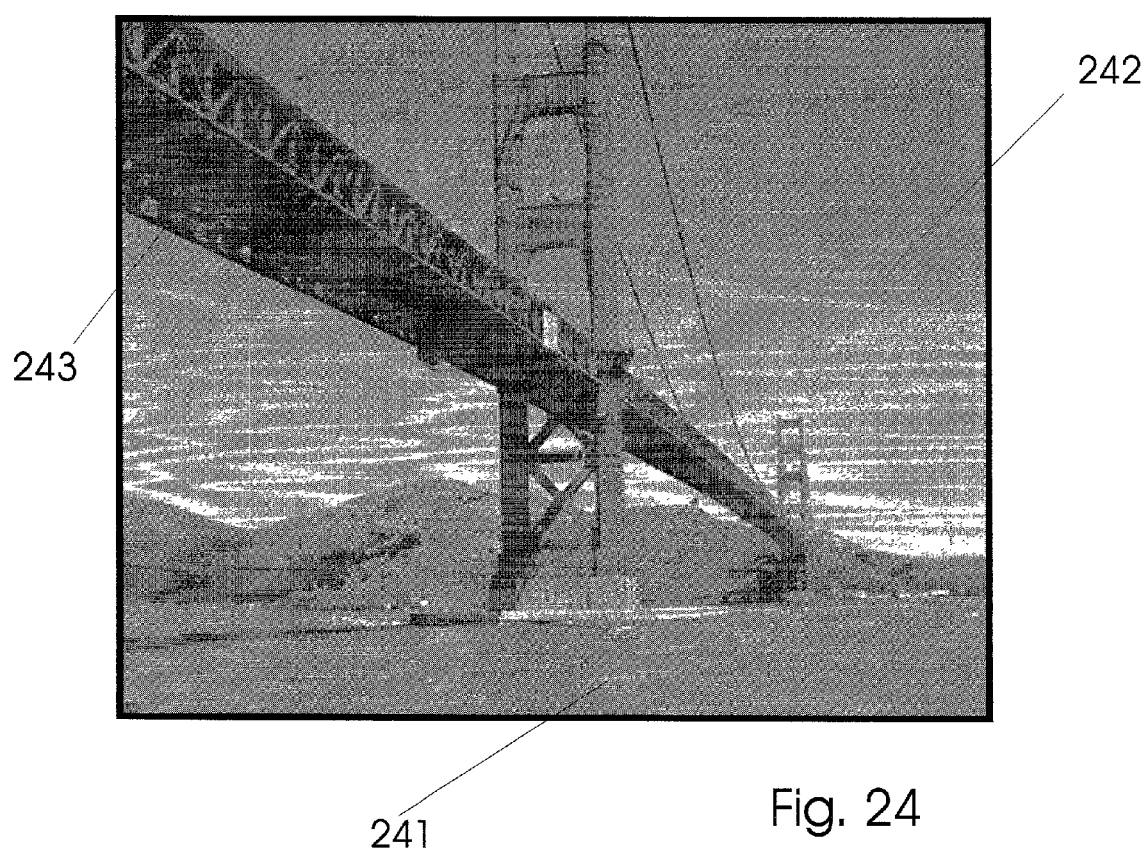
Figure 25:
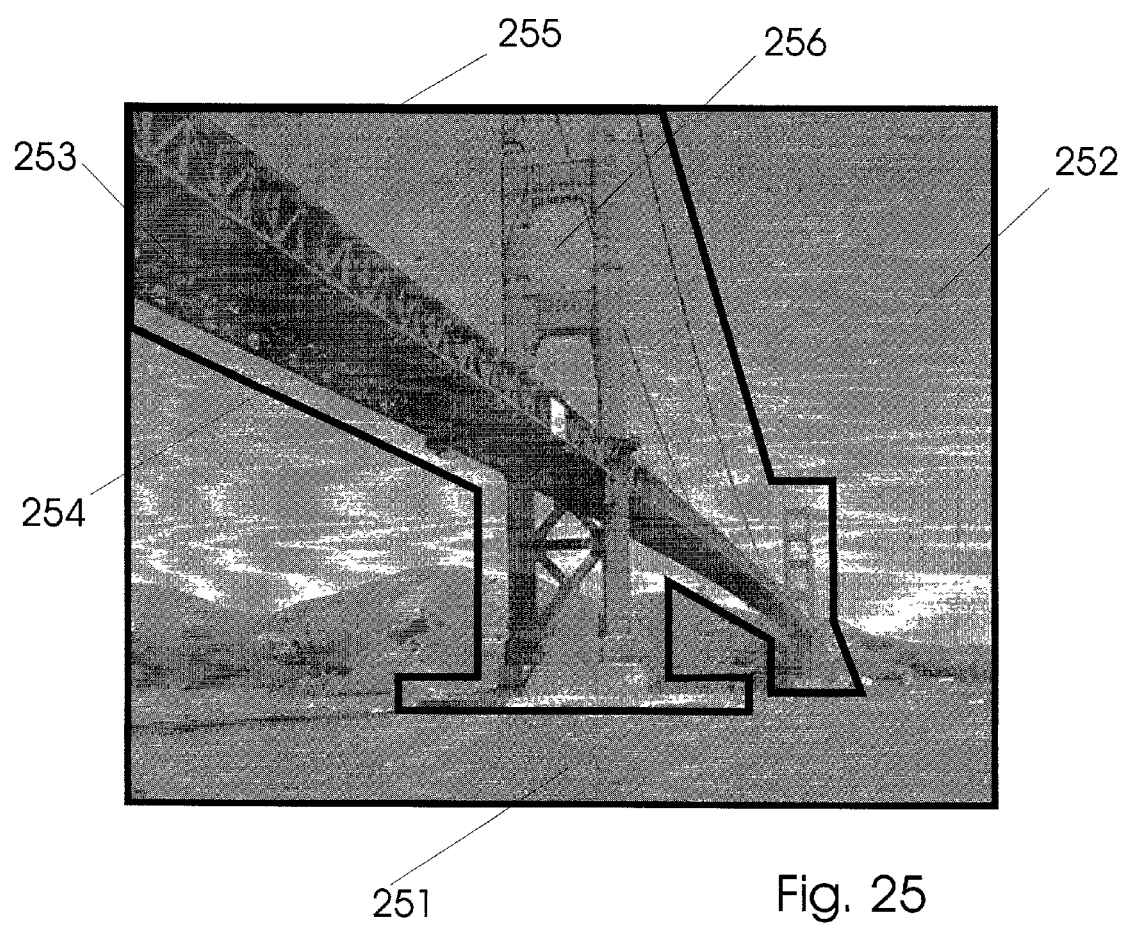
Figure 26:
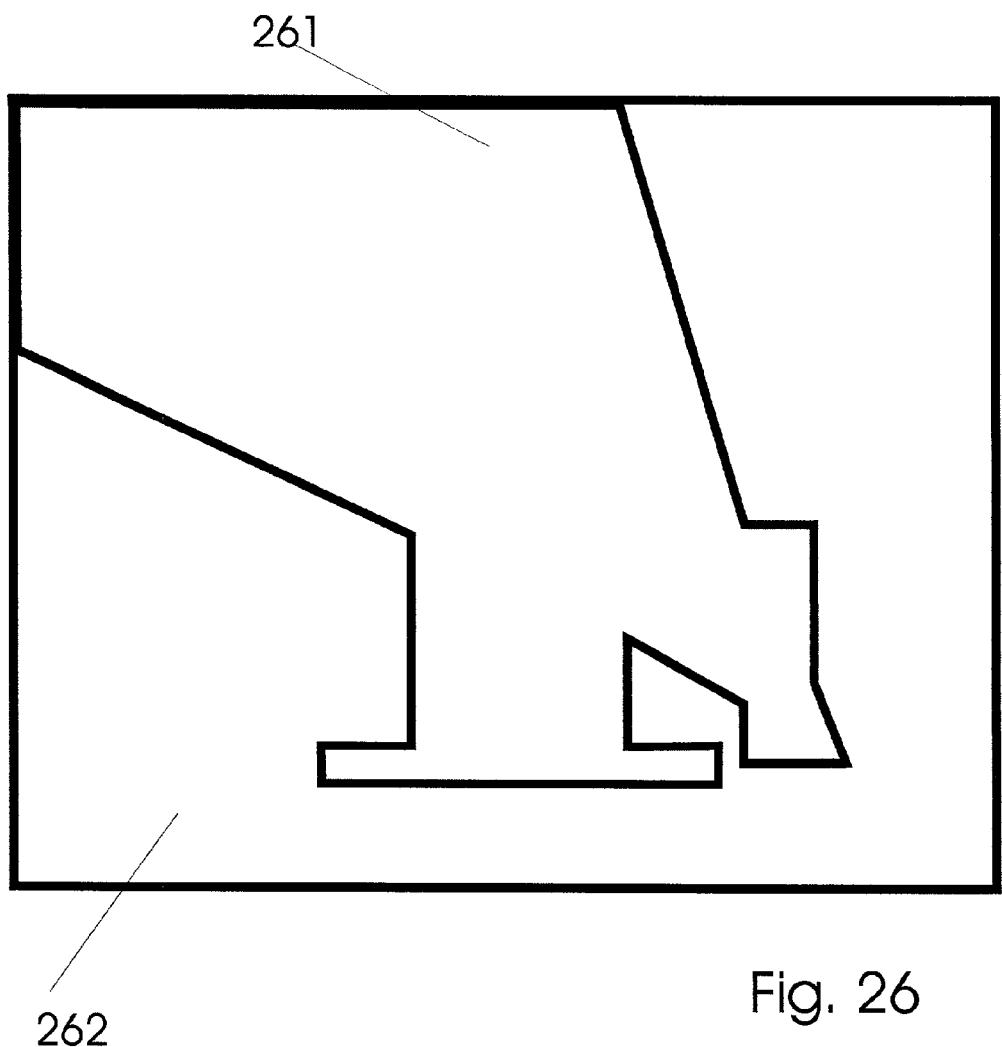
Figure 27:
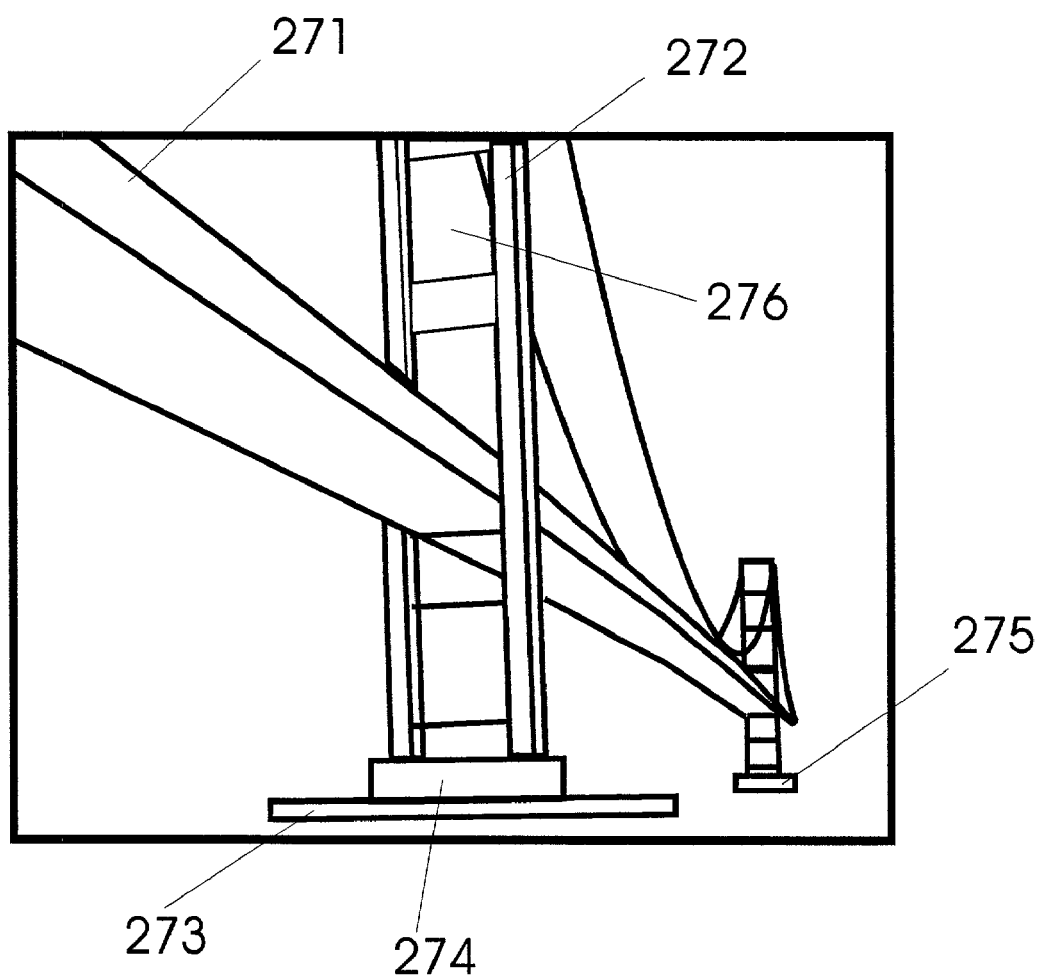
Figure 28:
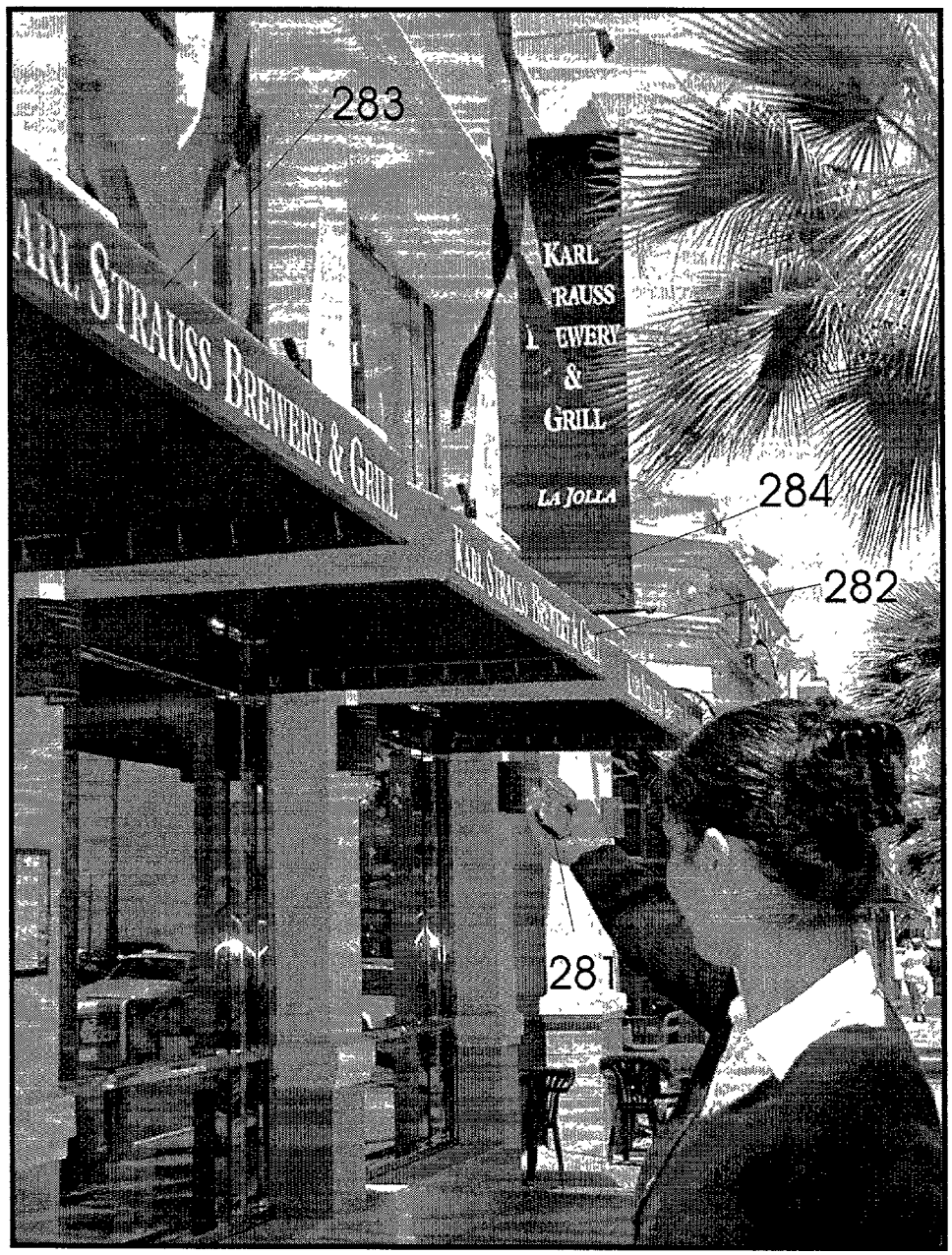
Figure 29:
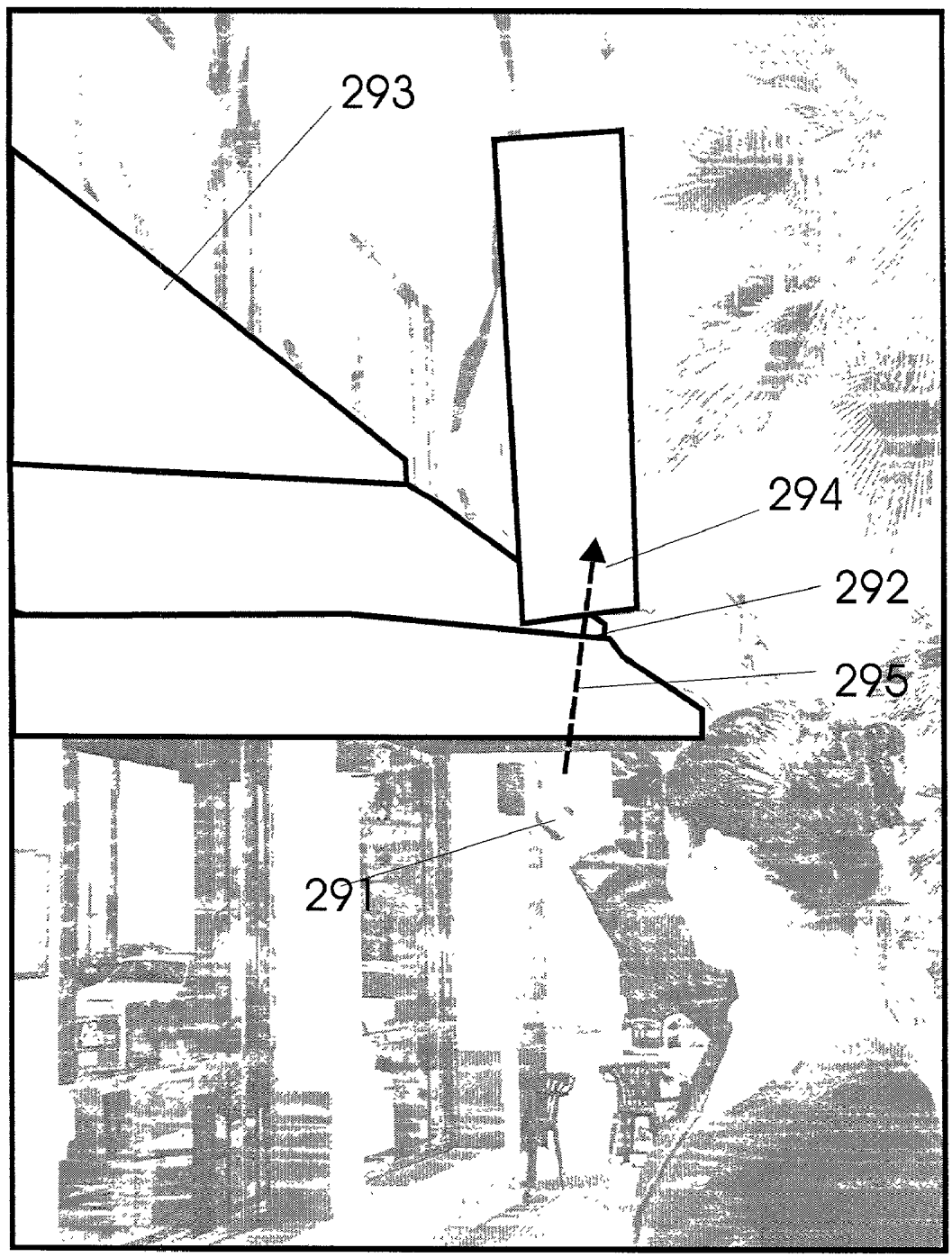
Figure 30:
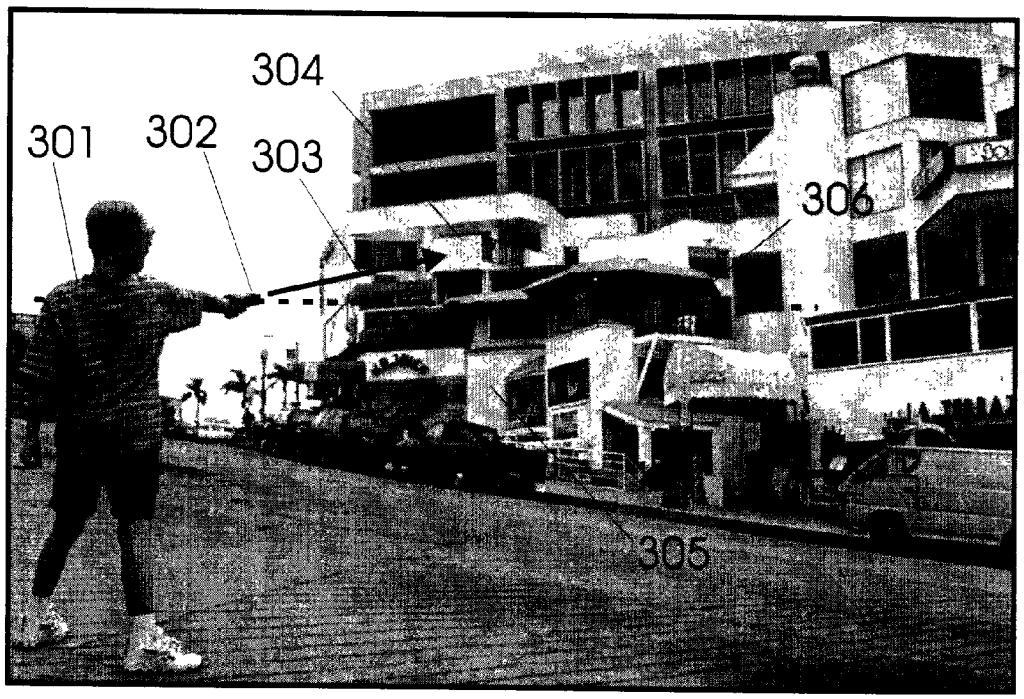
Figure 31:
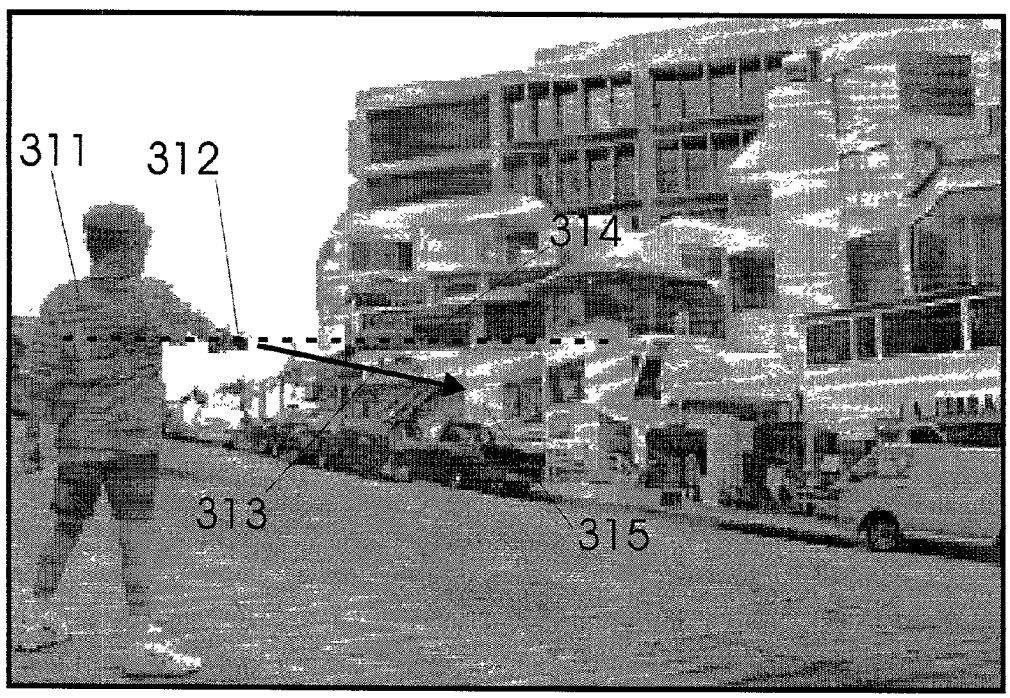
Figure 32:
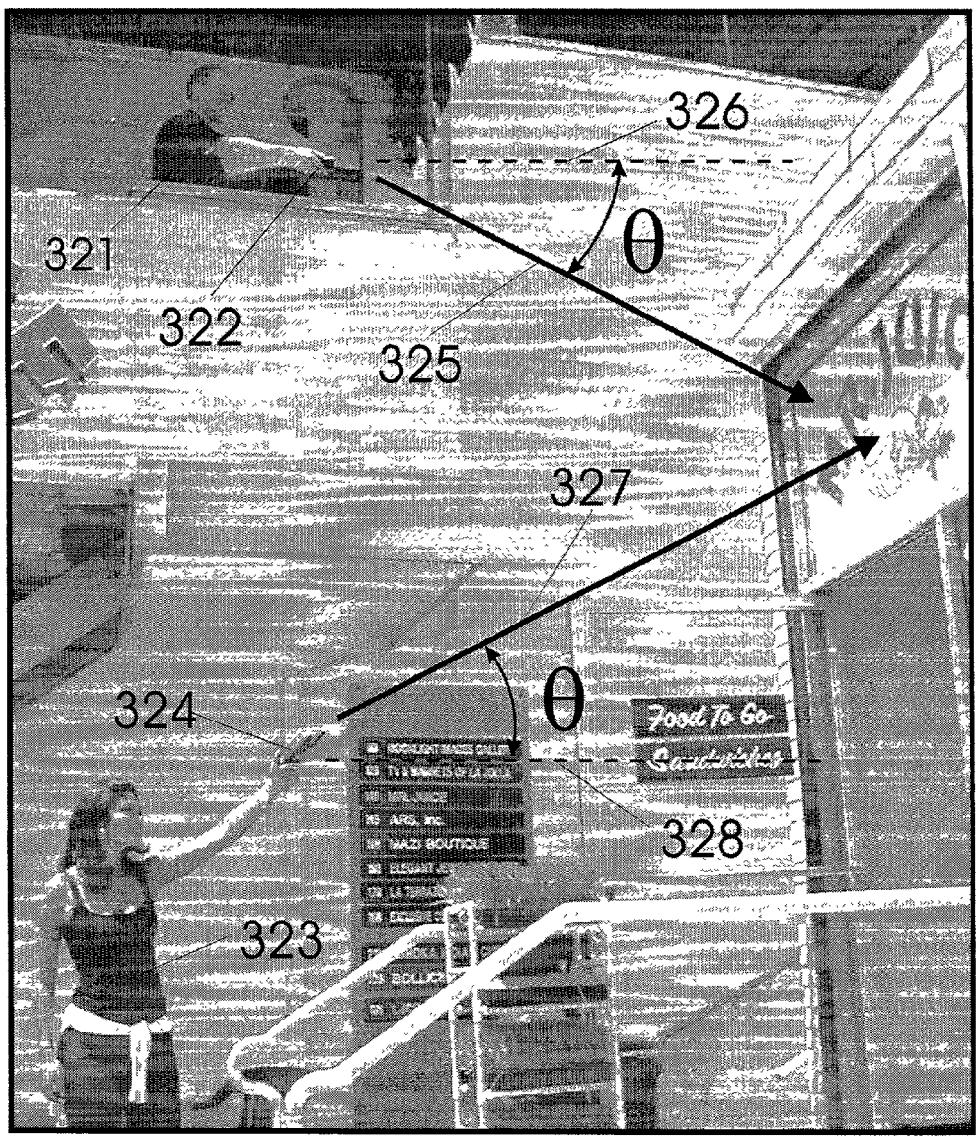
Figure 33:
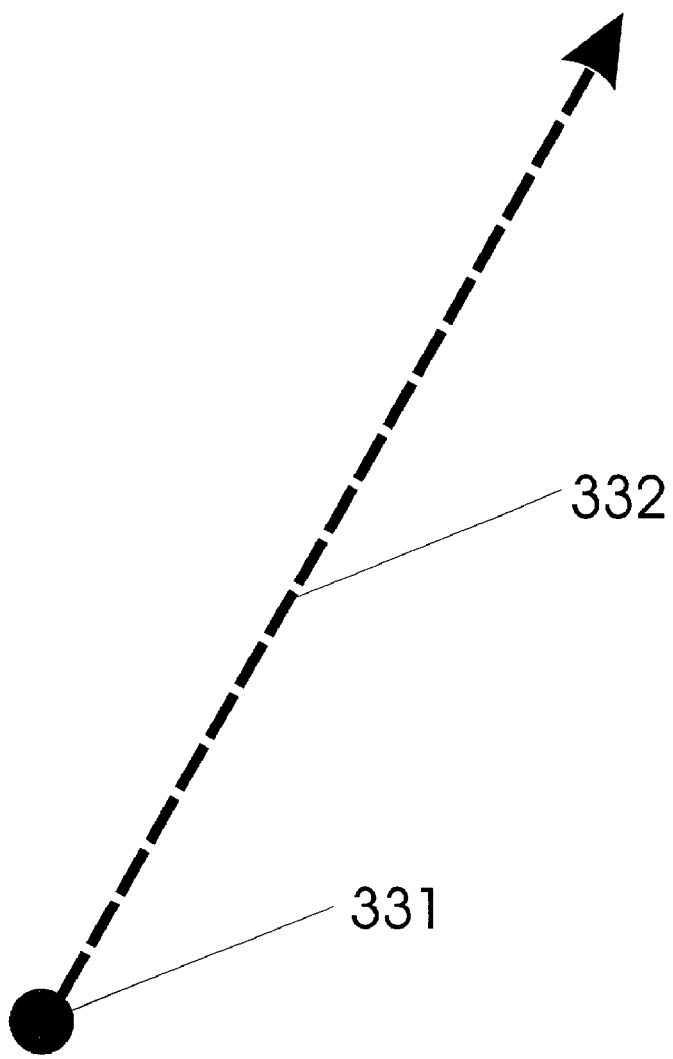
Figure 34:
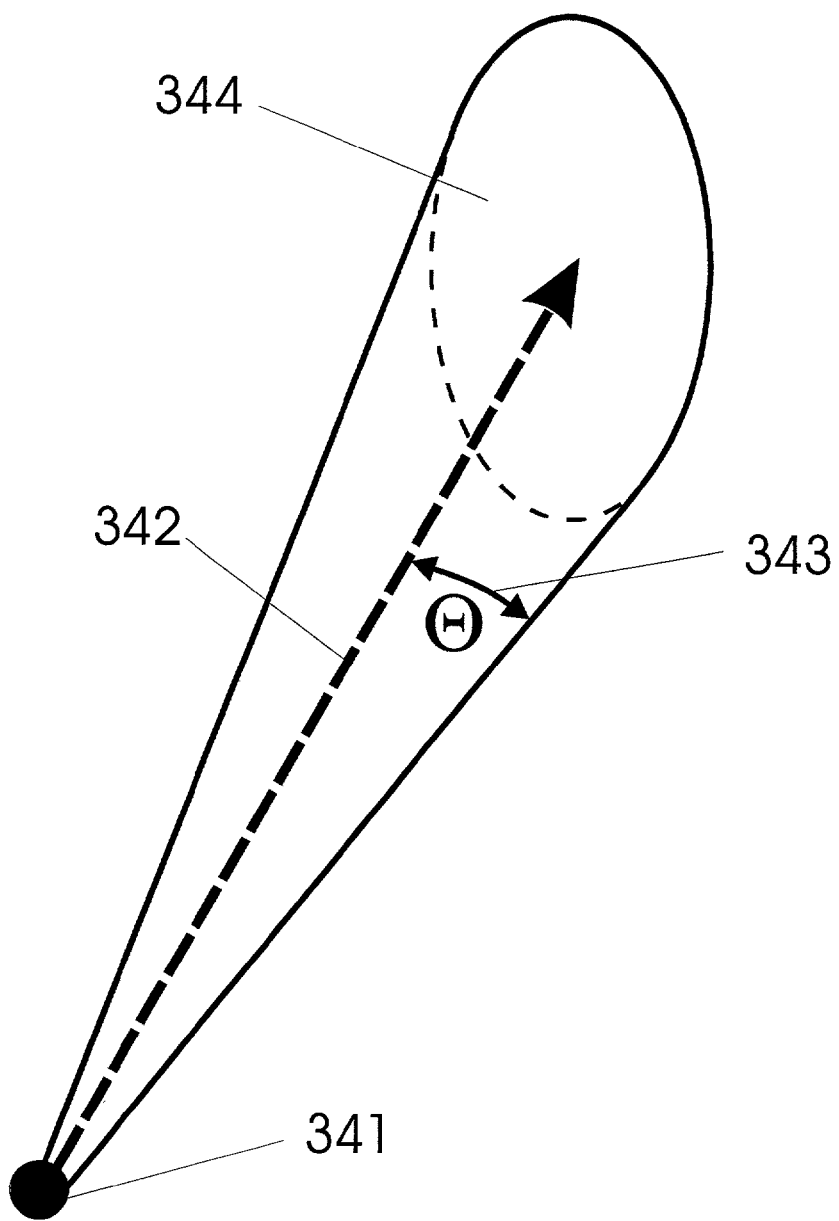
Figure 45:
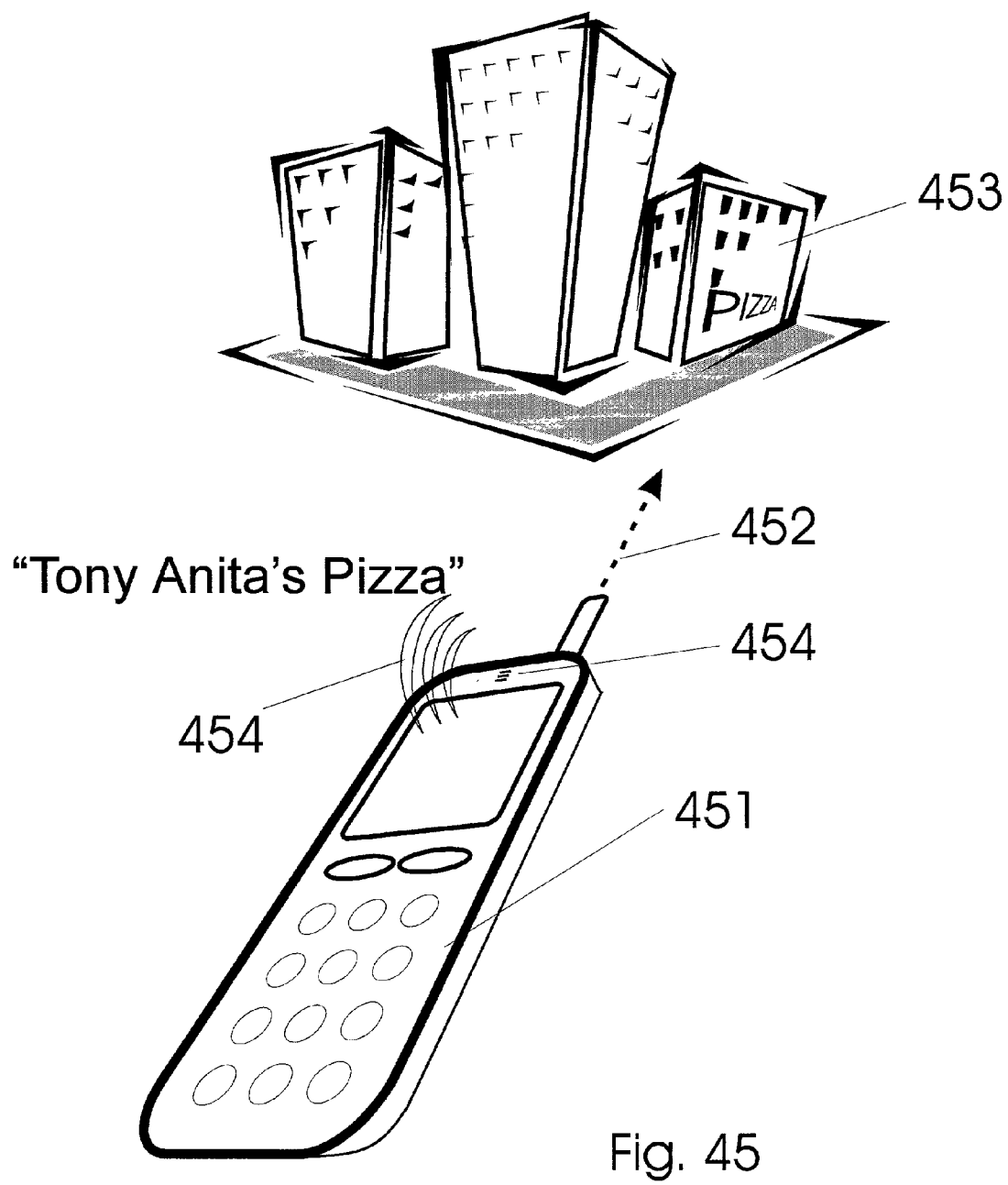
Figure 46:
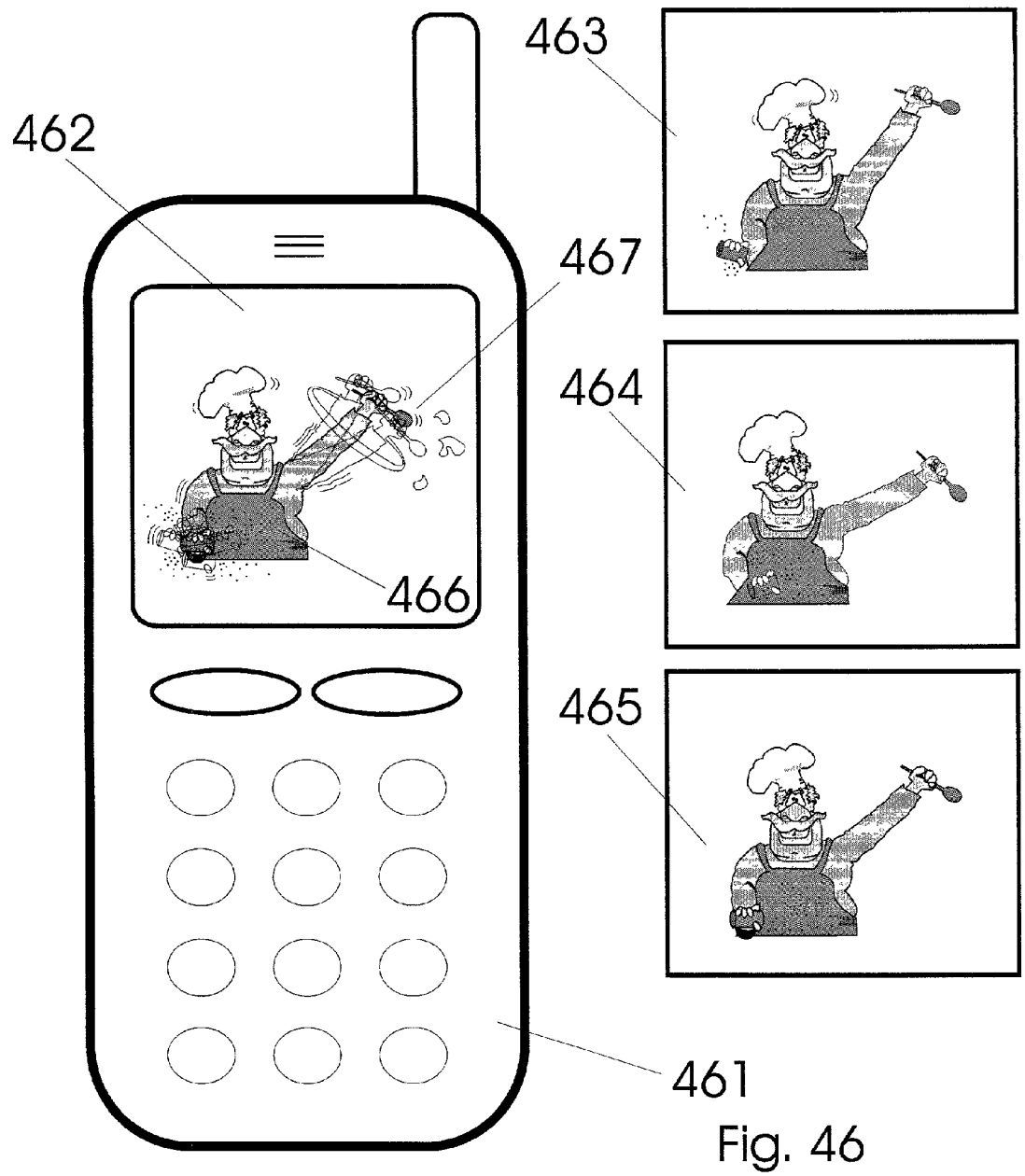
Figure 47:
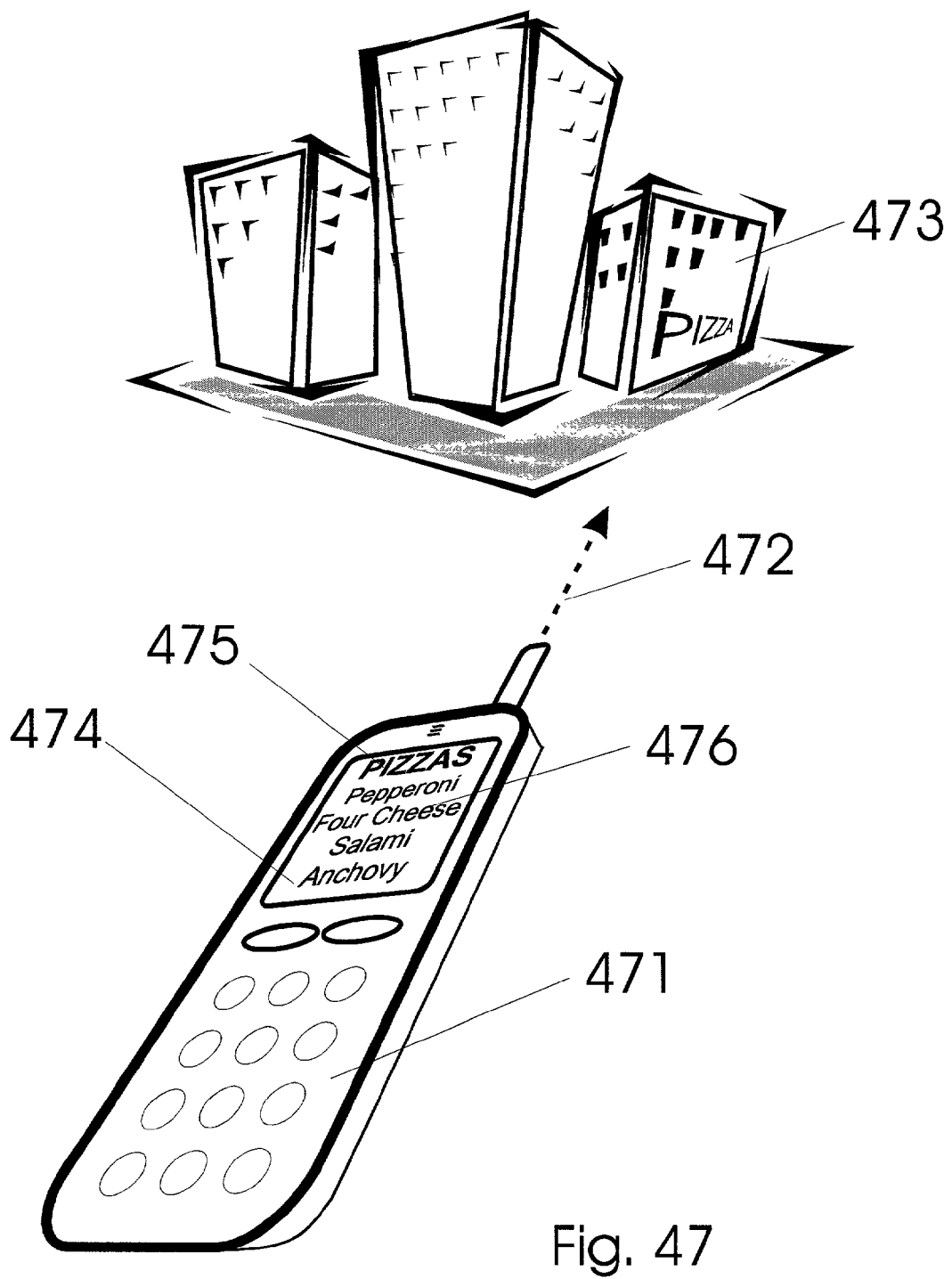
Figure 48:
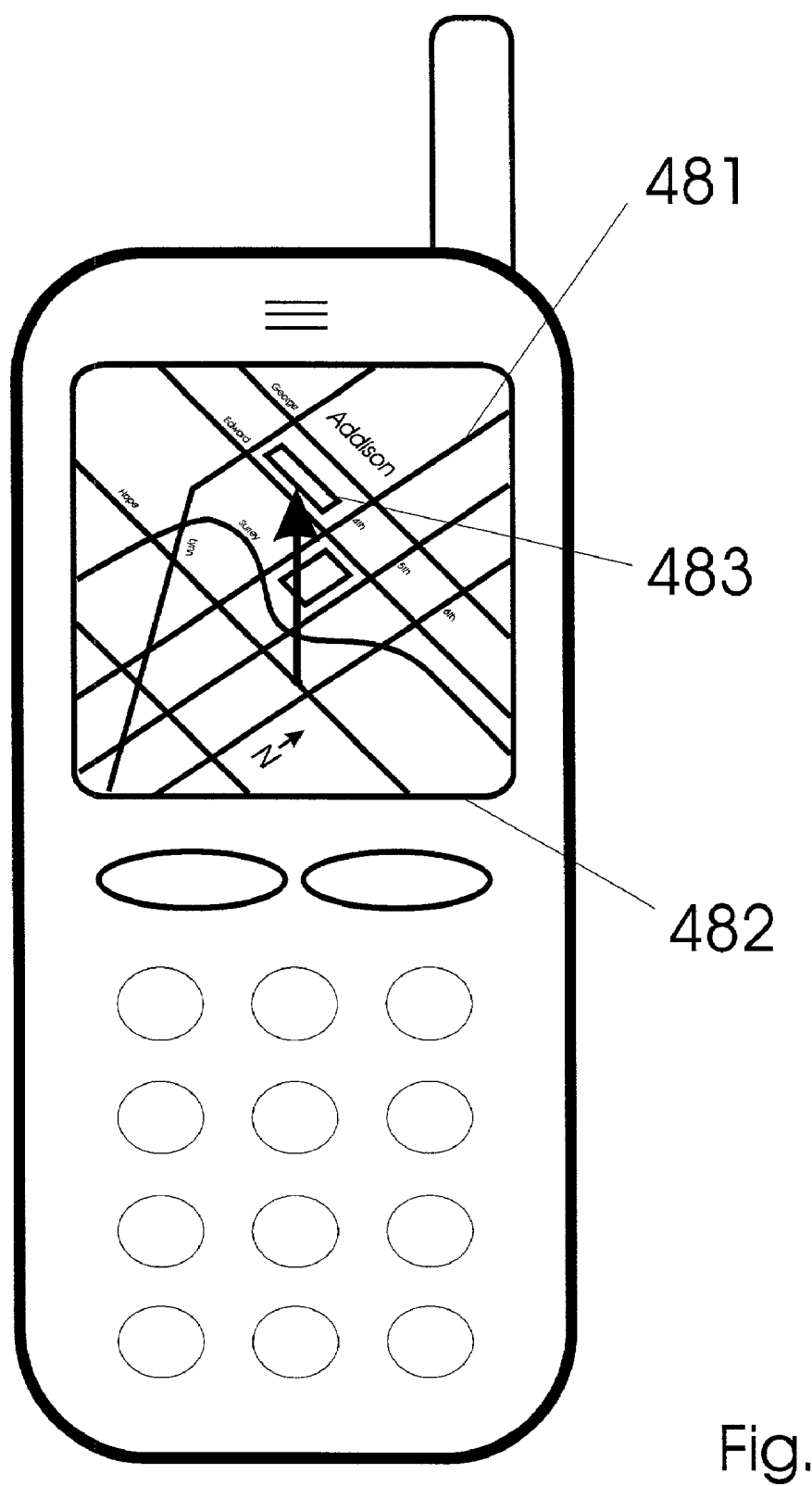
Figure 50:
Figure 51:
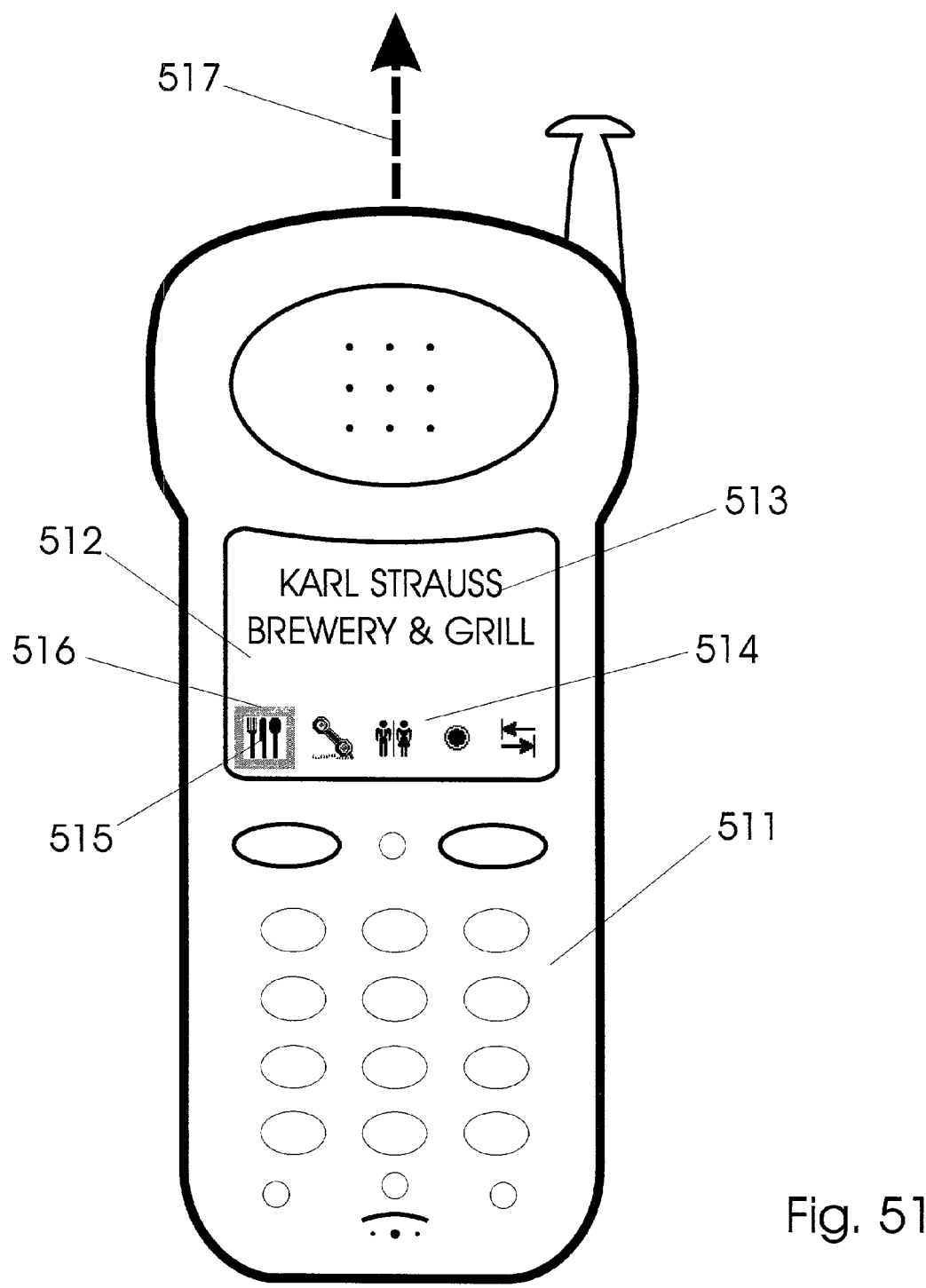
Figure 52:
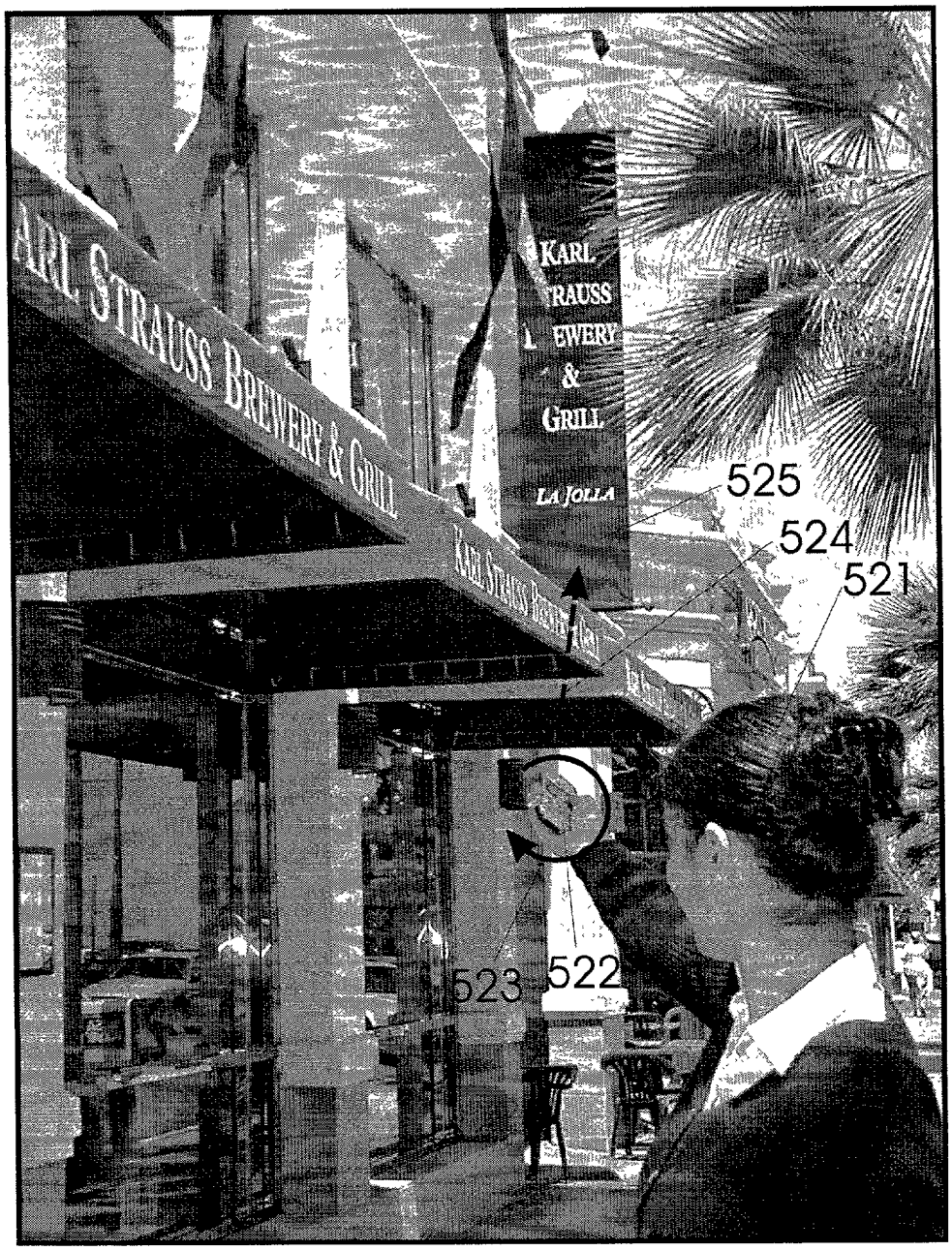
Figure 53:
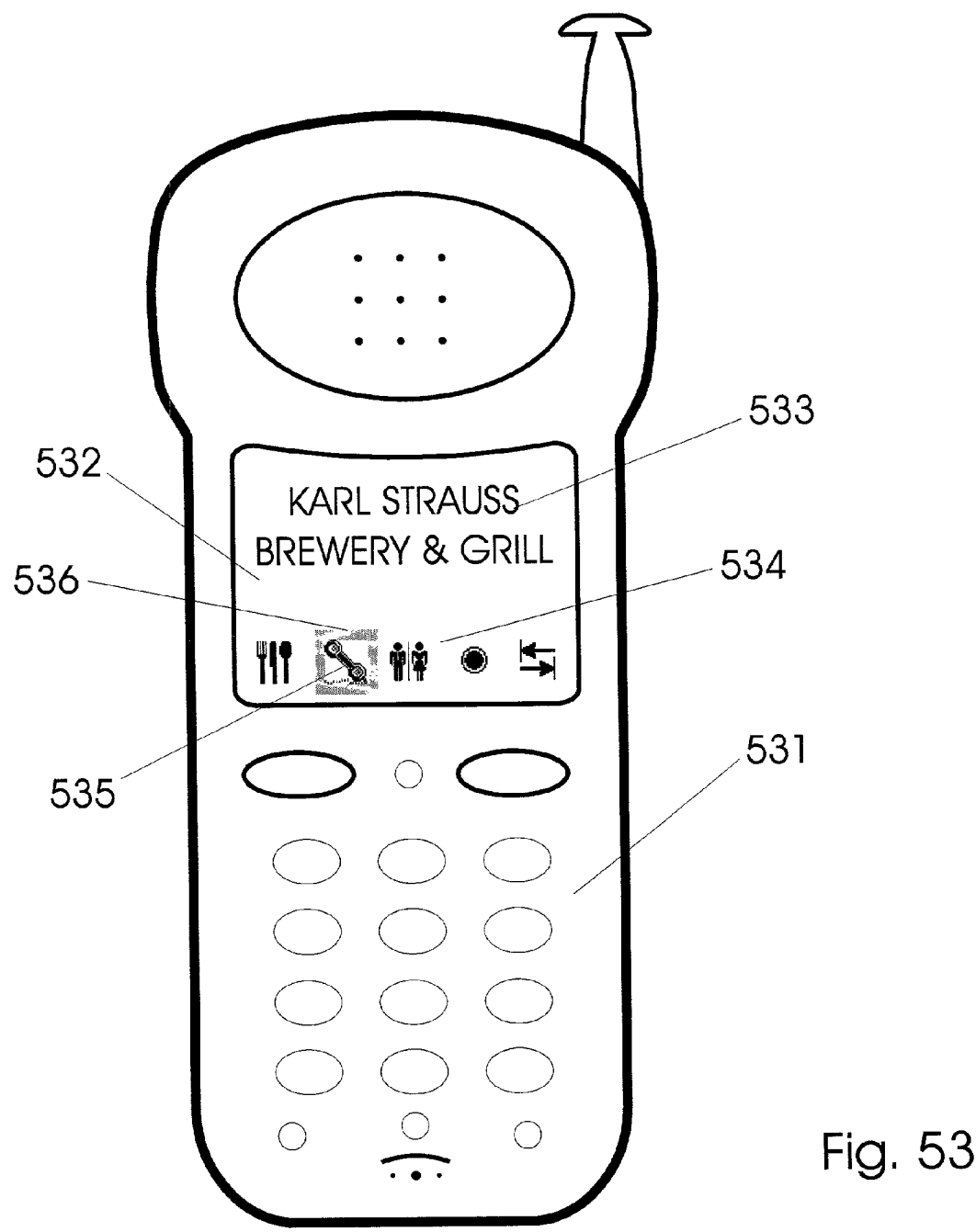

FIG. 5 diagrams a global positioning system in relation to the Earth;

FIG. 6 presents a simple representation of the Earth's magnetic field model;

FIG. 7 sets forth a coordinate definition for directional references used herein;

FIG. 8 is a block diagram directed to components of a direction sensing system;

FIG. 9 illustrates a mobile telephone in combination with a compass element;

FIG. 10 similarly shows a telephone in use with a compass;

FIGS. 11–13 show similar illustrations of a mobile telephone used in combination with a dipole compass;

FIG. 14 graphically describes a server having a database and special data structure;

FIGS. 15–23 are each block diagrams directed to method steps, in particular, FIG. 15 describes the four primary steps of any method of these inventions;

FIG. 16 illustrates a 'determine address state' step;

FIG. 17 further details the substep 'collect parameters';

FIG. 18 illustrates a 'prepare request' step;

FIG. 19 further details the substep 'build request';

FIG. 20 illustrates a 'transmit request' step;

FIG. 21 illustrates a 'process request' step;

FIG. 22 further details the substep 'database search';

FIG. 23 further details the substep 'take action';

FIG. 24 is an illustration of an important object used in examples of this disclosure;

FIG. 25 is a similar illustration with a graphical element relating thereto also included;

FIG. 26 shows a high contrast version and is presented for extra clarity;

FIG. 27 shows a similar version with added detail;

FIG. 28 is a halftoned photographic image illustrating a person using a device of the invention;

FIG. 29 is a similar image with exaggerated contrast for more perfect clarity;

FIG. 30 shows another user in relation to objects being addressed;

FIG. 31 is a photo illustration of the same user addressing other objects;

FIG. 32 illustrates a plurality of users in a special relationship with a single addressed object;

FIG. 33 depicts certain geometry of critical importance;

FIG. 34 shows a more detailed geometry of similar importance;

FIGS. 35–44 also show geometries of important elements of these inventions;

FIG. 45 shows a mobile unit addressing a restaurant type object;

FIGS. 46–48 illustrate multi-media data being played at a user interface;

FIG. 50 shows a user engaging a restaurant via a mobile unit of these inventions;

FIG. 51 is a line drawing to show the graphical user interface and element thereon;

FIG. 52 illustrates a particular use of the device to manage a switching means;

FIG. 53 further demonstrates switching between toolbar icons;

FIGS. 54–61 are line drawings directed to still further techniques of moving a cursor about a graphical display.

GLOSSARY OF SPECIAL TERMS

Throughout this disclosure, reference is made to some terms which may or may not be exactly defined in popular dictionaries as they are defined here. To provide a more precise disclosure, the following terms and their definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must use the context of use and liberal discretion to arrive at an intended meaning. One will be well advised to error on the side of attaching broader meanings to terms used in order to fully appreciate the depth of the teaching and to understand all the intended variations.

Application Server

An application server may be a general purpose computer operable for execution of computer code.

Address

'Address' is sometimes herein used as a verb meaning to point towards something or some object.

Address State

'Address state' is a term used to describe a collection of parameters relating to the physical nature of a device.

Address Indicator

An 'address indicator' is a geometric construct used to describe the address state of devices of these inventions.

Attitude

Attitude and orientation may be used as synonyms herein this document. Attitude is a specification of direction in an arbitrary coordinate system. It generally relates to a linear reference which may be incorporated as part of a physical device.

By example, one possible coordinate system includes that where attitude is given as a combination of two angular measures which may be represented by $\theta$ and $\Phi$. $\theta$ representing the directions of a compass, i.e. those in the horizontal plane 0° to 360° where North is 0°, and $\Phi$ representing an angle measured from a horizontal plane from −90° to +90° to uniquely define any direction which may exist in three space.

Database

For purposes of this disclosure, 'database' means data storage facility without limit to conventional database systems which include considerable amount of data management computer code. Accordingly, a simple common delimited text file may be a data store in some special versions of these inventions.

Geometric Descriptor

A geometric descriptor is a construct having an association with a particular object used to define a region of space which may be similar to the region of space occupied by the associated object. Space described by a geometric descriptor may change as a function of time.

Mobile Unit

Use of the term 'mobile unit' is not meant to limit the scope of these inventions. For example, a unit may be considered mobile if it is operable in changing either its position reference or its direction reference. Thus devices having a fixed position but variable direction reference are intended as mobile devices. Also, devices having fixed direction reference but a variable position reference is included as a device of these inventions. Although preferred versions have mobile units which are highly mobile, i.e. telephone handsets, 'mobile unit' is not to be applied to constrain less mobile devices from being included in the definition of these inventions. A unit is a 'mobile unit' when its position or direction references.

Object

An 'object' may be a real or virtual entity having some spatial extent associated therewith.

Request

A request is formed in and transmitted from a mobile unit to a server as a request for information and processing services.

Server Computer

A server computer includes a computer which operates to receive requests from and provide services to client computing devices such as mobile units which may be remote from but in communication with such server computer.

Special Function Facility

A special function facility is a module which is arranged to perform application specific function. A special function facility may be physically located in a mobile unit, in a server computer or in a network but is in communication with either a server computer or a mobile unit whereby it may receive instructions or cues therefrom and perform a special function in response thereto.

Wireless Network

The term 'wireless network' is used throughout to promote a better understanding of preferred versions. However, use of 'wireless network' is not meant to exclude a case which is counter intuitive in view of the word 'network'.

Although a network is generally comprised of many nodes, the special case where there is but one node is not meant to be excluded. It is entirely possible to configure devices of these inventions, all elements being identical, where the 'wireless network' has but a single node. That is, mobile devices are in communication with a server via a wireless link but there exists only one transmission point in which all mobile units are coupled via the wireless communication link. Therefore, these inventions is meant to include the special case where the wireless network includes only one node. It is interesting to note that these inventions may be complete in a system consisting of exactly one mobile device and a wireless network having one node; although it remains clear that ideal systems will have many thousands of mobile units in a complex wireless network having many thousands of nodes.

Wireless Application Protocol—WAP

Wireless Application Protocol is the name presently used in referring to the standard for wireless communication. By committee, a protocol was designed and agreed upon in order that developers of computer applications and network administers provide products which cooperate together. The protocol, like most others, continues development and is accompanied by changes from time-to-time. Accordingly, it will be recognized that references to WAP herein this document will be broadly interpreted as the standard which prevails at the time of question rather than at the time of this writing. Thus a reference to 'WAP' includes those versions of wireless application protocols which are sure to come regardless whether they are called 'WAP' or not. What is meant by WAP is the most current and prevailing version of a wireless application protocol.

In addition, terms which are functional in nature like those above may be used throughout this disclosure including the claims. For example, 'means for' or 'step for' followed by a phrase describing a function. One should remain aware that any particular means which may be later provided as an example is not meant to limit the 'means for' to that example but rather the example is provided to further illustrate certain preferred possibilities. Thus the 'means for' or 'step for' should not be limited to any particular structure which may be called out but rather to any conceivable means of causing the function described to be effected. The reader will recognize it is the function to be carried out which is the essence of these inventions and many alternative means for causing the function to occur may exist without detracting from any combination or combinations taught as part of these inventions.

PREFERRED EMBODIMENTS OF THESE INVENTIONS

In accordance with each of the preferred embodiments of these inventions, there is provided apparatus for and methods of addressing objects. It will be appreciated that each of the embodiments described may include both apparatus and methods and that an apparatus or method of one preferred embodiment may be different than an apparatus or method of another embodiment.

A complete outline of the preferred embodiments portion of the disclosure is included as follows to help navigate the document and provide a most complete understanding.

Brief System Overview

Figure 1:
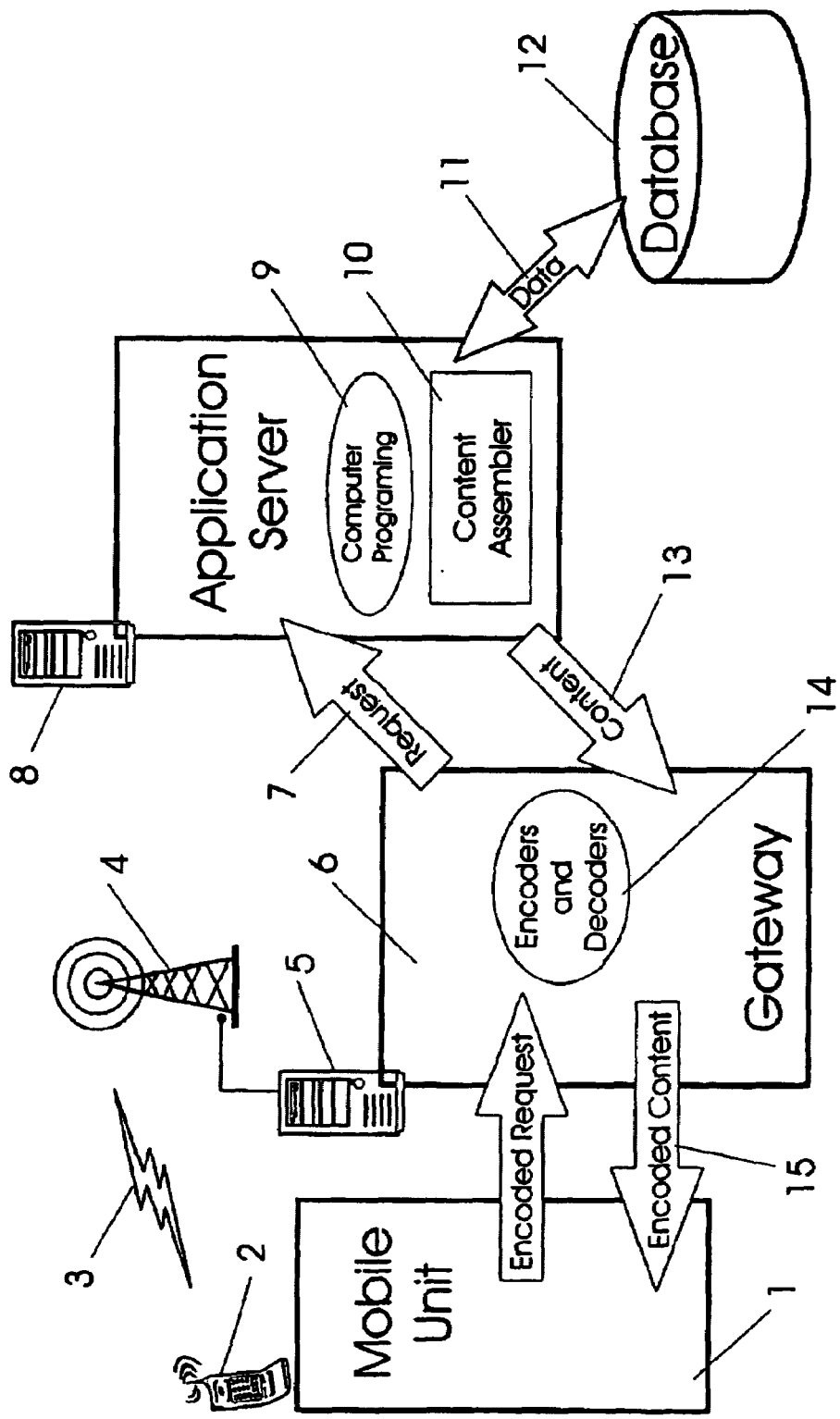
FIG. 1 is a block diagram of a system overview.

It is useful to consider a system overview prior to a presentation of more specific details regarding elements from which a system is comprised. With reference to drawing FIG. 1, a mobile unit 1 which may be in the form of a handheld computing appliance such as a mobile telephone 2, is in wireless communication 3 with a network of receiving station(s) 4 to which are connected computers 5 arranged to direct data traffic via a gateway 6. A 'request' initiated in the mobile telephone depends on the physical nature (address state) of the telephone. The request 7 is passed to an application server 8 arranged to receive such requests which may contain parameters and values as inputs to general and application specific computer programming. A content assembler 10 receives data 11 from a database 12 of information relating to objects which might be addressed by mobile units from time to time. Assembled content 13 is then passed back to the gateway where encoders 14 may be used to prepare data for wireless transmission as encoded content 15 back to the mobile unit.

Figure 2:
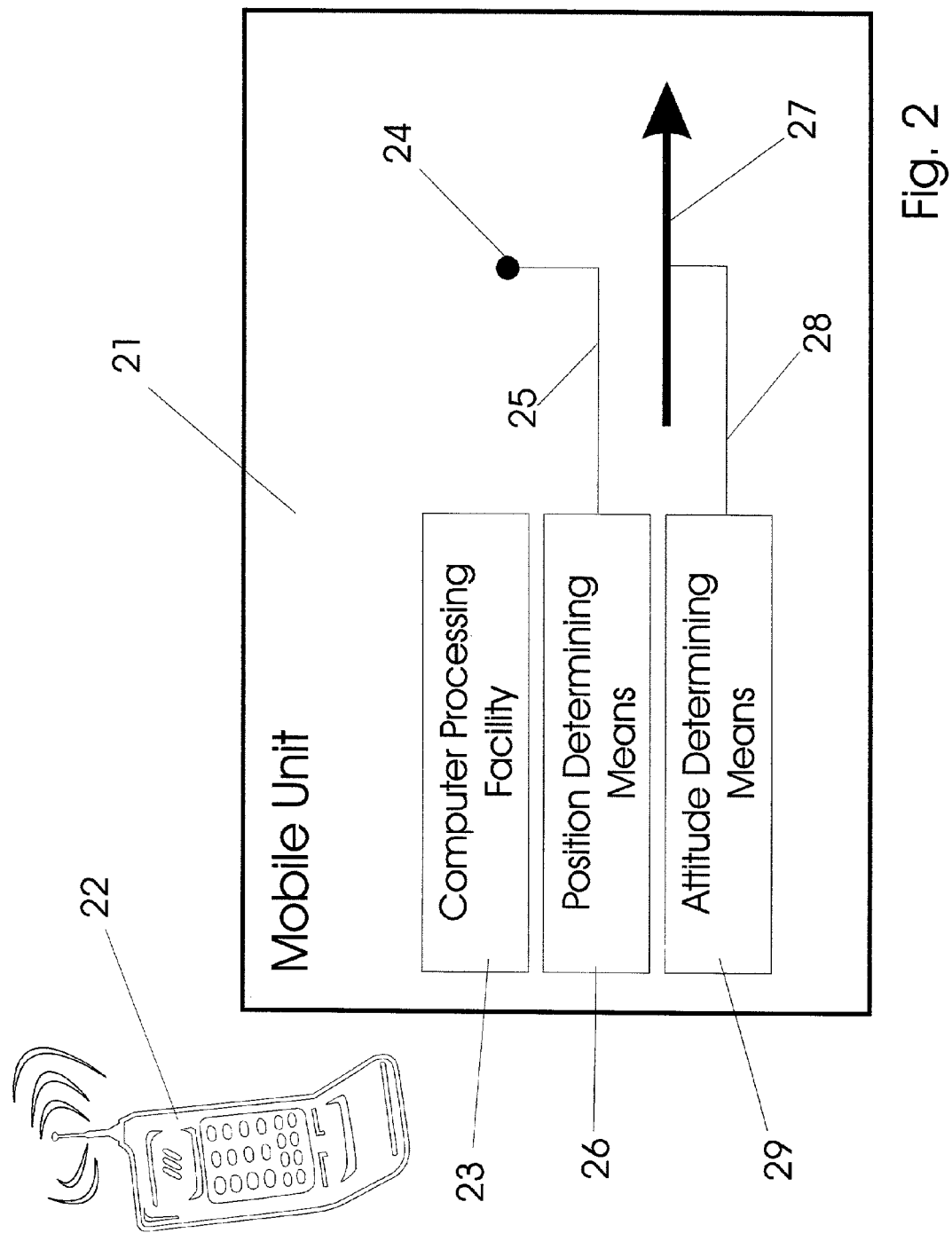
FIG. 2 is also a block diagram which details one element of the overall system.

FIG. 2 illustrates some important details regarding the elements of a mobile unit 21 in preferred versions. Embodied as a handheld wireless telephone 22, mobile units of preferred versions of these inventions have seven critical elements. A computer processing facility 23, a point reference 24 in communication 25 with a position determining means 26, and a direction reference 27 in communication 28 with an attitude determining means 29.

Although point and direction references are merely geometric constructs and do not correspond to physical elements, they are important structure essential to systems of the invention and cannot be discounted as unimportant elements due to their lack of physical being. That these elements are abstract in nature shall not detract from their important role as structureal components of a mobile unit.

It is important for readers to remain aware that a great many alternatives are possible when assembling systems over largely distributed subsystems. Although best modes are described herein, it should be stated explicitly from the outset that alternatives will not deviate from the spirit of the invention. For example, it is not essential that the position determining means be physically contained within a mobile unit. Indeed, since a GPS actually includes a plurality of satellites in orbit, it is clear that a position determining devices of perferred versions cannot be contained within the physical case of any handheld devices. Thus although a simple diagram used herein may seem to imply that a position determining means is physically contained within the mobile unit, this is generally not the case. A few examples herefollowing will cleary advance this point.

Figure 3:
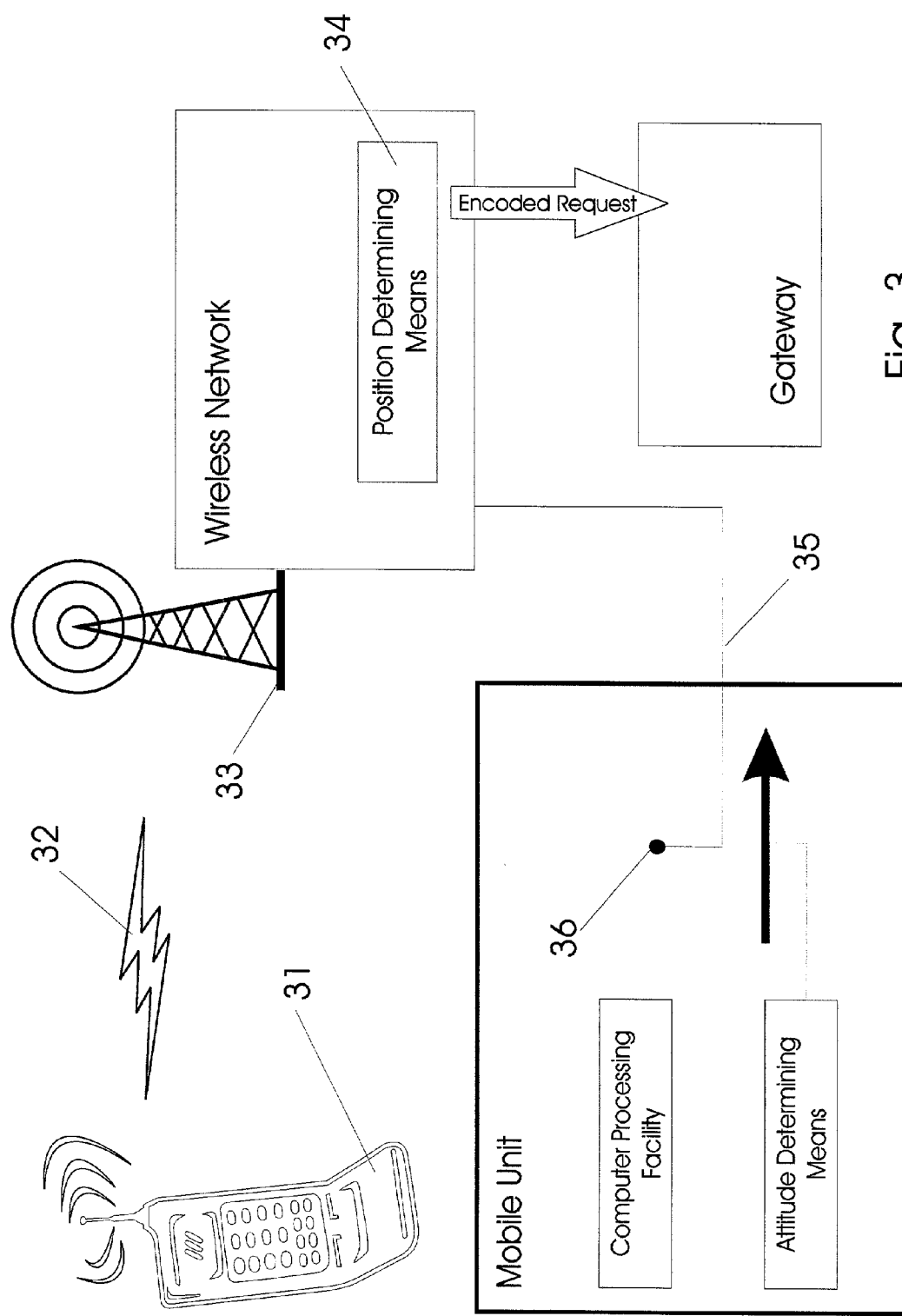
FIG. 3 is a similar block diagram directed to an alternative version of a system where one subsystem is associated with a different element.

FIG. 3 suggests that hardware of a position determining means may physically be incorporated within a wireless network apparatus. A mobile telephone 31 sends radio signals 32 to receiving stations 33 having special devices 34 to measure the time of arrival of such radio signals. Timing of received signals contains implied information about the location of the transmitting devices. Thus, position determining hardware 34 may be said to be in mathematical communication 35 with a point reference 36, the point reference being within the mobile device, the position determining hardware being in a wireless network. From this presentation, one will be reminded throughout the remainder of this disclosure that the physical location of specified elements is not to be implied with strict limitations.

Figure 4:
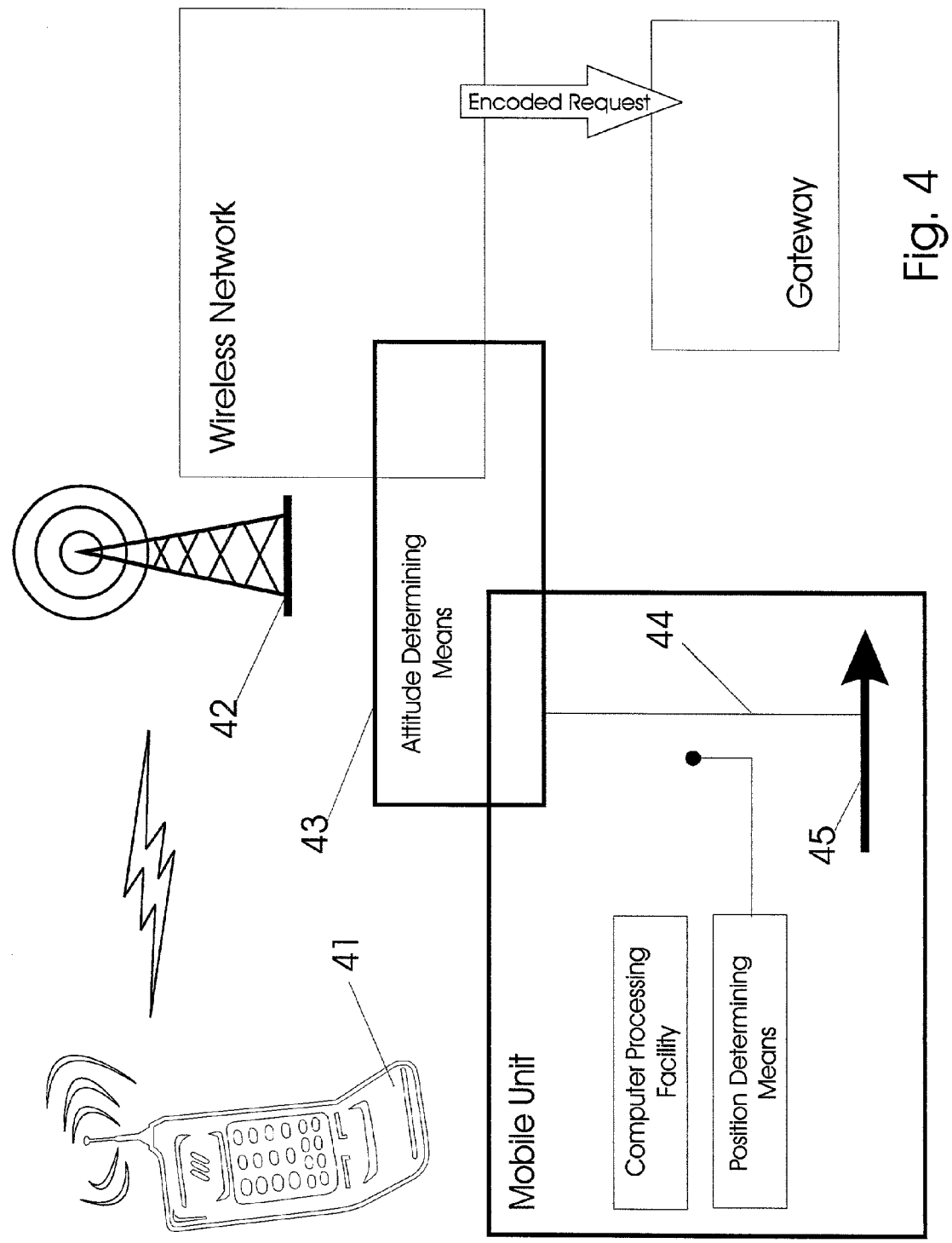
FIG. 4 is yet another alternative where a subsystem is distributed among two primary system elements.

To emphasize the point, an example may be drawn to the case where another component is distributed rather than physically confined to the mobile unit. FIG. 4 suggests that alternative relationships may occur in other versions with regard to attitude determining means. Where a system is configured with a radio direction finding technique of attitude determination, parts of the attitude determining means lie in the mobile unit 41 while other elements lie in the wireless network. Thus it can be said that the attitude determining means 43 is physically located in both places. This presentation is intended to alert one to the fact that a great deal of possibilities exist when considering the physical location of elements. Thus, the reader will be well positioned to resist temptation of attaching limitation relating to an element's physical location when considering the whole of these inventions. With this primer in mind, the following details will be well received.

Preferred Embodiment in Detail

A complete outline of the preferred embodiments portion of the disclosure is included as follows to help navigate the document and provide a most complete understanding.

| | | |
|---|---|---|
| A) | | APPARATUS |
| I. | | SYSTEM HARDWARE - PRIMARY ELEMENTS |
| | 1. | Mobile Unit |
| | 2. | A Wireless Network |
| | 3. | The Internet |
| | 4. | The Wireless Application Protocol WAP Gateway |
| | 5. | Server Computer |
| | 6. | Preprogrammed Database |
| II. | | SYSTEM HARDWARE - OTHER ELEMENTS |
| | 1. | MOBILE UNIT |
| | | A. Point reference |
| | | B. Direction reference |
| | | C. Position Determining Means |
| | |    i) Global Positioning System GPS |
| | |    ii) e-911 |
| | | D. Attitude Determining Means |
| | |    i) Solid State Magnetoresistive Sensors |
| | |    ii) Simple Magnetic Dipole Compass |
| | | E. Computer Processing Facility |
| | |    i) Input / Output for sensors |
| | |    ii) A Wireless Application Protocol browser |
| | |    iii) Code in Read Only Memory |
| | | F. Local Database |
| | | G. User Interfaces |
| | |    i) Inputs |
| | |       a) tactile switches |
| | |       b) wheels/trackballs |
| | |       c) touch pad |
| | |       d) DeltaTheta detection |
| | |       e) Voice recognition |
| | |       f) other sensors |
| | |    ii) Outputs |
| | |       a) audio |
| | |       b) visual |
| | 2. | WIRELESS NETWORK |
| | | A. Components of a Wireless Network |
| | | B. Special Function Facility |
| | |    i) Remote Machine Operation |
| | |    ii) Point-to-call Facility |
| | 3. | SERVER COMPUTER |
| | | A. Special Function Facility |
| | 4. | DATABASE |
| | | A. Geometric Descriptors |
| | | B. Multi-Media Data |
| | | C. Hierarchical Datasets |
| B) | | METHODS |
| I. | | OPERATIONAL MODES |
| II. | | SYSTEM METHODS - PRIMARY STEPS |
| | | 1. Determining Address State |
| | | 2. Preparing a Request |
| | | 3. Transmitting the Request |
| | | 4. Processing Request |
| III. | | SYSTEM METHODS - FURTHER DETAILS INCLUDED IN SOME VERSIONS |
| | | 1   User action to cause address of an object |
| | | 2   User action to cause a trigger event |
| | | 3   Determine an Address State of a Mobile Unit |
| | |    A. Application specific address indicator template |
| | |       i) initialize with defaults |
| | |       ii) user set-up |
| | |    B. Take Action |
| | |       i) Action at Server |
| | |       ii) Action at Wireless network |
| | |       iii) Action at Mobile Unit |
| | |       iv) Action at Addressed Object |
| | |       v) Action at another place |
| C) | | SPECIAL TOPICS |
| | | 1   Geometric Descriptors |

|   |   |                              |
|---|---|------------------------------|
|   | 2 | Address Indicators           |
|   | 3 | Multi-media Type Data        |
|   | 4 | Objects                      |
|   | 5 | Database Filtering           |
| D) |  | ILLUSTRATIVE EXAMPLES       |
|   | 1 | Cursor Driver                |
|   | 2 | Point to Call                |
|   | 3 | Friends and Family           |
|   | 4 | Shopping                     |
|   | 5 | Challenge Games              |
|   | 6 | Surveying                    |
| A) |  | APPARATUS                   |
| I. |  | SYSTEM HARDWARE - PRIMARY ELEMENTS |
|   | 1. | Mobile Unit                 |

In accordance with preferred embodiments, a 'mobile unit' is a portable computing appliance. Some industry experts refer to portable computing devices as wireless communications devices, wireless devices, hand-held mobile computers, et cetera. The term 'wireless' refers to the device's ability to communicate with other computers connected to a network of fixed or orbiting transceiving stations via electromagnetic communication. Devices such as a 'personal digital assistant' PDA, a mobile telephone, a personal navigation aid, are examples of mobile units into which devices of these inventions may be integrated. As functionality of some of these devices begins to overlap the functionality of the others, it becomes difficult to drawn distinction between them. For example, personal mobile telephones are commonly enabled with a programmable telephone directory. Personal digital assistants also incorporate identical function of storing telephone numbers. Since the concepts taught herein can be incorporated into a plurality of types of devices, no attempt is made to describe further the class of product in which these concepts are best placed. Accordingly, the term 'mobile unit' is used to indicate any portable computing platform and the reader will appreciate that restriction to one type or another should not be made. Further, examples presented herein may be drawn to one or another type of mobile unit without the implication that restriction to that type is intended.

Mobile units of these inventions have the following essential elements. Mobile units have a point reference and have a direction reference. Although these elements are sometimes merely geometric constructs without association to physical objects, they serve as important structural elements to which other system elements have a strong and concrete relationship. In best versions, a point reference lies roughly in the geometric center of a physical case or enclosure from which a mobile unit is comprised. Similarly, a direction reference may be arranged to correspond to a longitudinal axis of the body of a mobile unit case. As mobile unit enclosure can be formed of a hard plastic or similar material suitable for containing electronic components therein, sometimes the point and direction references are arranged with relationships to the mobile unit enclosure. In some preferred versions, an enclosure is an elongated member having a longitudinal axis suggesting the enclosure has a natural "pointing" direction. For example, a telephone handset typically has a length which is significantly longer than its width and thickness. Accordingly, a longitudinal axis is said to run along telephone handset length at the geometric center of the phone cross section. When naturally held in a single hand, the telephone handset serves as a good pointing device. Sometimes a mobile telephone handset includes a protruding antenna. The antenna further suggests a pointing direction as it is typically an elongated member which also runs along the direction of a longitudinal axis, albeit sometimes with a slight offset to the edge of the enclosure.

Mobile units of these inventions also may have computing or computer processing facility. The computer processing facility is arranged to receive input signals from specially arranged devices in communication with the computer processing facility. In particular, these input signals include those which yield information relating to the position of the point reference and the pointing attitude of the direction reference of the mobile unit. Thus it is said that the computer processor facility is in communication with or coupled to position determining means and attitude determining means. These position and attitude determining means are described in more detail below. It is important to note that in addition to position and attitude determining means, other systems which measure the physical state of the mobile unit may also be coupled to a computing facility.

Finally, mobile units of these inventions have at least one user interface. An output type user interface enables the computing facility to present information to a user. An input type allows a user to interrupt code and send signals to processor.

Mobile units of these inventions may be in communication with one or more databases of stored information. 'Communication' may be described as a chain of links including communication via a wireless network, through the Internet, to a server computer, and finally to a database; a return path being similar but in an reverse order. Thus a mobile unit can be best visualized as being coupled to the communication chain via a wireless network such as those presently used for mobile telecommunications. Accordingly, best versions of mobile units of these inventions include the same transceivers used in modern mobile telephones; for example, those developed by Qualcomm Corporation as CDMA technologies.

2. A Wireless Network

Wireless networks have been established worldwide with great success and have enabled amazing new technologies. In brief, a wireless network includes electronic means for communication with mobile devices which operate within a network's coverage. A mobile device may exchange information with surrounding fixed sites via electromagnetic communication without hardwire connections to the network. Thus, small computing devices are free to move while remaining connected to powerful information and communication systems.

A wireless network is generally comprised of a plurality of fixed transceiving stations where one station 'hands-off' a signal to an adjacent station as a mobile device moves from one coverage region, sometimes called 'cells', to another. Each of the fixed transceiving stations may be in communication with the others or a central processing whereby messages and handling instructions are passed therebetween. In addition, wireless networks may also be directly in communication with wireline networks; for example telephone wireline networks and the network of computers known as the Internet.

Examples of wireless networks include GSM, Cellular, and PCS type networks. Continuous improvements have resulted in very sophisticated systems which are being installed presently. These include the new ability to handle packet type data traffic to support interaction with other digital systems. Advance networks known as Universal Mobile Telecommunications System or "UMTS" is the European member of the family of third generation 3G mobile standards. The goal of UMTS is to enable networks that offer true global roaming and can support a wide range of voice, data and multimedia services. Proposed data rates offered by UMTS are: fast moving (vehicular) 144 kbit/s; slow moving (pedestrian) 384 kbit/s; fixed (in-building) 2 Mb/s. Commercial UMTS networks are expected from May 2001 (Japan).

Wireless networks can be coupled to the Internet to provide mobile devices with an extensive, perhaps unlimited, source of information and computing power. Information stored at a great plurality of web servers, sometimes referred to as 'content' becomes readily accessible to users of mobile devices. In addition, powerful remote computers are accessible by mobile devices which tend to be limited in their computing ability because of size and power limitations. Wireless is therefore the connection which allows small wireless devices to achieve unlimited storage and computing facility.

3. The Internet

The Internet is a network of computers in a continuous conversation unlikely to end soon. Although any single computer may terminate its connection and thus leave the conversation, the others remain in communication without effect from the absence of the exiting party. Similarly, a new computer may join the conversation at any time without causing upset to the communication scheme that connects the others.

The Internet is therefore an efficient means for computers to be connected to other computers and to exchange data and information. Computers of different types running different operating systems may be coupled to the Internet by way of communication rules known as 'Internet Protocol' IP and standards such as HyperText Transfer Protocol, HTTP; HyperText Markup Language, HTML; and eXtensible Markup Language, XML. Thus any computer to make requests of another and to receive a response therefrom.

4. The Wireless Application Protocol WAP Gateway

WAP—Wireless Application Protocol—is the bridge between mobile communication and the Internet. Because mobile devices have attributes with limitations particular to those devices, for example, limited power, limited screen size, limited bandwidth, limited keypad, among others, mobile devices are not well positioned to communicate directly with the Internet standards including the HTML standards. However, the wireless application protocol is a world standard aimed and bridging the gap between mobile devices and today's Internet.

A mobile telephone may be used to make an Internet request for information. A request formulated in the mobile unit, encoded and transmitted via the wireless network. The wireless network is arranged to communicate further with a WAP gateway which processes requests and passes them to an application server which may be positioned as a common Internet server computer.

5. Server Computer

A server computer of the instant inventions may be a computer in communication with the Internet whereby other computers can make requests thereof and receive information therefrom. By way of the route described above, a mobile device passes requests including information parameters to the application server. The request thus carries information relating to a user's needs. In particular, and with great emphasis, it is pointed out that the request carries information about the physical state of the mobile unit, i.e. its address state. Thus position and attitude parameters, among others, may be included as part of an encoded request.

In response to receiving such a request, an application processor can digest the information passed to it from the requesting client (mobile device) and determine an appropriate response. In some preferred applications, an application server searches a database of pre-programmed information to recall information which relates to the position and attitude parameters passed via the request. Therefore some database searches of these inventions are dependent upon the position and attitude information passed from the mobile unit.

6. Preprogrammed Database

Databases of these inventions incorporate important and unique data structures. In particular, data structures which connect geometric descriptor type data elements with data relating to a particular object are anticipated and taught here. Thus in preferred embodiments, a database record comprises at least a geometric descriptor associated with an object and information elements associated with the same object. Thus the database record is the 'glue' which connects information relating to an object to the object's physical being via the geometric descriptor. In this way, geometric descriptors may be used as indexing means by which information relating to objects may be recalled in a database search action.

II. System Hardware—Other Elements

1. Mobile Unit

A. Point Reference

As briefly mentioned previously, a point reference may be a mere geometric construct. However, it is essential structure with regard to apparatus of these inventions and its importance should not be discounted because of an apparent lack of size or concreteness. One will appreciate that the nature of a point reference allows it to be assigned a location which may or may not correspond to a physical element. Thus, a point reference may be for example assigned a location described as two meters to the left of a certain object where that location is merely a location in space occupied by nothing.

In systems of these inventions, position measurements are made. These measurements are made with respect to the point reference and some arbitrary frame of reference. For example, a frame of reference coordinate system may be adopted whereby location or position is described by a latitude, longitude and altitude values. Preferred versions of these inventions include a point reference which is coupled to a position determining means whereby the position determining means operates to measure the position of the point reference in a particular frame of reference.

B. Direction Reference

Similarly, a direction reference may also be merely a geometric construct. In agreement with the common definition of a 'vector', a direction reference has an endpoint and infinite extent along a line in one direction away from the endpoint. A direction reference is essential structure with regard to apparatus of these inventions and its importance should not be diminished because of its apparent lack of size or concreteness. A direction reference may be assigned such that it may or may not correspond to a physical element such as an elongated pointer.

In systems of these inventions, attitude measurements are made. These measurements are made with respect to the direction reference and some arbitrary frame of reference. For example, a frame of reference coordinate system may be adopted whereby tilt, roll and pitch values may be measured and specified. Preferred versions of these inventions include a direction reference coupled to an attitude determining means whereby the attitude determining means operates to measure orientation of the direction reference.

In some versions, a spatial relationship exists between the point reference and the direction reference. A point reference may be arranged to be coincident with an origin of a vector which represents the direction reference.

C. Position Determining Means

A position determining means is coupled to and arranged to determine the position of the point reference. Further, the position determining means is coupled in a manner which allows position measurements to be passed into requests conveyed to an application server.

In some preferred versions of these inventions, the position determining means is at least partly integrated within the mobile unit. In alternative versions, a position determining means is arranged to determine the position of the mobile unit (via a point reference) but the hardware from which it is comprised is part of the wireless network or other external apparatus. Accordingly, a position determining means may exist within the mobile unit or within the wireless network without loss of generality. For purposes of this disclosure, the limitation of a 'position determining means' is met when means are arranged to determine the position of a point reference associated with a mobile unit.

i) Global Positioning System GPS

In devices where position determining means is integrated within a mobile unit, a first preferred arrangement has a Global Positioning System GPS receiver contained in the mobile unit case. A GPS receiver is sufficiently small in size whereby it is easily incorporated as a portion of an electronic hand-held device. The accuracy of position measurements made by a GPS receiver is quite good and within the required parameters necessary for devices of these inventions which sometimes rely on accurate position measurements. Similarly, energy consumption is low in GPS receivers which are engineered to be conservative with respect to energy consumption. In agreement, devices of these inventions may use an off-the-shelf GPS receiver available from original equipment manufacturer suppliers such as GARMIN International of Kansas City.

By referring to the drawing figures appended hereto, and in particular FIG. 5, one gains a more complete understanding of how a GPS is coupled with systems of these inventions. The global positioning system is a satellite-based navigation system consisting of a network of orbiting satellites 51 that are eleven thousand nautical miles in space and in six different orbital paths. The satellites are constantly moving, making two complete orbits around the Earth in just under 24 hours or about 1.8 miles per second.

GPS satellites are referred to as NAVSTAR satellites. Transmitter power is approximately 50 watts, or less. Each satellite 52 transmits two signals 53, L1 and L2; civilian GPS uses the 'L1' frequency of 1575.42 MHz. Each satellite is expected to last approximately 10 years. Replacements are constantly being built and launched into orbit.

The orbital paths 55 of these satellites take them between roughly 60 degrees North and 60 degrees South latitudes. Accordingly, one 54 can receive satellite signals anywhere in the world, at any time. As one moves close to the poles, the GPS satellite signals remain available. They just won't be directly overhead anymore. One of the biggest benefits over previous land-based navigation systems is GPS works in all weather conditions.

The GPS signal contains a 'pseudo-random code', ephemeris and almanac data. The pseudo-random code identifies which satellite is transmitting—in other words, an I.D. code. We refer to satellites by their PRN (pseudo-random number), from 1 through 32, and this is the number displayed on a GPS receiver to indicate which satellite(s) is(are) being receiving.

Ephemeris data is constantly transmitted by each satellite and contains important information such as status of the satellite (healthy or unhealthy), current date, and time. Without this part of the message, your GPS receiver would have no idea what the current time and date are. This part of the signal is essential to determining a position.

Almanac data tells the GPS receiver where each GPS satellite should be at any time. Each satellite transmits almanac data showing the orbital information for that satellite and for every other satellite in the system.

Each satellite transmits a message which essentially says, "I'm satellite #X, my position is currently Y, and this message was sent at time Z." GPS receivers read the message and saves the ephemeris and almanac data for continual use. This information can also be used to set (or correct) the clock within the GPS receiver.

To determine position, a GPS receiver compares the time a signal was transmitted by a satellite with the time it was received by the GPS receiver. The time difference tells the GPS receiver how far away that particular satellite is. If distance measurements from a few more satellites are added, triangulation techniques yield a position measurement. This is exactly what a GPS receiver does. With a minimum of three or more satellites, a GPS receiver can determine a latitude/longitude position—sometimes called a 2D position fix. With four or more satellites, a GPS receiver can determine a 3D position which includes latitude, longitude, and altitude. By using a series of position measurements, a GPS receiver can also accurately provide speed and direction of travel (referred to as 'ground speed' and 'ground track').

A typical civilian GPS receiver provides 60 to 225 feet accuracy, depending on the number of satellites available and the geometry of those satellites. More sophisticated and expensive GPS receivers, costing several thousand dollars or more, can provide accuracy within a centimeter by using more than one GPS frequency. However, a typical civilian GPS receiver's accuracy can be improved to fifteen feet or better (in some cases under three feet) through a process known as Differential GPS (DGPS). DGPS employs a second receiver to compute corrections to the GPS satellite measurements. The U.S. Coast Guard and U.S. Army Corps of Engineers (and many foreign government departments as well) transmit DGPS corrections through marine beacon stations. These beacons operate in the 283.5–325.0 kHz frequency range and are free of charge. DGPS Beacon Receiver may be coupled to a GPS receiver via a three-wire connection, which relays corrections in a standard serial data format called 'RTCM SC-104.' ii) E-911

An alternative position determining means may be arranged as part of the wireless network. In consideration of the time of arrival of radio signals at multiple receiving stations a position measurement of the transmitting device may be effected. Sometimes referred to as 'e911' positioning, the system is being considered for installation in wireless networks for use in determining locations of callers for example in times of emergencies. In this arrangement, the load on the mobile unit is lighted as power and space requirements are removed from the mobile unit and placed at the wireless network which has much greater tolerance of these parameters.

In systems where the PDM is in the wireless network, an encoded request is received at the wireless stations with attitude information but without position information. The wireless network computers then compute position information and attach that to the encoded request. Finally, that encoded request is transmitted to the WAP gateway where the request has position and attitude information therein. It is important to recognize that although position determining hardware is physically located in the wireless network, that hardware is coupled to a point reference associated with the mobile unit. Accordingly, position measurements are made of the mobile unit regardless of the actual location of the position determining means.

Although best configurations anticipated either have a GPS or E-911 type position determining means, it is recognized that some versions may rely upon other positioning systems. With respect to these present inventions, there is to be no importance place with regard to any particular type of position determining means so long as that means is arranged to determine the position of a point reference associated with the mobile unit. Thus any conceivable manner of determining position of a point reference in a mobile unit is considered part of these inventions.

D. Attitude Determining Means

An attitude determining means is coupled to and arranged to determine the attitude of the mobile unit direction reference. Further, the attitude determining means is coupled in a manner which allows attitude measurements to be passed into requests conveyed to an application server.

In some preferred versions of these inventions, attitude determining means are integrated within the mobile unit. In alternative versions, it is arranged to determine the attitude of the mobile unit but the hardware from which it is comprised is part of a wireless network or other external apparatus.

For purposes of this disclosure, the limitation of 'attitude determining means' is met when means are arranged to determine the attitude or 'pointing direction' of a direction reference associated with a mobile unit.

i) Solid State Magnetoresistive Sensors

Preferred versions of attitude determining means include solid state devices arranged to sense magnetic fields natural about the Earth's dipole. A determination of the strength of magnetic fields in three orthogonal directions allows one to compute a pointing attitude. Mobile units of these inventions can be integrated with such solid state devices and supporting hardware whereby pointing actions can be monitored and measured. These solid state sensor packages are available as off the shelf items ready for integration. For example Honeywell three-axis magnetic compassing sensor attitude reference HMC2003 based on magnetoresistive principles.

At the earth's surface, the Earth's magnetic field intensity is about 0.5 to 0.6 gauss and has a component parallel to the Earth's surface that always points toward magnetic north. This is the basis for all magnetic compasses. Anisotropic Magnetoresistance AMR sensors are best suited for electronic compasses since their range of sensitivity is centered within the Earth's field. The Earth's magnetic field can be approximated with the dipole model shown in FIG. 6. This figure illustrates that the Earth's 61 magnetic fields 62 point down toward North in the northern hemisphere, is horizontal and pointing north at the equator, and points up toward north in the southern hemisphere. In all cases, the direction of the Earth's field is always pointing to magnetic north. It is the components of this field that are parallel to the Earth's surface that are used to determine compass direction. The vertical portion of the Earth's magnetic field is ignored. To achieve a one degree accurate compass requires a magnetic sensor that can reliably resolve angular changes to 0.1 degrees. The magnetic fields in an X and Y plane will typically be in the 200 to 300 milligauss range-more at the equator, less at the poles. Using the relationship:

$$\text{Azimuth} = \arctan(y/x)$$

the required magnetometer resolution can be estimated. To resolve a 0.18 change in a 200 milligauss field would require a magnetic sensitivity of better than 0.35 milligauss. Solid state magnetoresistive sensors are available today that reliably resolve 0.07 milligauss signals giving a five times margin of detection sensitivity. Often compasses are not confined to a flat and level plane. As devices of the present invention are preferably hand held, it is difficult to determine an azimuth associated with the reference or heading direction since the compass is not always horizontal to the Earth's surface. Errors introduced by tilt angles can be quite large and depends on the tilt angle. A typical method for correcting the compass tilt is to use an inclinometer, or tilt sensor, to determine roll and pitch angles illustrated in FIG. 7. The terms 'roll' 71 and 'pitch' 72 are commonly used in aviation: roll refers to the rotation around a forward direction indicated in the drawing as 'X', and pitch refers to the rotation around a left-right, direction indicated as 'Y' in the figure. Liquid filled tilt sensors use electrodes to monitor fluid movement as the sensor changes angles. Newer solid state accelerometer tilt sensors are available that measure the Earth's gravitational field by means of an electromechanical circuit. The outputs of these devices are electrical signals equivalent to angles of tilt.

To compensate a compass for tilt, knowing the roll and pitch is only half the battle. The magnetometer must now rely on all three magnetic axes (X, Y, Z) so that the Earth's field can be fully rotated back to a horizontal orientation. In FIG. 7, a compass is shown with roll 71 and pitch 72 tilt angles referenced to the right and forward level directions of the mobile device. The X, Y, and Z magnetic readings can be transformed back to the horizontal plane ($X_H$, $Y_H$) by applying the rotational equations shown below:

$$X_h = X \cos\phi + Y \sin\phi - Z \cos\theta \sin\phi$$

$$Y_H = Y \cos\theta + Z \sin\theta$$

$$\text{Azimuth} = \arctan\left(\frac{Y_H}{X_H}\right)$$

Once the X and Y magnetic readings are in the horizontal plane, the equation for azimuth in a horizontal plane can be used to determine the azimuth with a tilt bias.

A block diagram for a tilt compensated compass is shown in FIG. 8. After the azimuth is determined, the declination correction can be applied to find true north according to the geographic region of operation. Solid state magnetic sensors 81, cooperate with tilt sensors 82, to arrive at signals which are processed digitally 83 in a computing apparatus. The entire device has been made quite small and versions are easily integrate with common wristwatchs.

ii) Simple Magnetic Dipole Compass

Systems which include solid state sensors described above are certainly preferred because of their accuracy and versatility. However, simpler versions of these inventions also yield considerable benefit. Because modern telephones do not yet come equipped with attitude sensing apparatus, and integration of those types of semiconductors with small telephones presents a significant engineering challenge, alternative versions are presented here where a simple dipole compass is used with user input operations to provide information regarding the address state of a device. As such, a dipole compass in combination with user inputs is considered 'attitude determining means' for these simplified versions.

FIG. 9 shows a hand-held mobile type telephone 91 with keypad and flip type mouth piece. Upon turning 92 the phone over to expose the backside 93 one can appreciate that there is considerable space for incorporating mechanical elements such as a compass 94. A simple dipole compass may consist of a pointer needle having a magnetic bias which is set to float in a liquid where it may freely turn about an axis. When exposed to the Earth's magnetic fields, the dipole aligns itself such that it points to magnetic north. Although a simple dipole compass is very ineffective when a telephone is held upright as shown, the compass becomes operable when the phone is held substantially level in a horizontal plane.

FIG. 10 presents a mobile telephone 101 lying in a near horizontal plane having a simple dipole compass 102 on its backside. A pointing needle 103 is aligned with the Earth's magnetic fields. Used in proper fashion, the telephone, and consequently the compass, is rotated about a vertical axis 104 to cause the floating needle to become further aligned with indicia 105 on the compass bezel 106 which indicates North. In this way, a user can determine the pointing attitude of the telephone and reference direction 107 with respect to Earth's magnetic North.

With reference to FIG. 11, a mobile telephone 111 is presented substantially in a horizontal plane with reference direction 112. The telephone bottom portion is configured with special mechanical interlock devices 113 whereby an add-in 115 unit may be firmly coupled to the telephone at the bottom by inserting 114. The add-in unit is accompanied by a simple compass 116 having pointing needle 117.

Although general purpose compasses used in conjunction with maps and charts are quite conveniently arranged with a reference to the direction North, it is not necessary in systems which relate to these inventions that emphasis be placed on North as a reference direction. It is also not necessary that a needle type dipole be used. Instead, it serves as a great simplification if the dipole is configured as a disk rather than a needle and is made to freely rotate in fluid and become aligned with the Earth's magnetic field. As the phone is pointed in various directions, the disk aligns itself appropriately to reveal directional information. Indicia on the disk directly references the direction in which the mobile unit is pointing.

Thus, in improved versions, a floating disk which may be integrated into an add-in module 121 allows the telephone 122 and consequently the reference direction to be pointed in a direction of interest while a disk 123 rotates about a vertical axis 124 to align indicia 125 with a reference mark 126. A careful observer will note that indicia shown appears in a viewing window having magnifying properties thus improving readability of very small compass devices. Upon determining the direction of interest via visual observation of the compass, a user can enter that information by way of tactile manipulation of a keypad or other user input interface. As illustrated, simple dipole compass as described can be affixed to the back of a telephone by a user as an 'after market' addition. A common telephone purchased at the time of this writing is easily modified with the addition of a compass so attached to its backside.

Because a compass arranged as taught here is quite slim and mechanically simple, it is easy to integrate directly with the case of a mobile telephone unit. In some circumstances, it can be integrated with an accessory such as a battery housing. FIG. 13 shows a streamlined mobile unit 131 having a reference direction 132 and dipole disk compass integrated therein the back side of the unit housing. Indicia 133 is visible through a window 134 with a lens.

Special Indicia for Mobile Wireless Systems

As mentioned, mobile electronic devices tend to have limited facilities. Power, weight, screen size, et cetera are all limited by the portable nature of the devices. In addition, the key pad generally used with mobile telephones is limited in the number of keys available for user input. Further, because encoding protocol used in wireless devices is aimed at cooperating with such brief keypads, user input is limited in that regard also. Therefore, a special scheme is devised whereby the directions about a compass, are translated to cooperate with a 10-key keypad of a mobile unit as follows.

Recall that the 10-key keypad having numerals 0–9 is arranged in three rows and three columns with a '0' key centered thereunder. It is a useful mnemonic to envisage the 10-key keypad superimposed upon a simple compass rose including the eight primary points of the compass directions: North, South, East, West, Northeast, Southeast, Northwest, Southwest. In this proposed scheme, North is meant to correspond to the '2' key of the keypad which lies in the upper middle of the keypad in a standard arrangement. South is aligned with the '8' key, '6' being East, and '4', West. It then follows that the '7' key is Southwest, and the other keys assignments logically follow. Curiously, this scheme which assigns a key to each of the eight points of a compass, leaves the '5' key and the '0' unused.

With the otherwise unused keys '5' and '0', the scheme is further arranged to provide a prefix to the points described about. Using the '0' key as a prefix to any of the other keys indicates the direction assigned to the key minus 25 degrees. For example: The '7' key is assigned to Southwest, which is 225 degrees. If a '0' prefix is used before a '7' key, then the direction being refereed to is 200 degrees. Similarly, the '5' key is used as a prefix to indicate the value of the assigned key plus 25 degrees. Therefore, composing a '5' and a '7' causes the direction input to be 250 degrees. With this special coding scheme, one simplifies the process of alerting the system as to a particular direction of interest. This can be more readily appreciated in view of the drawing figure ~N which shows a single number in a windows. By pointing the phone to an interesting object, reading the number from the back of the phone, entering the number read via the keypad, the system has identified the direction of interest and can form a request accordingly. Since the number in the figure shown in the window is '57'; a user is prompted to press index key '5' followed by direction key '7' to indicate 250 degrees as the direction of interest. Thus, this process relieves even most basic of users the complexity of using a compass and translating directions.

E. Computer Processing Facility

A computer processor arranged to run programming in the form of instruction sets is provided within mobile units. The computer processing facility includes typical supporting elements such as: memory, bus, display, input/output, power supply support et cetera. A general processing facility may be preprogrammed via stored code in a ROM type memory, or may be a generalized processor arranged to execute stored code as well as code received from external devices.

i) Input/Output for Sensors

To support input and output operations, a computer processing facility may be configured with special means of communication between devices such as sensors and other measurement apparatus. Similarly, programming running on the computer processing facility may include support for interupts and messaging technique which interacts with or responds to signals present at input and output ports.

ii) A Wireless Application Protocol Browser

Development of 'Wireless Application Protocol', or 'WAP', is being driven by the WAP Forum, initially founded by Motorola, Nokia, Ericsson and Unwired Planet now more precisely known as 'Openwave'. Since its inception, the WAP Forum has grown dramatically and now comprises over 80 members drawn from the world's leading mobile telecommunications and software companies.

WAP is a technology designed to provide users of mobile terminals with rapid and efficient access to the Internet. WAP is a protocol optimized, not only for use on the narrow band radio channels used by second generation digital wireless systems but also for the limited display capabilities and functionality of the display systems used by today's mobile terminals. WAP integrates telephony services with microbrowsing and enables easy-to-use interactive Internet access from the mobile handset. Typical WAP applications include over-the-air e-commerce transactions, online banking, information provisioning and messaging. WAP will enable operators to develop innovative services to provide differentiation in competitive market environments.

Devices of these inventions therefore may include a module known as a WAP browser. This browser is implemented in software and allows devices to communicate with the WAP gateway by way of wireless networks.

iii) Preprogrammed Code in ROM/RAM

Although one may envisage a 'device' as consisting of hardware elements only, it may be instructive to include software as part of the device. Software or computer instruction code may be stored in a memory such as a RAM module which is part of the computer processing facility. Alternatively, a memory device such as a CD-ROM may be employed to run programming particular to a certain application. That an infinite number of applications are possible should not disturb the notion that a pointing device responsive to position and attitude measure is a unique invention in and of itself without regard to any particular application associated with that functionality.

F. Local Database

Although most preferred versions of the inventions described include communication with a remote server having a database, it should be noted that some versions will employ a local database as well.

A local database can be envisioned as a database separate from a system main database. In some versions of these inventions, a specialized request is sent to a server computer who returns as a response a small portion of a primary database. In effect, this database may be a subset of the data stored in the primary database but may be useful in the mobile unit as a temporary database of limited extend for quick searching and other operations which do not generate a new call/request through a network.

An illustrative example works as follows: On initiation, a system make be arranged to take a preliminary position measurement. This measurement may result in the determination that the user is in a particular city; for example San Francisco. Upon this conclusion, a remote server may send a data set of anticipated targets, i.e. those targets in San Francisco, to a database cache. When a more precise position measurement and an attitude measurement are combined to suggest an address indicator the cache may be searched first as it has been preloaded with a primary data set. In this scheme, it is not necessary to transmit a request and response through a network, but rather the entire process would be handled within the mobile unit and with regard to a limited database held there.

A local database may also be set-up as an empty template which operates to receive data therein in response to actions applied to the mobile unit. For example, a mobile unit may be set into a program mode to collect data in accordance with a particular scheme. In one scenario, a salesman of lawn fertilizer may be interested in generating a mailing list of customers who are particularly in need of lawn fertilizer products. While driving down a residential street, the salesman may use a mobile device of these inventions to address houses with poor quality or unhealthy lawns. Upon being addressed, mailing information associated with a particular house may be pulled from the primary database containing all houses and entered into a local database of houses to be sent an advertisement relating to lawn fertilizer. Of course, many other scenarios may be set forth where actions applied to a mobile unit stimulate construction of a local database. It is impossible to present an exhaustive list of these and no attempt at such is made here. However, it will be noted that in any such operation, it is to be considered a version of these inventions so long as actions applied to a mobile unit as described cause a database to become populated with data.

G. User Interfaces

User interfaces may be included as elements in a mobile unit. Interfaces of these inventions may be classified as either an input type interface or an output type interface. Input type interfaces are arranged to convert physical conditions external to the system into electronic signals which may be processed by the systems. Output interfaces convert system electronic signals into physical embodiments perceptible to observers users of the systems. Electronic transducers and transducer systems are coupled to mobile unit computing processing facilities by input or output communications ports and operate as either input or output type interfaces.

i) Input Interfaces

Some examples of input type user interfaces include, but are not limited to, tactile switches, wheels, trackballs, keypads, touch pads, angular displacement detectors, voice recognition systems. Although the following presentation illustrates some of the anticipated uses of input interfaces, it is impossible to catalogue all possible uses in the limited space of this disclosure in view of improving readability and understanding. Accordingly, it will be appreciated that systems which employ input interfaces not described here explicitly will remain systems of these inventions as long as they incorporate all other elements and a element meeting the general description an 'input interface'.

a) Tactile Switch

Perhaps the most important input interface is a simple tactile switch. To perform and realize a 'click' event, a simple switch operable under influence of finger actions is arranged. Analogous to the buttons of a mouse type peripheral computer device, a tactile switch may be arranged as a button which may be easily engaged by a human finger.

A tactile switch yields exceptional utility because it may be associated with any of a great plurality of computer actions which may be offered at appropriate times during the runtime of a computer program. Code may be prepared such that the computer is set to respond in a particular way whenever a click event, i.e. an operation of the tactile switch, is detected. Accordingly, best versions of systems of these inventions include an apparatus having a tactile switch arranged to generate click events which are detected by computer processing facilities.

A illustrative example include the 'send' key of a mobile telephone. Upon stimulation of the send key, a mobile telephone is set into an operation wherein a connection to another telephone is created. On systems of these inventions, a keypad may include a 'get' key which activates a processing step and forms a request for information.

b) Wheels and Trackballs

Wheels and trackballs are tactile devices providing a continuous or analog signal of increasing amplitude rather than a discrete or non-linear signal associated with a switch. Thus a wheel or trackball may be associated with functions such as zoom or volume controls which are more closely associated with analog type adjustments. In some applications where an input interface is used, a wheel or trackball tactile device is employed to provide a continuous analog input.

c) Touch Pad or Touch Screen

Another type of tactile device which may be used in various apparatus of these inventions is the touch pad type device. A touch pad allows one to drag a fingertip across a sensitive surface which provides position indication to the system. Generally a button or two are placed in close proximity for the purpose of 'click', 'left-click' and 'double-click' type interactions.

A touch screen device marries an image display screen where information is displayed thereon and associated with a position on the screen and that position on the screen is addressable via touch actions generated with a user's fingertips. As such, 'clicks', or more precisely screen 'taps' serve as stimulus or events to launch programming.

d) Angular Displacement Detection System

Another input-type user interface includes a system to detect displacements which are rotational or angular in nature. These may be accelerometers, gyroscopes or electronic compass devices. When a mobile unit is manipulated in a predetermined manner, i.e. moved in a manner described as an angular displacement, the mobile unit may cause an associated response. For example, a display showing four options in a listbox with one option having a focus property indicated by a highlighted background. Upon wanting to choose one of the non-selected items in the list, a user can cause the mobile unit to be rotated about a horizontal axis to cause the forward end dip. Upon detecting such motion, the focus can be switched to a successive item in the list. Repeated similar motions cause the focus to pass from one item to another in the list.

Obviously, this simple example suggests how well known computer interface tools, a 'listbox' and 'focus indicator', and operation thereof, in a unique way via motion of a mobile device, in particular angular displacement motion.

e) Voice Recognition System

Voice recognition systems may be employed to drive computer commands in a normal fashion. Because mobile telephones are well equipped with audio devices such as a speaker and microphone, some versions of these inventions will employ voice recognition to interface with the underlying computer processing facility.

f) Other Sensors

Other sensors may be used to provide measurement information relating to matters such as atmospheric pressure, outside temperature; wind speed, wind direction, background audio level, humidity; time; interdependant parameters such as those which depend on more than one parameter, for example position and time, parameters 'velocity' and 'acceleration' are of this type.

ii) Output Interfaces a) Audio

Audio indicators, for example buzzers and speakers, may be used to communicate with human users by way audio cues and signals. In a 'finder' application for example, a mobile unit can be set into an operational mode whereby a pan operation or scan motion allows the device to produce a 'beep' response in connection with a the unit being aligned with a selected type target.

b) Visual

Mobile units of some preferred embodiments may include output interfaces for providing a visual feedback signal to a user. For example, visual type output interfaces such as a simple text display may serve to provide text information. Preferred pixelized displays including color pixel elements are quite common and becoming very inexpensive. Even single LEDs may be appropriate for use as user interfaces in some simple versions of these inventions.

2. Wireless Network

A. Components of a Wireless Network

A wireless network may be thought of as a communication link between two terminal ends. In the most common of wireless networks, a mobile telephone handset forms a first of the terminal ends. In some specialty applications a personal digital assistant PDA, or a simple laptop computer may describe the appliance which forms the terminal end of a wireless network link.

A second terminal end is typically a wireline telephone, but may alternatively be: another wireless telephone handset, a computer, a PDA, et cetera. Either terminal end communicates with another via transmission of radio signals. Radio signals may propagate from a terminal end to a receiving station. A receiving station, sometimes referred to as a 'cell site', may be connected to a wireline network. In special cases, cell sites may operate to direct certain transmissions into the Internet via a WAP gateway. In this configuration, a wireless network is sometimes referred to as 'mobile Internet' or the 'wireless web'. Some best mode versions of the invention anticipate use of a wireless network in a 'wireless web' configuration, in particular, a wireless network having as a portion thereof, a WAP gateway member.

Thus, mobile units of the invention may communicate with server computers in agreement with wireless protocol presently in service. Although WAP is presently leading technology, it is not an essential element whereby its absence would cause defects in any of the devices suggested here.

It is hereby acknowledged that WAP is designed and directed to second generation of wireless networks and simple display screens. It is not yet certain that the protocol used in newer wireless networks such as UMTS or HDR will bear the name 'WAP'. It is however certain that some standard will prevail and that standard will allow wireless devices to communicate with application servers connected to the Internet. A good faith effort to meet 'best mode' requirements suggests the detailed description of WAP be provided herein.

Accordingly, one will appreciate that these inventions do not depend upon the WAP standard and will work equally as well when a new protocol arrives. One will fully understand that mobile units convey requests which includes description of the physical state of the mobile unit, in particular position and attitude information, and that information is used in execution of a special database search to retrieve data relating to objects having a spatial relationship with the requesting mobile unit.

B. Special Function Facility

Wireless networks of these inventions can be set-up to include special function facilities. For example, while generalized hardware in a wireless network may include transmitters, computers and wireline interconnects, specialized hardware may be integrated to perform certain special function. A terminal in the network may include machinery which can be triggered to perform a desired task.

i) Remote Machine Operation

To illustrate this point, the reader is reminded the extraordinary city named Breukelen near Utrecht in Holland has many canals. These canals include a devices known as 'locks' which require the attention of a lock master when a boat is to pass from a first canal to another. When a mariner arrives at a lock where the lock master has left his post, the mariner is necessarily delayed until the lockmaster returns. To alleviate this problem, a mariner equipped with a mobile device of these inventions could merely point the device toward the lock system. In response, the server computer determines the mariner is addressing the lock and presents the mariner with a list of choices. Upon designation of a command to open and flood a portion of the lock, the wireless network transmits the request to the special function facility, i.e. a pump and gate system, the lock is operated without the attention of the lock master. This example illustrates how a wireless network terminal in the form of a special function facility may cooperate with devices of the invention to allow a user to choose and operate a machine remotely by merely pointing at the system and interacting with a graphical user interface.

ii) Point-to-Call Facility

Another example of a special function facility of particular importance is herein referred to as a 'point-to-call' facility. Mobile units placed in a certain operational mode may trigger a request which is transmitted to the wireless network. This request directs the wireless network to place a telephone type connection to any telephone in the world. Thus, by merely pointing to any object to which a telephone may be associated, and further by executing a 'send' type command, a user may initiate a telephone call. The portion of the wireless network which operates to process these types of requests may be considered the special function facility. Well trained wireless engineers will note that these requests may be captured and processed without need to install additional equipment; i.e. the wireless computers in place today may be arranged to handle 'point-to-call' requests from mobile customers.

3. Server Computer

A server computing unit of these inventions is charged with tasks including handling requests from a client unit. In preferred versions, a mobile unit or handset unit transmits a request over a wireless connection to a remote server computer which hosts a database and modules to handle such requests. It is important readers note that it is not considered a necessity that the server computer be remote from the client. Indeed, it is entirely possible that a server computer be an integral part of a handheld device in some alternative versions. Due to power and space, among other constraints, best mode versions may have a server remotely located and in communication with handheld units.

In all cases, server computers are arranged to receive and process requests. Primarily, this task includes receiving address indicator information and forming a database query, performing a database search, receiving search results, transmitting those results to the requester.

Thus, important structural components of server computers of these inventions include provision for receiving requests, means for executing programming code, means of forming connections and communications with databases, and means for transmitting results back to a requester.

B. Special Function Facility

Special components of server computers may include a special function facility in the form of a programming module arranged to perform a particular desired function. For example, a server may be set-up to log all activity of a particular user. Where security requires records be kept of system transactions, a special function facility may be set to record transactions made by selected users. A server computer in normal operation receives requests, performs database searches, transmits results, and carries out the special function of logging the transactions taken.

4. Database

A database is considered an essential element of devices of the invention. An extremely unique data structure is formed where general information relating to an object is connected to and associated with a multi-dimensional spatial description of the object. This connection between information and spatial description allows the database to be searched in a manner which allows data to be recalled in response to an alignment of a handheld unit with regard to the spatial description. This important aspect should not be overlooked as it remains a key to a full understanding of these inventions. The essential 'glue' is the association between a geometric descriptor which describes a space associated with an object and general information relating the object. In this way, information may be recalled in response to a test for the condition whereby the address state of a mobile unit forms an intersection with a geometric descriptor. With reference to FIG. 14, an application server 141 having a search module 142 cooperates with database 143. Data may be kept in a matrix of high order whereby a record 144 relates to a unitary object comprising at least a geometric descriptor element 145 and additional multimedia data elements 146.

This important relationship embodied by the database record allows recall of information elements relating to an object via the object's geometric descriptor. An expert database designer will recognize that many database designs could be configured to serve functions of these inventions. Thus, there is no benefit in proposing any particular scheme and that is left as an engineering task. It is sufficient to say that a database is formed with prerecorded information relating to objects where that information includes both a definition of some spatial extent associated with the object and some multi-media data associated with the object.

A. Geometric Descriptors

A geometric descriptor is a definition of the spatial extend which is associated with an object. For example, a certain building on a particular city block may be said to occupy a cubic shaped space which may be specified by mathematically. Thus the building is said to have a geometric descriptor associated therewith which defines the space substantially occupied by the building.

B. Multi-Media Data

In addition to a geometric descriptor, a database record also has multi-media data associated with the object. Digitally recorded information such as audio files such as those known as '.wav' or midi, video files such as MPEG, simple text lists, text fields, graphics, photographs, control objects, et cetera, among others, are examples of multi-media data which may be included in an object record as 'information elements'.

C. Hierarchical Datasets

In advanced versions, both information elements and geometric descriptors may be arranged in hierarchical datasets. As such, a single field element of any record may be defined as another record containing a plurality of field elements. In this way data and data structures may be arranged in a 'nested' fashion without practical limits as to the depth. Even in hierarchical data structures, it is important to note the connection which lies in all data structures. Data arrangements invented and described here include an association between a geometric descriptor and an object having some spatial extent connected therewith. In this way, the physical state of a mobile unit causes a database pointer to become connected to various data stored in the database without regard to the precise database schema.

B. Methods

I. Operational Modes

Mobile units are set into various operational modes via computer code running on the computing facility. Because programming code is highly dynamic and easily changed from one application to another, mobile units may be operated in various operational modes.

In some preferred versions, a mobile unit computing facility includes programming directed to providing adjustments in functionality whereby various subsets of instructions are selectably executed, each corresponding to a different 'operational mode' or application specific arrangement. A system user may, by keypad entry or other control, change the operational mode of a mobile unit from a currently running mode to another mode, in accordance with various user desires which change from time-to-time.

Operational modes may change automatically. Certain device arrangements may provide for a change in operational mode when a mobile unit is carried into a region, as detected by a position determining means, where actions of interest are anticipated in view of the current position of the mobile unit. For example, a certain user leaving the city of San Diego, Calif. after a portion of the 'Hot Rum' winter sailboat racing series may find herself making the transition from San Diego Bay to the international airport at Lindburg field, immediately next to the port. As the user's location changes from the harbor to the airport, devices of the invention may anticipate that the user is no longer interested in navigational aids such as bouys, ranges, and day shapes, but rather is now interested in gate locations and airport shops. A sailboat racing operational mode may include a menu list of functions which are not useful, indeed not applicable for air travelers. Thus an automatic change in the operational mode may be stimulated in response to a change in position of the mobile device without explicit cue from a user.

Despite the fact that various operational modes may be engaged from time to time, methods of the invention may be generalized as having the following steps where the specific manner of executing the steps may vary in one operational mode in view of another operational mode. To further illustrate this, a special section below sets forth some steps which are directed to particular methods. One will appreciate that it is impossible to set forth here in this disclosure all detail of every imaginable operational mode. Accordingly, one should remain mindful that the general nature of the inventions as set forth in the claims is intended to include many application specific species.

II. System Methods—Primary Steps

In general, most prefered methods of these inventions include the following steps illustrated in the block diagram of FIG. 15: determine address state 151; form request 152; transmit request 153; and take action 154. More precisely, a determination of the address state of a mobile unit is made; a request which relates to the address state is formed in accordance with an current operational mode; the request is transmitted to a server running application software; and an action based upon the received request is taken. Although this brief description serves well as an guideline, a more complete complete understanding will be realized in consideration of the following more detailed presentation.

1. Determining Address State

Mobile unit devices of these inventions, at any instant, are said to have an 'address state'. As mentioned previously, an address state is defined by physical conditions in which a mobile unit exists, and in particular, conditions with respect to certain prearranged references sometimes including a position reference and a direction reference. A mobile unit's address state may be specified by a data set herein refered to as an 'address indicator'.

To determine an address state 161, a computer processor executes four substeps and may repeat that execution. First, a template which suggests which parameters are necessary for a currently running application, and how those parameters are to be determined is received 163 as input 162. In view of this template, values for all required parameters are collected in a 'collect parameters' substep 164. These parameter values are then combined 165 into a single data set to form the address indicator. Finally in a transmit substep 166, the address indicator is passed as output 168 of the 'determine address state' step to the request generator. The substeps may be repeated via a loop 167 command which causes each step to be reexecuted in turn.

Since an address indicator is a description of the physical nature of a mobile unit, the address indicator may include many parameters. Values for these parameters may be found via several approaches, including at least: physical measurement; applying preset defaults; receiving user inputs; performing logical deduction routines; among others. Accordingly, the 'collect parameters' substep 171 may be further detailed as follows in view of drawing FIG. 17. Inputs 172 include instructions relating to which parameters are to be collected and how to collect them.

Physical measurement 173 techniques include those such as performing a position measurement with a global position system, GPS. In a time difference of arrival scheme, radio signals received from orbiting satellites form the basis of this physical measurement system. Other parameters may also be found by electronic measurement apparatus.

Defaults may be set in advance and applied 174 in the 'determine address state' steps. For example, a range gate setting to specify that objects to be subject to address will always lie further than 0.5 miles and closer that 5 miles. In this regard, part of the description of a mobile unit address state includes a preset default parameter.

User inputs may also be used in routines executed in the 'determine address state' step. A user may operate a computer interface to provide 175 values for any of the parameters which make up an address indicator. In some versions, this may be viewed as an override where a sub-system measures the parameter but a subsequent user entry replaces the measured value.

Logical deduction routines 176 may be executed which derive a value for an address indicator parameter in response to assumptions and coded into the logic routines. For example, where a series of events suggests to the computer than a certain activity is happening, the computer may adjust parameters to provide a more favorable address indicator which facilitates recall of best information which relates to the detected activity.

Each of the above mentioned techniques may be employed in combination to arrive at values for parameters which make up the address indicator and form an output in the 'Collect Parameters' substep.

2. Preparing a Request

Requests are prepared in agreement with the various operational modes which may be running on a mobile unit at any time. FIG. 18 illustrates a request generation module 181 having input 182 from the determine address state step. An address indicator is received 183 and a request is formed 184 in agreement with values of address indicator parameters and further in view of a current operational mode. A computing module is the basis of a request generator. The computing module executes instructions to formulate a brief data set which may be transmitted to a server as output 185 of the prepare request module. For example, where a mobile unit is located in San Rafael and has a directional reference pointing towards San Jose, the request generator may produce a request in the form of a uniform resource locator, a URL. Thus, requests of these inventions may be a well known and highly used format of usual Internet protocol. Alternatively, a request may include datasets particular to systems of the invention and not related to other Internet techniques. For example, a system can be configured to use the XML standard where data objects are described in a document type definition such that receiving applications of any platform can properly recognise the information. In either case, a request is prepared in agreement with the operational mode and the parameters from which an address indicator includes.

Accordingly, the 'build request' module 191 may be further described as follows with reference to FIG. 19, a block diagram drawn to that process. Inputs 192 to the build request module include both instructions from any active operational mode, and information received as an address indicator. The operational mode suggests the format of the request to be built. The request therefore may include portions known as a header, data specific elements, scripts, user IDs, and return type address information. A request is build by assembling these components in agreement with formatting rules inherited in an operational mode program. Thus, the substep includes actions: set forth a header 193, insert address indicator data 194, apply scripts 195, and prepare return ID information 196. Together these components form the output 197 of the build request module.

3. Transmitting the Request

So formed, requests are then passed to or transmitted to a server computer in a 'transmit request' substep 201 where requests are received as inputs 202. For example, some best modes of these inventions may have requests prepared as encoded messages. These encoded messages can be transmitted to remote server facilities via wireless transmission means. A radio transmission originates in a mobile unit, propagates through space, to a base station including a high data rate radio receiver, routed via a WAP internet gateway, via landline, i.e. copper or fiber network, and finally to a server. A request therefore may encounter a great deal of transmission activity as part of a 'transmitting the request' step.

Alternatively, a server computer may be running within the mobile unit and a 'transmit request' step merely suggests passing request parameters into processing routines resident on a local device or devices. Accordingly, the step is complete and well performed whenever an existing request finds its way from a request forming module to a server configured to process such requests. Combinations of these are also anticipated. Where a server is appropriate for some but not all requests, it may be a local server with a limited data set, it can handle certain requests while others are passed into the network with the destination of a remote server. Appropriate routing of requests is handled as part of the transmit request step.

Therefore, the transmit request step may be envisaged as including two steps as follows: a select appropriate route step 203, and an execute transmission sequence 204 step. The output 205 of the transmit request module is a request having been passed to a server.

4. Processing Request

Requests are processed 211 in a manner regulated by a stratagem set forth in an application. In brief, substeps: 'receive request' 213, 'execute instructions' 214, 'search database' 215, 'take action' 216, and 'form reply' 217 are performed. Although these substeps may have variations due to differences in operational modes, their general nature will be fully appreciated.

In a first substep, requests are received at a server. A server is configured, in some cases, to receive requests from many mobile units. Thus, receiving a request includes managing a plurality of transactions with a plurality of requesting parties and the computing overhead associated therewith. Request handling and management services permits the process request module to address these complex transactions.

A received request may have therewithin a script or computer code unit which instructs the server to behave in a modified way or to process a function to arrive at some result. In this way, a part of a 'process request' step includes special processes to be run at the server. Sometimes such function will be employed to shift a computing load to the server thereby freeing the mobile unit processor from load which may be difficult to handle there. Another occasion where special instructions may be used prior to a database search is when a user has indicated that special data filters be applied. This occurs when a user selects conditions and limits offered as options in a particular operational mode. For example, in a hotel locating application, a user may wish to only receive results which include hotels of three stars quality or higher. From an options menu a user specifys this condition and it may be passed in a script as part of the request. When executed at the server, the script controls the server to perform a database search in accordance with the user selected specifications.

One processing action taken in all versions of these inventions is a 'database search' based upon information in the request which relates to the address indicator. This search is generally used to produce a result set of information relating to objects being addressed by the mobile unit. Thus it can be said that a primary objective of any database search of these inventions is to determine objects which are being addressed and to retrieve information which relates thereto. Recall the database structure described previously which provides a connection between a object's geometric descriptor and information relating to the object via a database record. In review, an object is said to be 'addressed' whenever the address indicator which describes a device's physical nature forms an intersection with any portion of an object's geometric descriptor.

After a determination is made as to which objects are being addressed, actions are taken where the actions may depend upon the specific objects being addressed. In most instances, actions depend upon information relating to the addressed objects as recalled from the database. These actions may be taken at the server, at the mobile unit, in places therebetween, or in completely unconnected locations.

It is useful to further detail and diagram two of the above mentioned substeps; namely, the 'database search' step and the 'take action' steps.

A database search 221 as illustrated in drawing FIG. 22 illustrates the major steps of a database search.

Inputs 222 prepared in prior processing are received into the search module. These inputs may be in a form of strict or highly regulated form. For example, certain databases have a language which cooperates with retrieving select information from the database via a database 'query'. For example, Structured Query Language, or SQL specifies a form that can be run against any database schema complying with the language rules. An input to the database step of this section therefore may be a highly structured database query string. This string is prepared in agreement with any current operational mode, user applied filters, and in further view of a mobile unit's address state. Once received in the database module, a SQL string is processed in an 'examine records' step 223.

Records may exist in a database in a plurality of tables where some tables may have known relationships with respect to others. For example, a primary table may have information recorded therein which relates to fundamental properties of objects which are further common to all objects. For example, data fields such as 'date created'; 'information source'; and 'expiration date', et cetera. Other tables may be arranged and connected to a primary table whereby those tables contain information in a structure which applies only to a class of object. For example a restaurant class object may contain data fields: 'food category'; 'quality rating'; and 'price range'. Objects belonging to a class different than the restaurant class may not find those fields applicable. An object such as a baseball stadium would not have any data relating to 'food category'. In the examine records step, a SQL command iterates through all records which may be of interest in view of conditions which arise in an operational mode. This of course means that a plurality of tables, as well as a plurality of records, may be addressed while the SQL command is being executed. A well guided iteration through the database information occurs in the 'examine records' step.

In a step where a single record is being considered at a particular time, a determination is made with regard to precisely one object attribute. As mentioned, each object has associated therewith a geometric descriptor. A step to detect intersection 224 considers a data record's geometric descriptor in view of conditions defined in the search command to detect an intersection with the address indicator. When an intersection occurs, the object is marked as a 'hit' object, or in other words, an object currently being addressed by the system.

Upon a such determination of an object being addressed, data associated with the hit object in a plurality of tables is marked for recall and may be placed into a dataset type container. As it is not a certainty that only one object is being addressed at any one time, a database search continues after finding a hit object. Records are examined one at a time in turn, as directed by the query command, each additional target identified as an addressed target has information relating thereto recalled and placed into the dataset. In this manner, the database search is said to include a 'populate dataset' 225 step.

When the search is completed and there remain no records left to examine for intersection, the search is concluded by emitting an output 226 which includes a completed dataset with information relating to all hit objects. The output may also include markers which may be used in computer processing routines for management of related operations. For example, a marker may be included to describe the success, failure or completeness of the search or to describe the dataset such as the total number of records found. These indicators are produced as a clean-up method which may be performed as database search overhead.

The results of a database search are passed into a 'take action' module 231 illustrated in FIG. 23. Actions may include a wide range of tasks and operational execution which may be initiated by a computer. This is very important because in some cases it is not the computer which actually performs the task but rather the computer merely commands that it be done. For example, where an object being addressed is the garage door of a person's home, the action to be taken may be to open the door. Thus the computer may generate an 'Open' command and pass it to the door opening machinery. In this sense, the door opener is not an integral part of the system, but is a system in communication with devices of the inventions whereby it may receive commands therefrom.

An action module receives database search results including the dataset as inputs 232. The action module receives 233 the dataset and information relating to objects being addressed for processing therein. This information may be used in or to control actions taken in the module.

Tests may be performed to determine properties of the data contained in the dataset. As part of a take action process, tests are performed 234 against the dataset and the information contained therein. The results of these tests may suggest precisely which actions are to be taken. For example, a test may be performed to determine whether some of the objects being addressed by a user are objects which cannot be readily seen by the user due to the object's position behind another object in a user's line of sight or view. In this case, i.e. a positive result of having performed the test, a certain action may be triggered to provide a graphical representation of the object in relation to other nearby objects, a map. This is further described in a prior U.S. application having Ser. No. 09/384,469. Other tests may be executed to determine the true nature and state of the dataset and these test results may be used to trigger various actions.

When the results of a test suggests some actionable condition, an instruction set may be called and executed in an 'execute instructions' 235 step. These instructions may produce a result locally at the server or may cause an external operation to be triggered.

In addition to tests being performed and instructions executed, the server preforms a 'build reply' 236 step. An appropriate reply is prepared in view of data recalled and in further view of any instruction particular to an operational mode running on the system. The reply may include data elements and further organization of said elements as suggested by templates which may be particular to an application. For example, a reply template may command that a XML reply be sent where the document type definition of the XML reply is used to arrange data recalled in a fashion whereby it can be well received in the requesting client.

Finally, the 'Take Action' step ends in a 'Transmit Reply' 237 step where the reply is passed as output 238 into a routing algorithm and sent back to the unit where the request was initiated.

III. System Methods—Further Details Included in Some Versions

In addition to those steps outlined above, some preferred methods may also include additional steps. Those steps discussed below should be considered advanced version subsets of one of the more general methods presented above. Further, steps described above may be defined with additional detail as follows in this description. Similarly, detail methods should also be considered advanced version subsets of one of more general methods presented above.

1. User Action to Cause Address of Object of Interest

In preferred versions, a user manipulates a mobile unit to cause it to point at an object of interest. Since a mobile unit may be encased in an elongated shell with an easily discernable pointing reference, a user may simply hold the mobile unit while moving the wrist to cause the device to address an object.

In best mode versions of these inventions, a user would merely align the antenna of her mobile telephone so that it points to an object such as a supermarket. In this way, a user effects the step 'addressing an object'.

2. User Action to Cause a Trigger Event

To ask for identity information with respect to the addressed supermarket, the user may indicate to the computer that the addressed supermarket object is to be processed further. To cause this, a user may stimulate a click event while the supermarket is being addressed. A click event is one whereby a user operates a switch to provide indication to the computer. While an object is being addressed, a click event may cause the computer to divert into an instruction set where any of a great plurality of processes may occur. The essence of this step is independent of the action taken. The act of providing an indication to a computer while simultaneously addressing an object of interest thereby setting the computer into any action relating to the particular object being addressed is fundemental to this step.

3. Determine Address State

A. Application Specific Address Indicator Templates

In some operational modes it is not necessary for the address indicator to account for various tilt states. This may be true where the only objects of interest lie substantially in the horizontal plane of the user. A shipping application where distances are large and the field of interest, i.e. the ocean surface, is flat. In other application versions, there is absolutely no regard for time and address indicator templates for these versions will ignore the time parameter. Of course many very useful versions of these inventions will not provide any measure of more obscure parameters such as wind direction and atmospheric pressure.

Upon application development, an application designer decides which of the available address indicator parameters are useful and required and designs templates with instructions in agreement with the stratagem of her application. This template tells the system which parameters will carry default values, which of the other parameters will have empty values and which of the remaining parameters will acquire their values by way of measurements in subsystem activity.

i) Initialization with Defaults

When an application executes its initialization procedures, a portion of the procedure sets a template as an input to the receive template module. The template includes a listing of the elements required in the application, and also provides default values for elements where appropriate. For elements requiring values but where defaults cannot be supplied, instruction is passed to set up and initiate subsystems for making measurements for those parameters or otherwise acquiring data values for those parameters. While position is typically measured, time is not. A time value must be 'read' from a clock reference. Strictly speaking, an address indicator value may be left empty, set by default, set by reference, or measured.

ii) User Set-up to Adjust Defaults

After initialization steps are completed, an address indicator template can be modified in agreement with user inputs. For example, in a mapping application, a user may only be interested in objects which are relatively near the user's location. Accordingly, a 'range' parameter set by default to eight miles may be changed to three miles in an interactive procedure whereby a user resets the value for the range parameter in the template. Other parameters can receive values in their respective ways; either omission, measurement, or reference.

B. Take Action

In view of a result set produced in the database search, and in accordance with any instructions received as part of a request, and in agreement with any user selected operational mode, a server produces a response which sets forth or triggers an action. Actions may be widely varied in their embodiments, but generally they may be classified in the regard as to where the action occurs. By illustration, various types of actions are described. One will appreciate the exact number of different actions which may be taken is unlimited and no attempt is made here to catalogue them. It is sufficient to say that any action which can be set into being is contemplated as being part of these inventions so long as it is done so in view of the preceding and following steps. Although sometimes an action is taken entirely within a server, in other instances the action may be taken up outside the server. Where actions are taken outside the server, a server command is used to initiate the action.

i) Action Taken in Server

Sometimes an action is one which can be taken entirely within the server. Actions taken at the server may include, by way of example, performing special operations on the result set produced in the database search. A result set may be modified and updated and returned to the database. A record recalled in the database search may be updated to reflect changes to objects which occur from time-to-time.

When a retail operation shuts down and moves from a particular location, the database becomes due for an information update. A request transmitted from a mobile unit may include instructions which cause records associated with a certain geometric descriptor (being addressed) to be changed to reflect the termination of the business. Similarly, where a new business is opened in its place, the database record requires an update. Therefore a request process may include instruction to take action within the application server or a database connected to said server.

An action taken by a server may include one whereby the action is within a group of related actions performed serially in view of a plurality of requests. In example, the server may include a module configured and arranged to construct an activity history with regard to a particular client or group of clients.

In the case of a group of actions relating to a plurality of requests from a single user, the following example is illustrative. A business advertising executive user may set forth on a journey to document billboards in ideal locations for advertising products of concern to the business. While driving about a city, the executive chooses preferred billboards, points and clicks a mobile device theretowards the chosen billboards. In response, the server can be arranged to build a data set of chosen billboards adding each to the list as it is addressed and identified via the address indicator and database search. This illustrates how server actions to a group of requests are processed at the server to yield a useful product. At the server, each time a request arrives the database search produces the identity of the addressed object and that identity is added (as one of a group of server actions) to a data set which forms documentation desired by the user.

In the case of actions taken with respect to requests from a select group of people, consider the following example. Requests may be of a form recognized by the server to cause them to be handled in view of special procedure. A group of people belonging to a certain social club and registered as such may cause requests to be sent which notify the server of the requestor's present location. Any member of the club could then ask the server to expose the locations of other club members in order that meetings are more easily and frequently brought about. Thus, each incoming request from any member of the group causes a server action to be taken whereby the server updates a list of club member locations.

ii) Action at Wireless Network

A server may produce a command and convey that command to the wireless network whereby an action is taken there. A good example of this case includes what is described herein as a 'point-to-call' function. Users of mobile units can find themselves in the position of wishing to contact the entity residing in some building of interest. The building, being addressed by the user, has contact information in the database. On request for this type of action, the server passes a command into the wireless network to place a telephone call to the addressed entity.

iii) Action at Mobile Unit

In some versions of these inventions a server may convey a command to a mobile unit, or a plurality of linked mobile units, to effect an action at the mobile unit. In a game methodology, devices of these inventions may operate in a manner including such action at a mobile unit.

In a game sometimes and herein referred to as a 'Hide-and-Seek' game, a person who is 'it' attempts to locate other players who are hiding. By using a mobile unit of these inventions to point-and-click on various locations where players may be hiding the user causes a request to be sent to the server where a response includes a command to alert the user as to the status of the point-and-click action in relation to the game scheme. If an opponent player is hiding in the subject location (addressed location) a server response includes a command to drive an alert signal at the mobile unit. For example, an audio 'Buzz' sound can be provided to indicate a failed attempt to find a hiding person while a 'BeepBeepBeep' sound can be provided to indicate a successful attempt to discover a players hiding location.

Thus, game versions of these inventions illustrate where actions can be taken at the mobile unit portion of systems via a command sent from the server computer.

iv) Action at Addressed Object

An action may be taken at the object being addressed. In an example where a user wishes to cause a reservation to be made at a restaurant which is the subject of an address and further a point-and-click operation, an application is arranged to provide a command from the server to the object being addressed in order that an action be taken there. As part of a database search, information concerning contact information for restaurants being addressed is recalled. In systems arranged to perform accordingly, a server may contact a subject restaurant by telephone, alternatively by e-mail, or even dynamic web page interaction, to cause a reservation to be made with all parameters appropriate for meal reservations being supported in the user's request action.

It is therefore easy to fully understand how systems of these inventions can include actions occurring at the object being addressed where a server command is transmitted to the object and the action is taken there.

v) Action at Another Location

It is sometimes of great interest to cause an action to be taken not at the actual object being addressed but rather at a location which relates to the object being addressed. To illustrate this use of systems of these inventions, it is useful to consider our duty to our community as citizens.

While in travel, one may have the occasion to notice facilities in disrepair, i.e. a defective street light; a damaged train crossing signal; or a leaking damn. Additionally, one might happen upon an automobile accident wherein tire tread separation causes a fully loaded sports utility vehicle to make a considerable mess in a roll-over disaster. The onset of a forest fire also presents a similar happenchance for a nearby observer to aid his environment and community via systems of these inventions. All of the above mentioned events require timely reporting to appropriate agencies. Details regarding precise time and place are also important. These necessary details are usually not sufficiently provided by verbal descriptions provided by the reporting person. In view of a forest fire on a remote mountain in a region unfamiliar to the reporter, one can truly understand the dilemma. Accordingly systems of these inventions include reporting applications where a user points-and-clicks on an incident scene to cause a report to be generated and transmitted to appropriate authorities. In the simple case of a defective traffic light a server causes a report to be logged at a city facilities unit. In the case damaged train crossing, the railway operations people are provided an alert at their central office. In the case of a broken damn, forest fire, or traffic accident, authorities appropriate for handling a response to those types of emergencies are contacted.

Each of the above examples illustrates the function whereby a point-and-click action on devices of these inventions results in a server providing a command to execute an action at a remote location where that location is not the object of the address, is not the server, and is not the mobile unit, but rather is a related but remote location. It is easy to understand how impossible it would be to explain all relationships between objects and remote locations; therefore, one should remain mindful that the precise relationship does not make these inventions but rather the mere fact that there exists some relationship causes great utility and novelty in the combinations taught.

C. Details on Special Topics

Although the presentation above follows logically from the elements of devices and the steps of methods, a few items are preferably described in complete detail outside that framework. In example, a geometric descriptor which is a construct used in systems is not tangible structure. In discussions of hardware elements, details relating to such geometric descriptors were left absent. As the inventors wish to provide the fullest and most complete description possible, further details are provided with regard to geometric descriptors and the term herein used 'address states'. Finally, while the presentation above suggests some basic information elements which may be manipulated by systems, a special section herefollowing describes some advanced multi-media type data which adds to the full description. These details are presented separately in the interest of clarity as they do not readily follow within the logical form of the outline but are never-the-less considered important aspects of these inventions.

Special Topic 1: Geometric Descriptors

A geometric descriptor includes the combination of a mathematical definition of a geometric construct or body and an association with an object. By way of example, a certain building on a particular city block may be said to occupy a cubic shaped space which may be specified mathematically in some reference coordinate system. Thus the association with the building (an object) together with the specified shape (mathematical definition) forms a 'geometric descriptor'. In this case, the geometric descriptor defines the space substantially occupied by the building. Although this is not always the case, one will recognize a trend where the object with which an association is made generally occupies a space which becomes the space described in the geometric descriptor. A mathematical definition of a shape and location alone cannot form a complete geometric descriptor without a connection to some object. Thus, all geometric descriptors are comprised of at least a description of some spatial extent, a precise position specification and an association with an object.

Geometric descriptors of these inventions may be set and preloaded into a database as a field type data element; i.e. part of a record. Upon programming a database, an application designer chooses appropriate geometric descriptors in agreement with the application being designed. In certain conditions, a geometric descriptor may be a simple shape without complex detail; in other conditions, a geometric descriptor may include considerable detail with great attention to precise and intricate geometries.

With reference to the drawing figures, in particular FIG. 24 which contains an image of interest including several objects, specifically the San Francisco Bay 241, the sky above Marin 242, and the famous Golden Gate Bridge 243. Geometric descriptors may be configured and arranged for each of these objects. An example of a geometric descriptor having an association with the Golden Gate Bridge is presented in the perspective of the image viewpoint in FIG. 25. Again, the image contains the bay 251, the sky 252, and the bridge 253. In addition, the image shows a graphical representation of a geometric descriptor associated with the bridge and superimposed thereon. A heavy black outline 254 suggests the periphery of such geometric descriptor. It will be understood that the geometric descriptor actually extends beyond the limits of the image 255. Although for practical purposes the figure illustrates a two dimensional representation of the geometric descriptor, it is readily understood that this geometric descriptor is actually comprised of a three dimensional geometric body. Better contrast is envisaged in consideration of FIG. 26 which shows the geometric descriptor 261 in the image space 262 without distractions of the image. One can imagine that as the viewpoint from which a geometric descriptor is viewed is changed, then so will its appearance; thereby confirming its three dimensional nature.

While the precision and level of detail of the geometric descriptor shown in FIGS. 24–26 are moderate, it is easy to imagine that an object can be more precisely modeled and thus a geometric descriptor of considerable detail may be formed for the same object, the Golden Gate Bridge. This becomes necessary in some applications where high resolution demands precise definitions of the spatial extent of which is occupied by an object. FIG. 27 shows a different geometric descriptor which can be associated with the Golden Gate Bridge in applications requiring extra detail. It is noted that geometric descriptor carefully accounts for the roadway 271, the tower 272, the base members 273 and 274, and finally, the distant base 275.

With recall to FIG. 25, it is easy see that a user of devices of these inventions who points the device exactly towards the region identified in the figure by numeral '256' will be addressing the bridge because he causes the device to point at the rather coarse geometric descriptor. However, applications using geometric descriptors of greater precision will resolve that a user is not addressing the bridge, but rather addressing the sky above Marin which is behind the bridge; see FIG. 27, numeral 276.

As mentioned above, a building may simply be represented by a cubic geometric descriptor in some applications. However, preferred applications clearly anticipate geometric descriptors of far higher precision. FIG. 28 illustrates this without ambiguity. A user points a device of these inventions 281 towards awnings 282 and 283, and a banner 284 presented as advertisement by a restaurant. These awning and banner objects may be included in a group of geometric descriptors associated with the Karl Strauss Brewery & Grill of La Jolla. They may be envisaged more clearly via the presentation of FIG. 29. The device is shown as 291, the awnings as 292 and 293, the banner being 294. A pointing vector is shown as dotted line 295. In addition to geometric descriptors which describe a physical building, additional geometric descriptors may also be associated with the same object, i.e. the restaurant. As such, by pointing at either of the geometric descriptors, a user causes the restaurant to be addressed. In response to addressing the restaurant, a computer make take an action whereby the user receives a menu of the afternoon specials presented on the display of the device for convenient review.

It is noteworthy to point out that a geometric descriptor may include geometric shapes which are not three dimensional but rather infinitely thin. This is the case for the banner which may have a geometric descriptor that is planar in nature. Thus a geometric descriptor is not always descriptive of a space but may also describe planar, linear, or even a point geometry.

Nested geometric descriptors are fully anticipated. Accordingly, subsets of buildings may independently form separate but related geometric descriptors within other geometric descriptors. An housing domain may exist whereby it is comprised of five separate buildings, each building having four single family units each, each single family unit having three rooms therein. The domain may have a master geometric descriptor; each building may also have a geometric descriptor, that geometric descriptor being a slave to the master geometric descriptor associated with the domain; each single family unit likewise has a geometric descriptor which is said to 'belong to' the geometric descriptor associated with the building, and further to the geometric descriptor associated with the domain. In this way, certain properties and functions can be passed into subsets of geometric descriptors from their parent descriptors.

Special Topic 2: Address Indicators

In many parts of this disclosure reference is made to simplified address states comprising position and attitude parameters. Indeed, in some explanations, even those position and attitude parameters are abbreviated. For example in discussions regarding position sometimes position is specified as a latitude and longitude measure without more. However, position is not perfectly described by mere latitude and longitude measure, but rather it may also include altitude measure. Similarly, although a compass heading figure such as '254°' may be useful to reflect attitude, attitude is really incomplete without specification of pitch and roll, i.e. the angular displacement about two orthonormal axes. In applications where abbreviated address states are used, there is basis for taking assumptions where unmentioned parameters may be left redundant or unneeded.

In some cases it is not possible to ignore certain details and a more full description of an address state is required. This can be clearly understood in view of the drawing FIGS. 30 and 31 where a measure of attitude includes not only a compass heading but also a pitch parameter(s) as well.

FIG. 30 depicts a user 301 of a system of these inventions. A hand-held mobile unit device 302 is pointed in a direction indicated by arrow 303 towards a building which houses several unrelated businesses. It is easy to appreciate that the user's position as described by latitude, longitude and altitude values is well defined. It is similarly easy to appreciate that the pointing direction corresponds to a compass heading roughly south, or more precisely 254°. However, with those parameters alone it is not possible to determine whether the user is pointing at 'Bozo's Comic Book Store' 304, a shop on the $4^{th}$ floor, or at 'Mr. Juice Sandwich Shop and Juice Bar' 305, a shop on the $2^{nd}$ floor, i.e. two floors therebelow the comic book store. This is because altitude only suggests the horizontal plane indicated as dotted line 306 in which the mobile device lies. The pointing direction or heading assures that the device is being pointed south-southwest along the 254° heading, in which both the juice bar and comic book store lie. However, with the stated parameters it remains ambiguous as to whether the device is being pointed above or below the horizon.

Without changing position, altitude or compass heading, the user can realign the mobile unit by tilting it downward to address a different shop. FIG. 31 shows the young boy 311 equipped with a mobile unit of these inventions 312 pointing in a direction indicated by arrow 313 below the horizon indicated by dotted line 314 towards the juice bar. Thus it is evident that a change in the pitch angle of the device without changes to other address parameters may cause a different object to become the addressed object. In the drawing FIG. 30, the comic book store is addressed, in FIG. 31 the juice bar is being addressed.

Altitude

In high precision devices of these inventions, it is not enough to merely have latitude, longitude, heading, information. This is due to the fact that two systems may have identical latitude and longitude values while pointing along the same compass heading but have very different altitude and pitch values. FIG. 32 shows how a gentleman 321 using a mobile device 322 positioned directly above a lady 323 with a similar hand-held device 324, both pointing as indicated by arrows 325 and 327 respectively, to the same object, the 'Mr. Juice' juice bar. In this case, the altitude and pitch angles greatly affect the outcome of a determination of an address state and corresponding database search for addressed objects. There is a distinct difference in altitude; the horizontal plane indicated by dotted line 326 for the gentleman is different than a horizontal plane indicated by dotted line 328 for the lady. Both persons are addressing the same object, Mr. Juice, however, they have very different values for both pitch and altitude. Thus, preferred devices of these inventions have attitude determining means which includes a pitch sensor and a GPS type positioning means which includes an altitude determination.

Further, it would be very wrong to assume that an address state is limited to position and attitude even in it most detailed forms. To more fully appreciate the entire invention, it is important to consider that address states may extend far beyond mere position and attitude parameters.

In most general terms, an 'address state' is a description of the pointing nature of a device. Some versions of these inventions may include address state parameters as follows: position which is preferably described as: Latitude; Longitude; and Altitude, measures and attitude which is preferably described as: Heading; Pitch; and Roll. Although in simplified versions position and attitude may be sufficient to completely describe an address state of a certain device, other versions may include additional description of an address state.

In review, attention is directed to the drawing figures where FIG. 33 shows a point reference and direction reference represented by point 331 and arrow 332. The point is arranged at the endpoint of the direction vector for convenience. This geometric construction is consistent with simplest versions of these inventions introduced herethroughout. A position determining means is coupled to the point reference represented by the point 331 and makes a measurement of the location including latitude, longitude and altitude of the point. Likewise, an attitude determining means is coupled to the direction reference represented by the arrow 332 and makes a measurement of the pointing nature including compass heading, pitch and roll of the direction reference. For a more complete understanding of the full invention, preferred versions include an address vector having spatial extent in three dimensions.

FIG. 34 shows an illustration of an interesting representation of an address indicator. A point 341 is joined with a pointing vector 342. An angular measure indicated as Θ 343 describes an extension to previous address indicators. The angular measure suggests a conic shaped volume to represent the address indicator; i.e. the address indicator has extent in a transverse sense, extent which increases as a function of the distance from the point of origin. This is a natural extension for an address indicator because is approximates a beam of light which has been used by all to point towards things, for example a flashlight, or even the headlights of an automobile. Thus, pointers having finite transverse extent are particularly useful.

Figure 35:
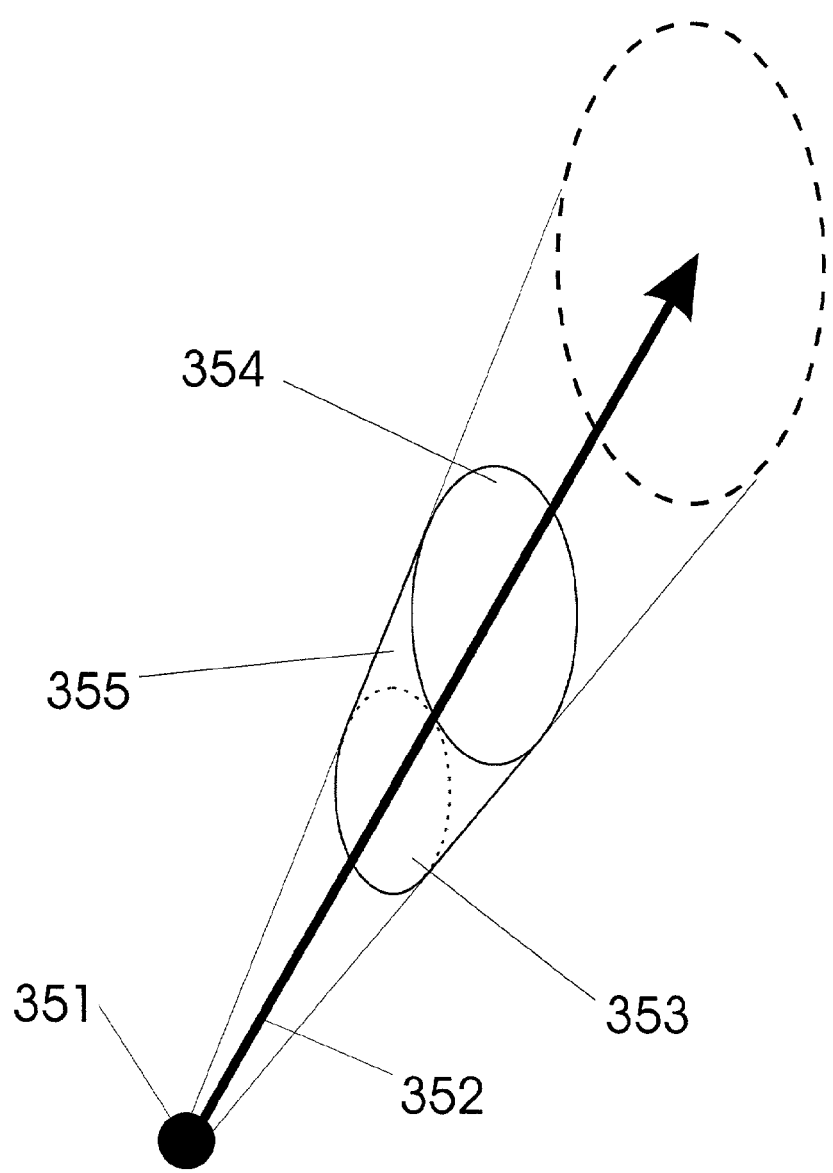

Unlike a beam of light pointer, an address indicator may be arranged to have minimal and maximal distance limits associated therewith to set forth a range gate. FIG. 35 shows a conic section address indicator specified by a point 351 in combination with a pointing vector 352. In addition, an elliptical element 353 suggests a minimum distance parameter while an elliptical element 354 suggests a maximum distance parameter. By convention, an address indicator can be said to exist as the volume of space occupied between the limit surface elements: the conic surface 355, minimum ellipse 353 and maximum ellipse 354.

Figure 36:
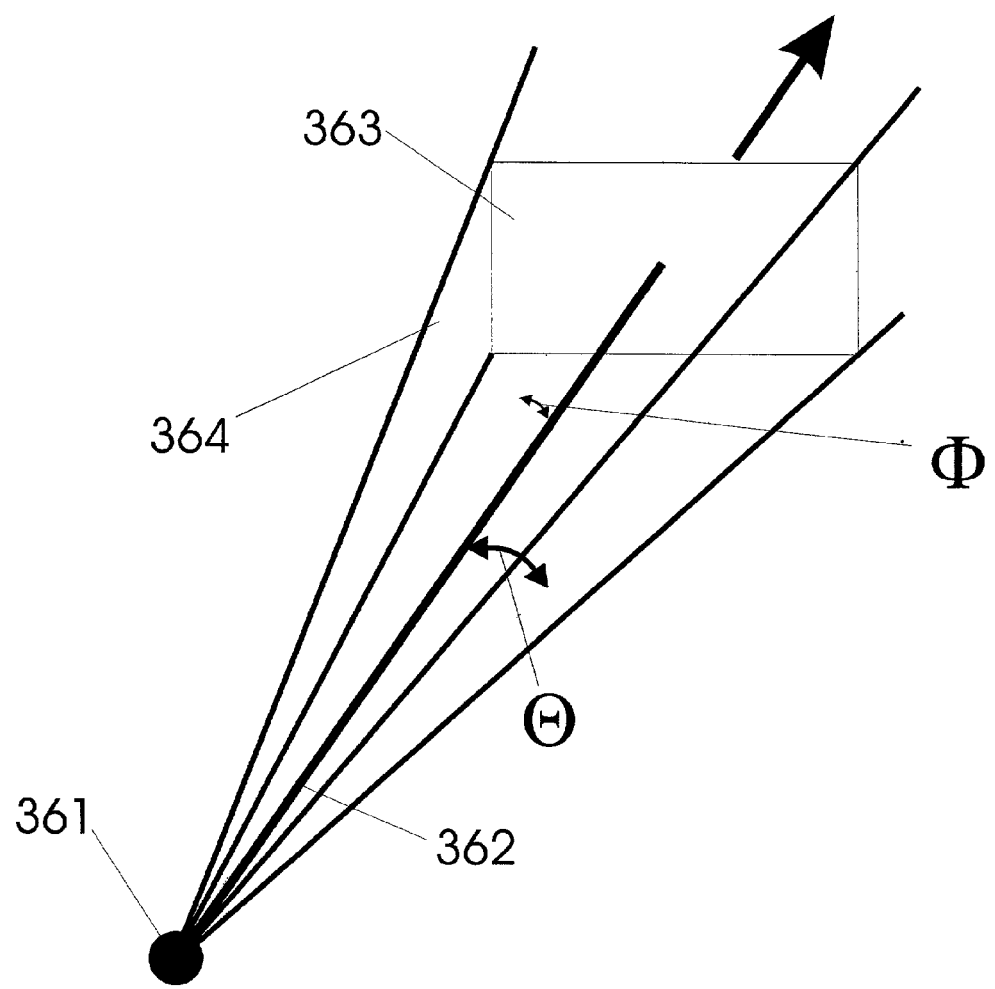

Upon review of the illustration in FIG. 36 it is easy to realize that an address indicator comprising point 361 and vector 362 may be described as a volume 364 which is not circular, in cross section 363. Angular measure in two orthogonal directions, i.e. shown as $\Theta$ and $\Phi$ in the drawing, each is different in value, can be set to describe a special address indicator. The address indicator which is rectangular in cross section of FIG. 36 is provided with a maximal distance limit without a minimum limit to yield a pyramid shape address indicator. Careful readers will understand that the true shape of the maximum limit may be a spherical section rather than a mere rectangle as shown in the drawing for simplicity.

With address indicators fully described in detail, one will now enjoy a complete description of the notion known here as 'Intersection' of address indicators and geometric descriptors. First, it is useful to recall how a user may influence the address state of a mobile unit and thus the address indicator associated therewith.

Figure 37:
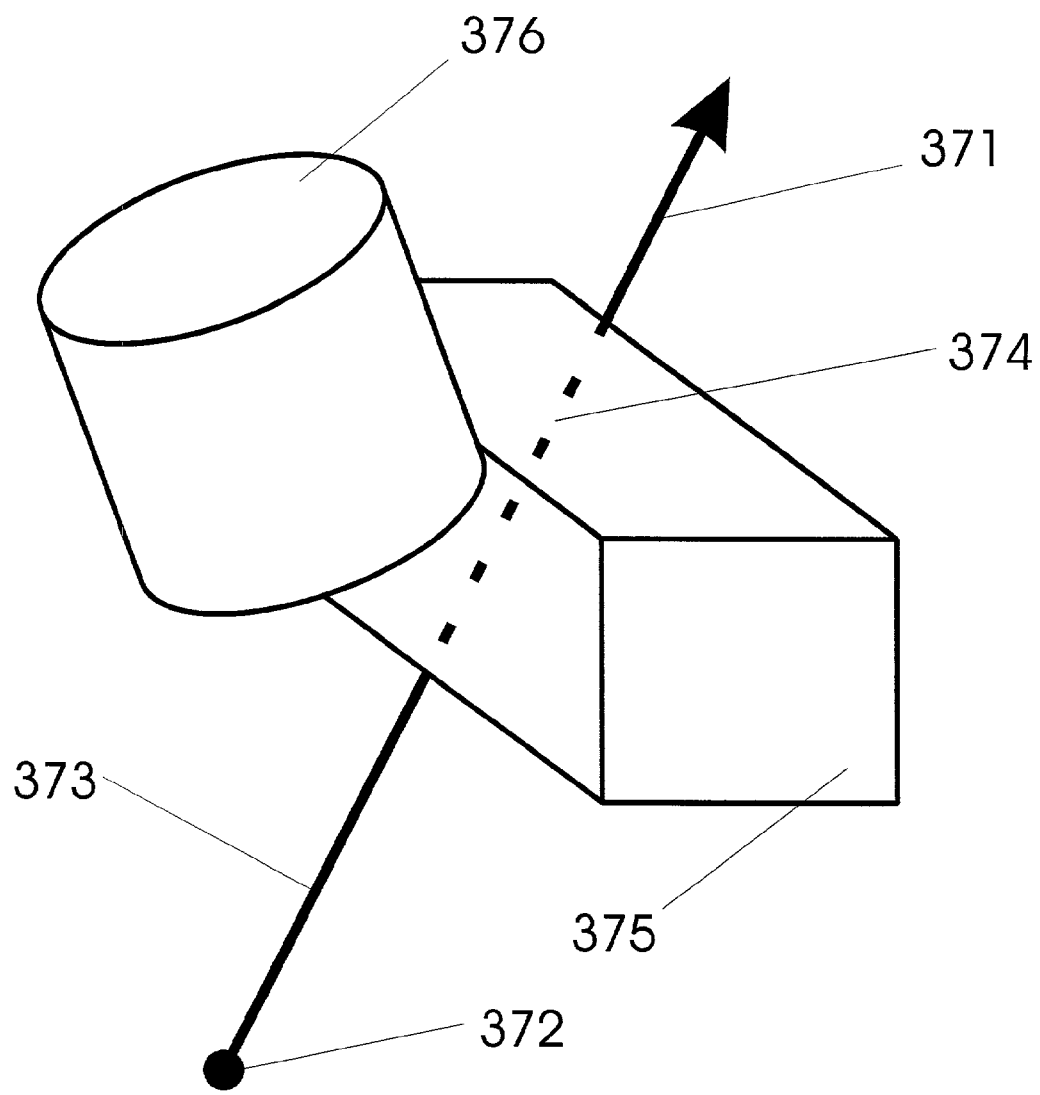

The arrangement of position and direction references is firmly coupled to a mobile unit whereby displacements and rotations of the mobile unit causes corresponding displacements and rotations of the address indicator of the mobile unit. In this way, a user may use a mobile unit of these inventions by moving it about to address objects of interest. FIG. 37 illustrates a case where a simple address indicator in the form of a vector 371 comprising a point reference 372 and a direction reference 373 is directed toward a certain object of interest represented by a geometric descriptor. The pointer is aligned such that a (dashed) portion 374 of it intersects a first geometric FIG. 375, a rectangular cylinder while not forming an intersection with a second geometric FIG. 376, a circular cylinder. Such action taken by a user is said to cause the rectangular cylinder to be addressed. The circular cylinder is not being addressed because the pointer does not form an intersection therewith.

Figure 38:
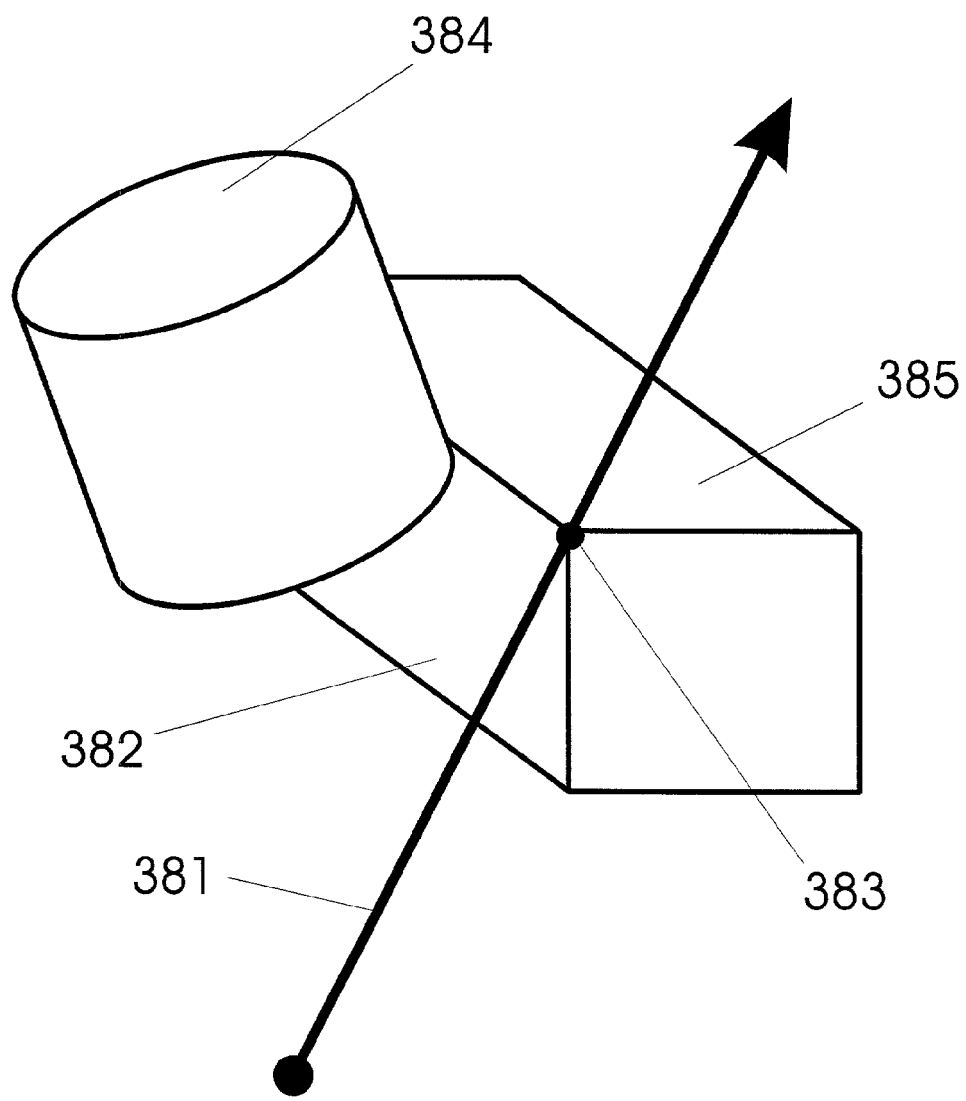

To form an "intersection", a geometric descriptor must share at least a single point with an address indicator. FIG. 38 shows the case where an address indicator 381 is coincident with a geometric descriptor 382 at only a single point 383. At no point does the circular cylinder geometric descriptor 384 coexist with any portion of the address indicator and therefor the circular cylinder is not being addressed by the system illustrated.

Figure 39:
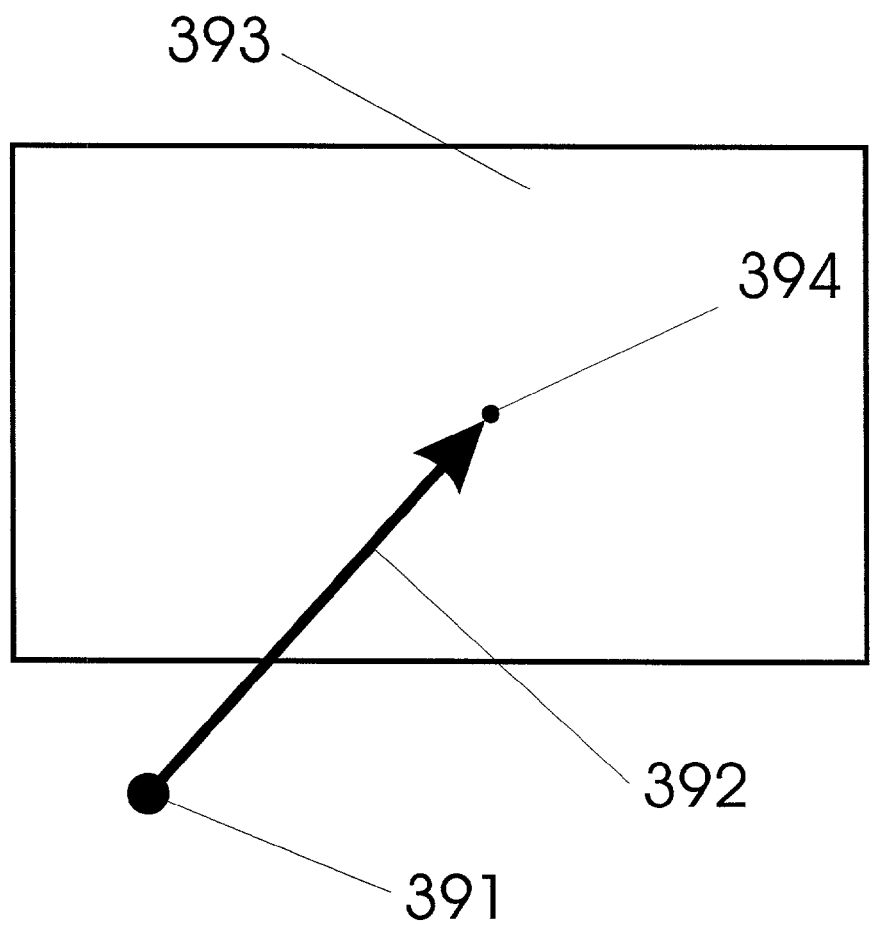

Some geometric descriptors are defined as infinitely thin constructs, a pointer 391, 392 may intersect a planar geometric descriptor 393 at a single point 394 as shown in drawing FIG. 39.

Figure 40:
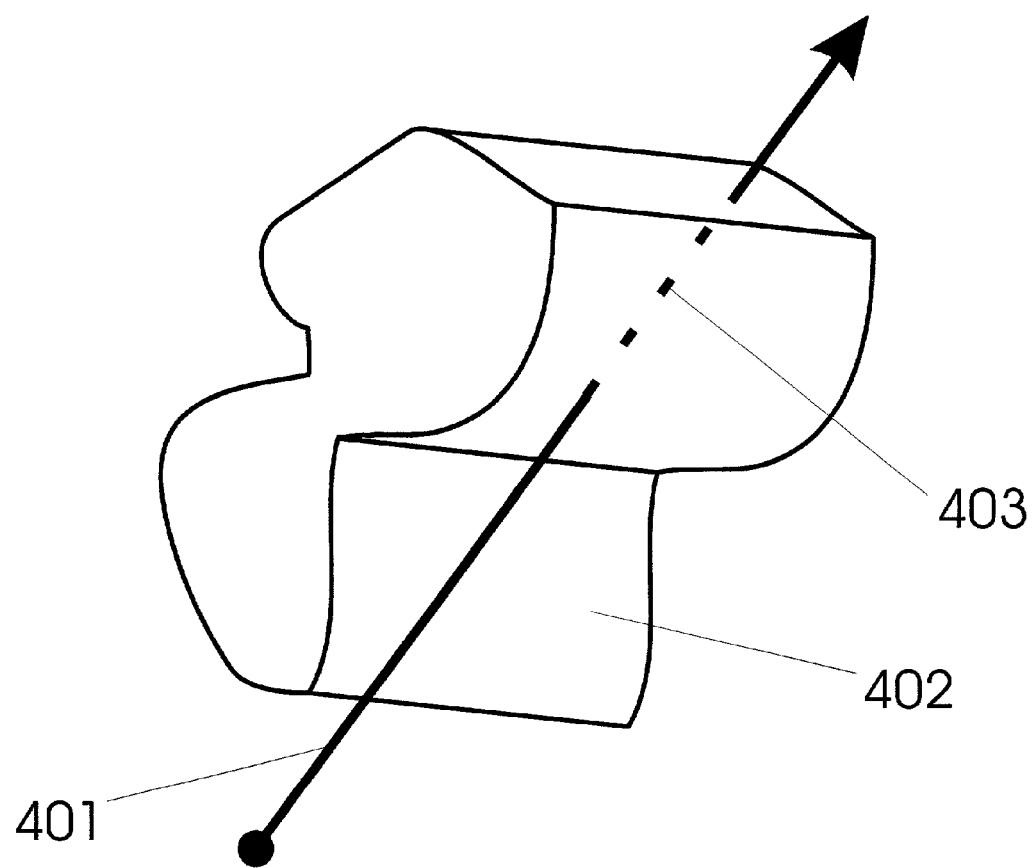

Geometric descriptors of complex shapes are most certainly anticipated. One such geometric descriptor is shown in FIG. 40. An address indicator 401 is directed towards a geometric descriptor 402 of complex shape such that a portion of the address indicator 403 forms an intersection. Thus the object associated with the complex shape shown is being addressed by a system of these inventions.

Figure 41:
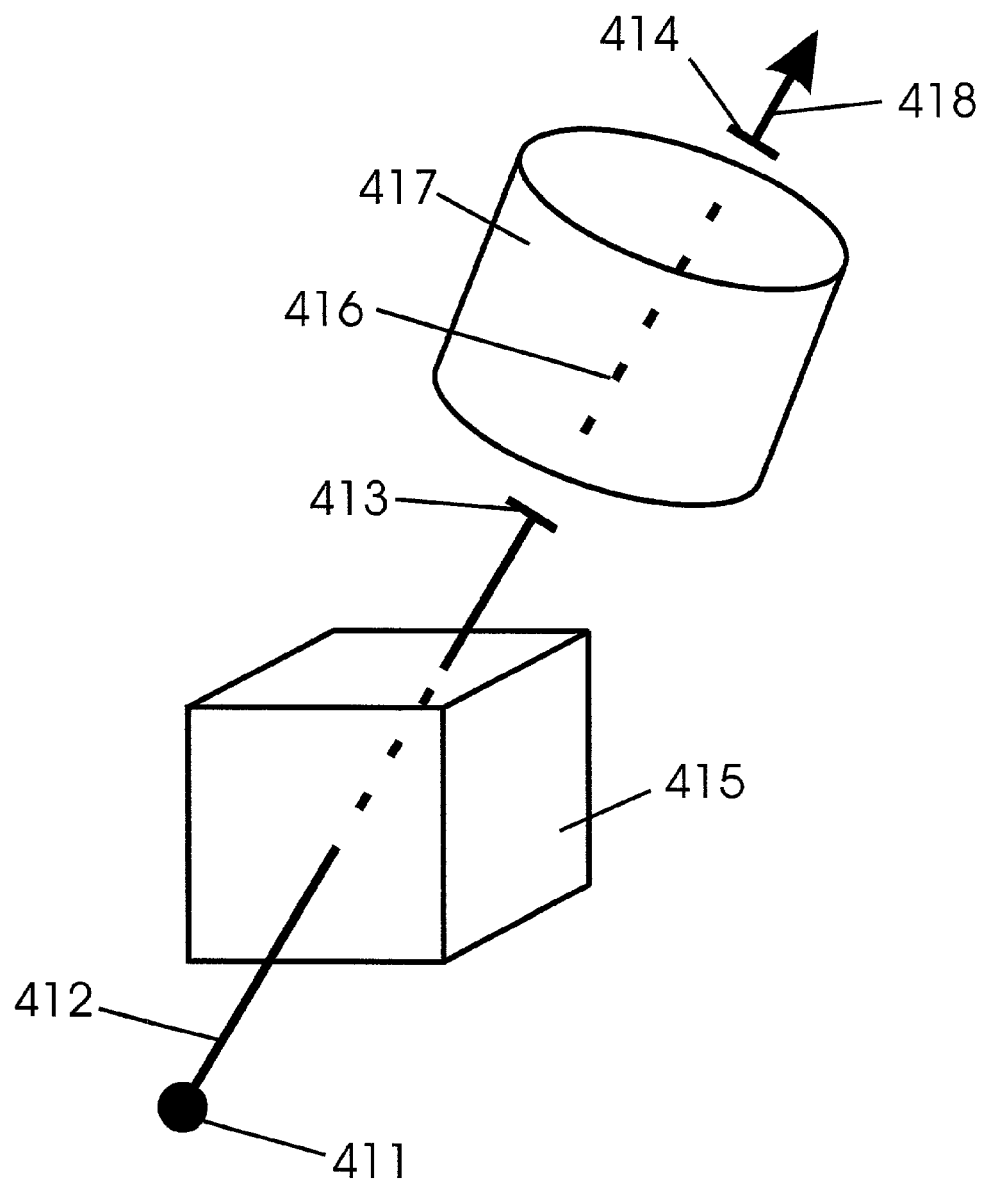
Figure 42:
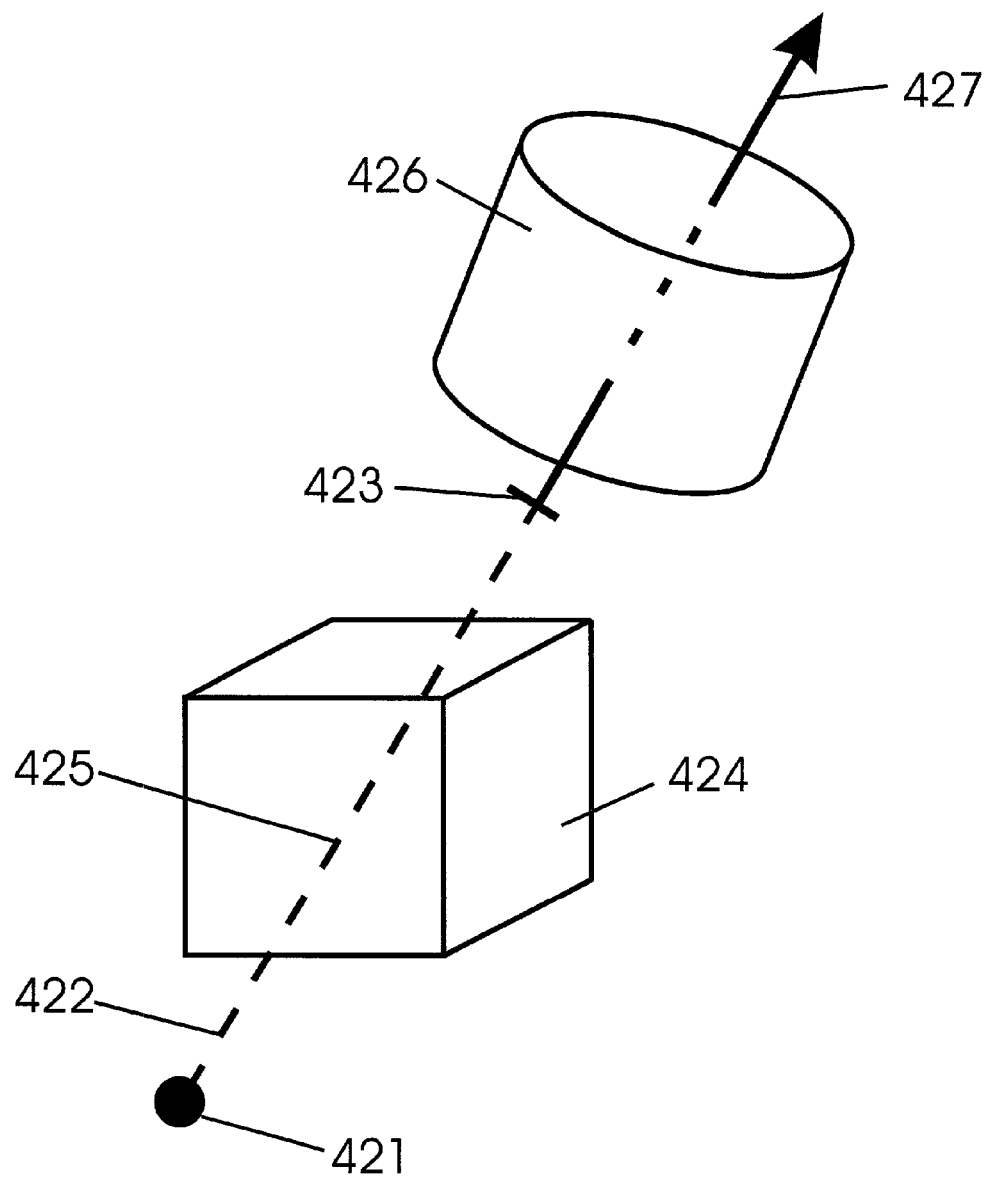

By applying certain rules to an embodiment of one system, an address state of a mobile unit is configured to include a range or range gate. A description of range limits or complementary minimum and maximum distance limits with respect to the point reference may be used to define a particular region of interest. For example, two objects which lie on a single line with respect to a user's perspective may include one object further from the user than the second which is nearer to the user. To express an interest in the farthest lying object, a user may set an address indicator range gate. FIG. 41 illustrates this case more completely. Position reference 411 and direction reference 412 form an address indicator which passes through two objects. An address indicator may be provided with a range parameter having a minimal distance limit 413 and a maximal distance limit 414. The cubic object 415 otherwise would be said to form an intersection with the pointing vector as the address indicator passes therethrough, however it is not within the range gate so it does not form an intersection for purposes of this discussion. On the other hand, the portion of the address indicator within the range gate, i.e. marked as line segment 416 in the drawing, does pass through the circularly cylindrical object 417. Thus it is said to be addressed.

It is entirely possible to form a range with specification of an upper limit and without a lower limit. Point reference 421 and direction reference 422 together with maximal distance limit 423 form a address indicator to represent an address state. An intersection is formed between object 424 and the address indicator at line segment 425. Because object 426 lies outside the range, no intersection exists between the pointing vector and that circular cylinder object despite the fact that the object lies on the direction reference 422. 427 is said to be a address indicator which represents an address state having a range limit.

Figure 43:
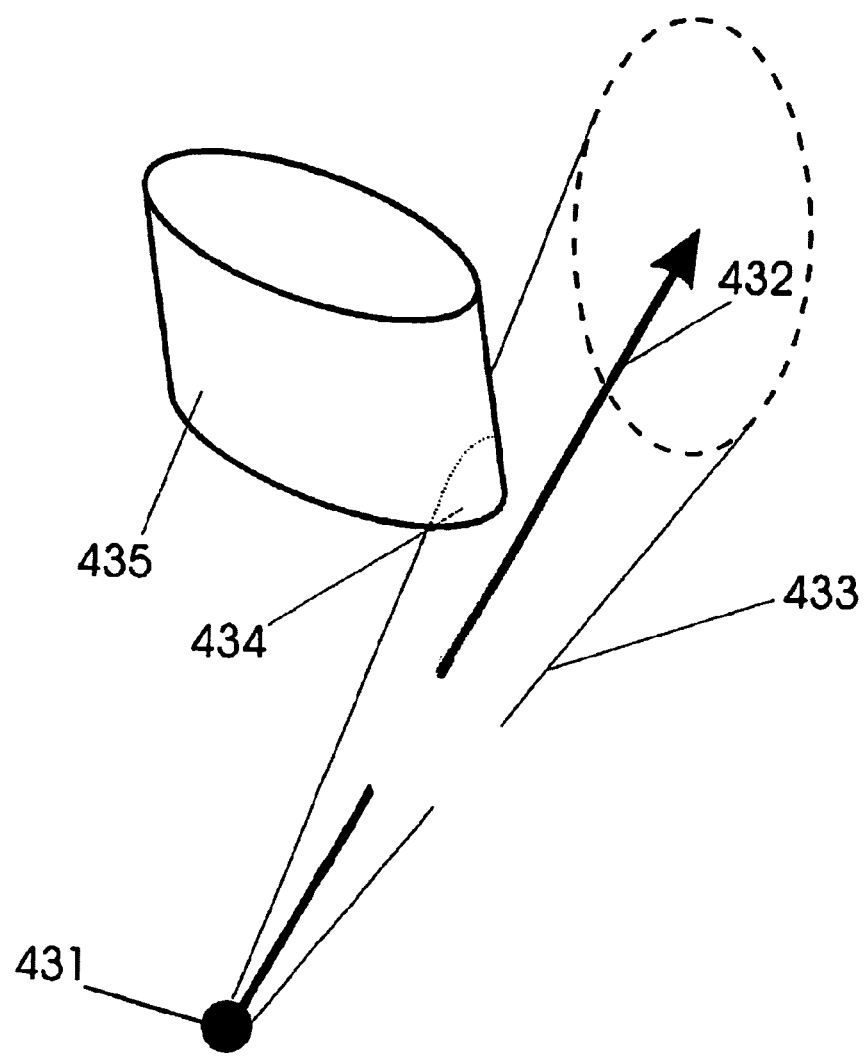

FIG. 43 is provided to show an address indicator having finite transverse extent comprised of a point reference 431, direction reference 432 together with a range gate forming a conic section 433, having intersection represented as portion 434 with a circular cylindrical geometric descriptor 435.

Figure 44:
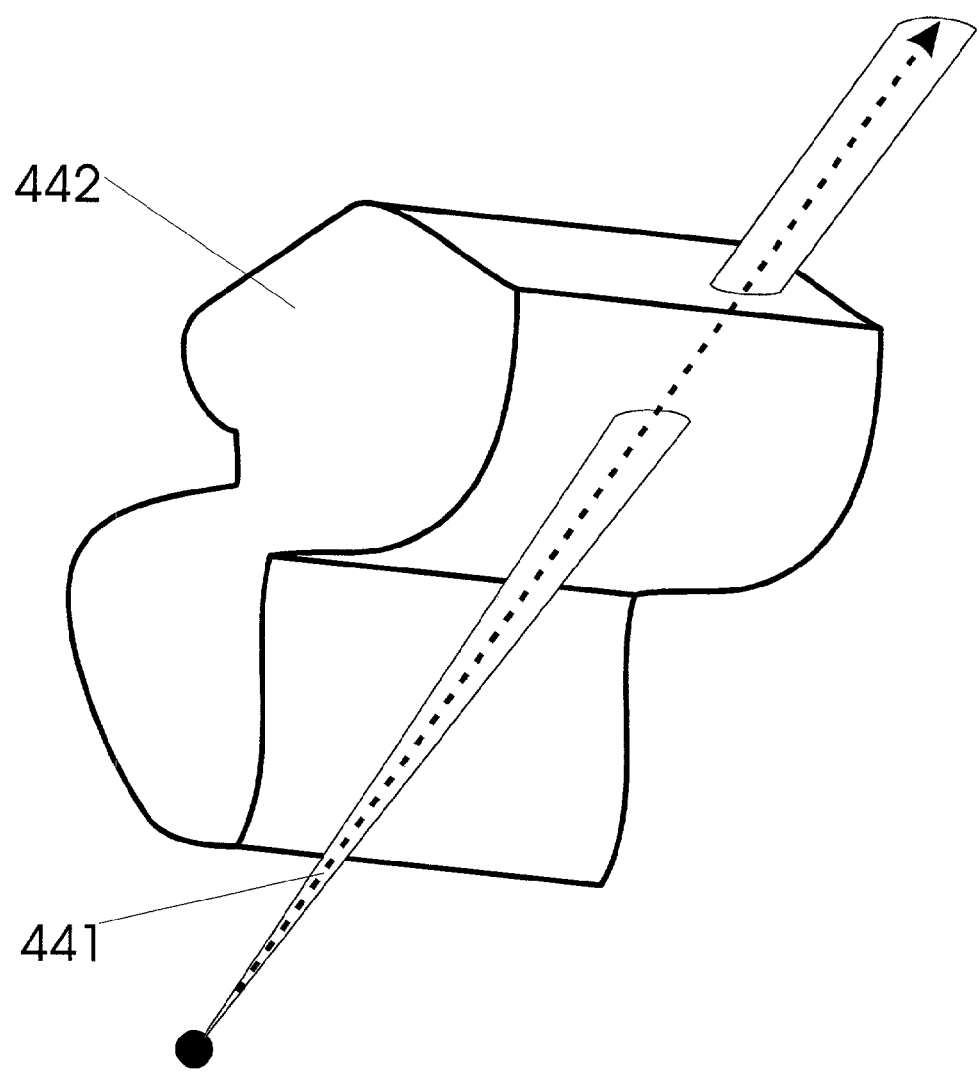

Finally, the address indicator 441 of FIG. 44 is shown to form an intersection with an irregularly shaped geometric descriptor 442.

When using a system to address objects having a position not changing in time, or having any other factor which is time dependent, a time-of-day parameter may be omitted from a description of the address state of a system. However, a time of day parameter is very important to many other applications. For example, in applications where a menu is displayed for restaurant type objects being addressed, it is important to alternatively display the dinner or lunch menu in agreement with the time-of-day. For bars and clubs, a 'happy hour' includes specials valid only for certain hours; those specials should only be presented during appropriate hours. In certain cases, an object has a geometric descriptor which changes shape and/or position in time. The highly regular trains in Japan move with very certain and well defined regularity. Thus, a geometric descriptor may be configured to move with the train as a function of time. Users of systems of these inventions are thereby enabled the function of addressing a moving train to learn more information about the train. Accordingly, some preferred systems include an address state having a time-of-day parameter.

As an illustrative example, the following information is provided to describe a particular address state of a certain device.

---
Latitude: 32° 21' 57"
Longitude: 117° 34' 25"
Altitude = 143'
Heading = 294°
Tilt X (Pitch) = 23°
Tilt Y (Roll) = 0°
Range Gate = 5'–200'
Pointer Extent = conic, 2°
Time of Day = 21:28 GMT

---

It is easy to understand that alternative units may be used, however, one will appreciate that regardless of the particular units used, an address state describes the pointing nature of a device as defined by the parameters themselves rather than any particular systems of units and coordinates.

It will be appreciated that subsets of these address state parameters may also form useful systems and address states which omit any of these parameters may be included as certain versions of these inventions. It is also to be understood that other parameters may be introduced which specify the physical state of a mobile unit as it might relate to addressing an object. Accordingly, use of such parameters may also be considered as versions of these inventions.

To make a determination of the values for each of the parameters of an address state, the system is equipped with means for providing those values. Although one system may use a different arrangement than another, arriving at parameter values for an address state as described is essential to the step determining the address state of a mobile unit. For example a mobile unit may be provided a clock or a data link to a clock.

Special Topic 3: Multi-media Data

In addition to a geometric descriptor, a database record also has information elements associated with an object. Included in these information elements are a special class herein referred to as multi-media information elements. When systems of these inventions determine that a particular object is being addressed, a response may include recalling multi-media information elements from the database and presenting that information at a user interface of the mobile unit. In a simple example, when a user points a mobile unit towards an object, the device may 'recognize' the object via a test for intersection and provide an audio announcement to the user regarding the object's identity.

One can more perfectly understand this and related concepts with reference to FIG. 45, where a mobile unit 451 is illustrated as being pointed, via pointing vector 452, towards a restaurant building 453. The system may be set in a special mode to provide an automatic response whenever a known object has been addressed. In this special mode, objects upon being addressed, cause an identification step to be executed whereby the mobile unit recalls an object identity audio clip from the database and plays that clip at an output type user interface, for example a speaker 454. The speaker produces sound waves 455 to alert the user that the device is being pointed at "Tony Anita's Pizza". This example illustrates a first type of multi-media information element which may be associated with a particular object, stored in a database, recalled in response to an object being addressed, and presented at a user interface. There are other types of multi-media information which similarly can be presented to a user.

Moving graphics are quite popular on Internet web pages. Since moving graphic devices enjoy benefit of having minimal bandwidth requirements, they will prove to be popular in devices of these inventions as well. In addition to the audio clip presented above, a further response to a mobile unit's address indicator being directed towards a pizza restaurant object by way of its geometric descriptor may include presentation of a moving graphic on an image display screen. FIG. 46 shows a mobile unit 461 having a pixel display screen 462 as an output user interface. Three images 463, 464, and 465 having slight variations between them, played serially with a rapid frame rate, gives the impression of Tony Anita 466 waving 467 his hands in the air. Such a display allows the restaurant to invite a user for lunch in a clever and attractive advertisement played in response to the restaurant object being addressed by the user.

After a brief introductory phase, the system programmed to deliver information of greater utility, shows what is for lunch. FIG. 47 includes a mobile unit 471 being pointed via address indicator 472 at the pizza restaurant 473, where a response further shows a text list presented on display screen 474, including a pizza menu 475, and specifically 'Four Cheese' pizza 476. The 'Four Cheese' Pizza may be ordered directly by selecting the item from the list and clicking a trigger thereby causing a request function to send a message to the restaurant. This very important concept illustrates yet another incredible use and function of these inventions to cause an action at the object being addressed as compared to an action at the mobile unit is of spectacular consequence.

Although simplicity of these drawing figures suggests that Tony Anita's Pizza is readily viewed by a user from the user's location, such may not actually be the case. A user may have pointed the device to the restaurant which is hidden behind other nearby buildings. In this case as illustrated in FIG. 48, a map 481 of the neighborhood is played at the output user interface, a display 482, as yet another type of multi-media information element associated with the object Tony Anita's Pizza 483.

Although a few types of multi-media data are illustrated here, one will appreciate that other types not shown as examples may serve valuable function in various systems of these inventions. Digitally recorded information such as video files, text fields, icons, photographs, control objects, et cetera, among others, are examples of multi-media data which may be included in an object record as 'information elements'. In agreement with methods of these inventions, they may be presented in response to objects of which those information elements are associated, being addressed.

Special Topic 4: Objects

Although examples above generally include objects which are concrete and of readily discernable structure for example buildings and the like, under some circumstances, an 'object' may not have any physical structure at all but may never-the-less have a geometric descriptor associated therewith. In these cases, an object may be referred to as a 'virtual object'. An example is the restricted airspace over a sitting president's residence, The White House. A rectangular cubic volume of space delimits a region in which unauthorized air travel is strictly prohibited. This is one example of an object having a discrete spatial extent which may be described by a geometric descriptor whereby the object is merely space and has no physical part or concrete structure. Similarly, an infinitely thin planar region may form an object of interest to which a geometric descriptor may be associated and thus systems of these inventions may address. An example of this type of object is the boundary of a baseball playing space known as the foul ball plane. Extending in a vertical plane from home plate and into the cheap seats, the foul ball planes, there are two on each field, marks the limits of the playing field. A foul ball plane may be a virtual type object in certain versions of these inventions.

Further example include cases where an 'object' may be a group of things. Use of the singular form of the word 'object' is not intended to imply there be a limit of only one 'thing' in the object. A collection of buildings such as a group of related apartment units may form a single object for purposes of a geometric descriptor. Thus a large plurality of buildings in a group may be included as a single object having one geometric descriptor.

It is not a requirement that objects be stationary. Moving objects, so long as their motion is well known to a computer system via some means, are fully considered as objects which may be addressed by systems of these inventions. An interesting example is the moon. This object moves quite regularly with respect to GPS sattelites and the Earth. Further all planets similarly move about the sun in a well known and regulated manner. It is a simple matter of applying a bit of mathematics in view of sidereal time to precisely locate a planet. Therefore, Pluto may be an object for purposes of these inventions.

Special Topic 5: Database Filtering

An important aspect of data management, with regard to limited bandwith systems and further in view of the position dependent nature of data of interest, includes forming a data subset and caching it in a readily accessable fast memory. For example, when a mobile device of the invention is located in San Francisco, data relating to objects in Detroit are not of significant consequence. It is unlikely that the General Motors headquarters building would be addressed by users in San Francisco (although, strictly speaking it is possible). Accordingly, programming can be arranged to read a data set and extract portions of data therefrom whereby the extracted data depends upon the user's current position. That position dependent dataset then is transmitted to a special memory which is limited in size but fast in access operations, further that memory can be within the hand-held device thus reducing round trip requests/responses on the network.

In this regard, some preferred mobile units may additionally contain a memory which supports this function. Preferred methods include steps whereby a pre-determined dataset is transmitted to a mobile unit for fast access upon multiple address steps.

D. Illustrative Examples

As great detail has heretofore been provided with attention to completeness and clarity with regard to a description of the methods and devices, that disclosure is now further improved with a few illustrative examples. These examples show, when properly arranged and provided with detailed information, how these systems will operate to provide exceptional utility and value to all persons who are exposed to these remarkable inventions.

Special Operational Mode #1; Cursor Driver

It is now quite easy to appreciate that the pointing direction of a mobile unit can be manipulated to address objects. In addition to this, there exists special functionality which cooperates with the purpose of these inventions; this functionality is also driven by particular movements of the mobile unit. While the reader is now particularly aware of how systems cooperate with the address states of a mobile unit, the systems heretofore described were concerned with static address states where only an instantaneous address state was considered. In some special versions of these inventions a particular well defined change to an address state controls or triggers useful function.

As thoroughly described in the section on apparatus, tilt sensors are configured to measure angular displacements about two orthogonal axes. Thus rotations about the mobile unit reference direction are detectable and useful to drive functionality some versions of these inventions. A very careful observer would note that a twisting motion about the mobile unit reference direction does not necessarily cause the object being addressed to change. An address indicator can remain unchanged as the mobile unit is rotated about the reference direction axis. Careful observers will note this is a special case where the address state changes but the address indicator remains the same; i.e. best versions have an address indicator which is independent of rotation of the mobile unit about the reference direction axis. This is not always the case but remains the in most examples detailed in this disclosure. (See FIG. 36 for an exception). These motions of the mobile unit can be coupled to software event triggers which operate to launch various actions in computer code including branching into subroutines to perform predetermined tasks.

Similarly, angular rotations about a vertical axis are measured as changes in heading. These motions can also be used with software event triggers; although it is noted that in this case the address state is changed in a manner which may cause objects being addressed to change. Accountability for such complexities is considered in various operational mode options. This is presented in further detail herefollowing.

With attention directed to FIG. 50, the reader will be able to more fully appreciate these concepts. A pretty young lady user 501 extends her arm to point a mobile unit 502 at the Karl Strauss Brewery & Grill and thus causes same to be addressed because pointing reference 504 forms an intersection with banner 505. Set in a special mode for restaurants and in response to a restaurant type object being addressed, the computer offers a toolbar of icons appropriate for such object types on the mobile unit's output user interface, a display 503.

FIG. 51 illustrates a mobile telephone 511 used by the lady of FIG. 50. The device includes an output type user interface in the form of a pixelized display 512, whereon the name of the object being addressed appears in an identity header 513. Additionally, a 'toolbar' 514 of important icons which relate to the object being addressed includes a 'menu request' icon 515 which is selected via the highlighted selection cursor 516. The display arrives in this condition automatically because the address state of the telephone includes an address indicator 517 which is pointing at a geometric descriptor associated with a restaurant type object (see FIG. 50). The computer knows the object being addressed is a restaurant type object because the results of a database search produces a dataset of addressed objects where one record corresponds to the Brewery and a field in that record identifies the class of the object as belonging to the restaurant class. Provision for sub-classes may additionally be included such that the computer could be notified the addressed object is a restaurant of the type serving American food. Presentation of toolbars as well as other information can be made responsive to the fields containing information relating to objects being addressed.

In view of the fact that the lady pictured desires placing a telephone call to the restaurant, she would like to select the 'place call' icon and deselect the 'menu request' icon. To effect this, she must operate the device in a prescribed manner. FIG. 52 sets forth illustration of such an action used to drive movement of a selection cursor. Pretty lady 521 holding mobile telephone 522 simply twists 523 her wrist slightly in a clockwise manner which is detected by tilt sensors. Note the pointing vector 524 remains without change and the banner object 525 remains addressed throughout the twist action. In this situation, before and after address states are considered. It is not an instantaneous address state which triggers action but rather a particular change to the address state from one instant to the next.

In consideration of the drawing in FIG. 53, showing telephone 531 with display screen 532, having object identity header 533 and toolbar 534 including 'place call' icon 535 and selection cursor 536, one can agree that simple twist motion can be used to drive a selection cursor without change to an address indicator.

While it cannot be denied that the above described tool is incredibly useful, there are still further useful arrangements which provide significant function to devices of these inventions. Where it is not a concern that the address state is changed, a different rotational motion may be used to drive a selection cursor about a display screen. This alternative technique, a special select mode, is extremely versatile in that it yields greater total control than the previously presented technique.

Figure 54:
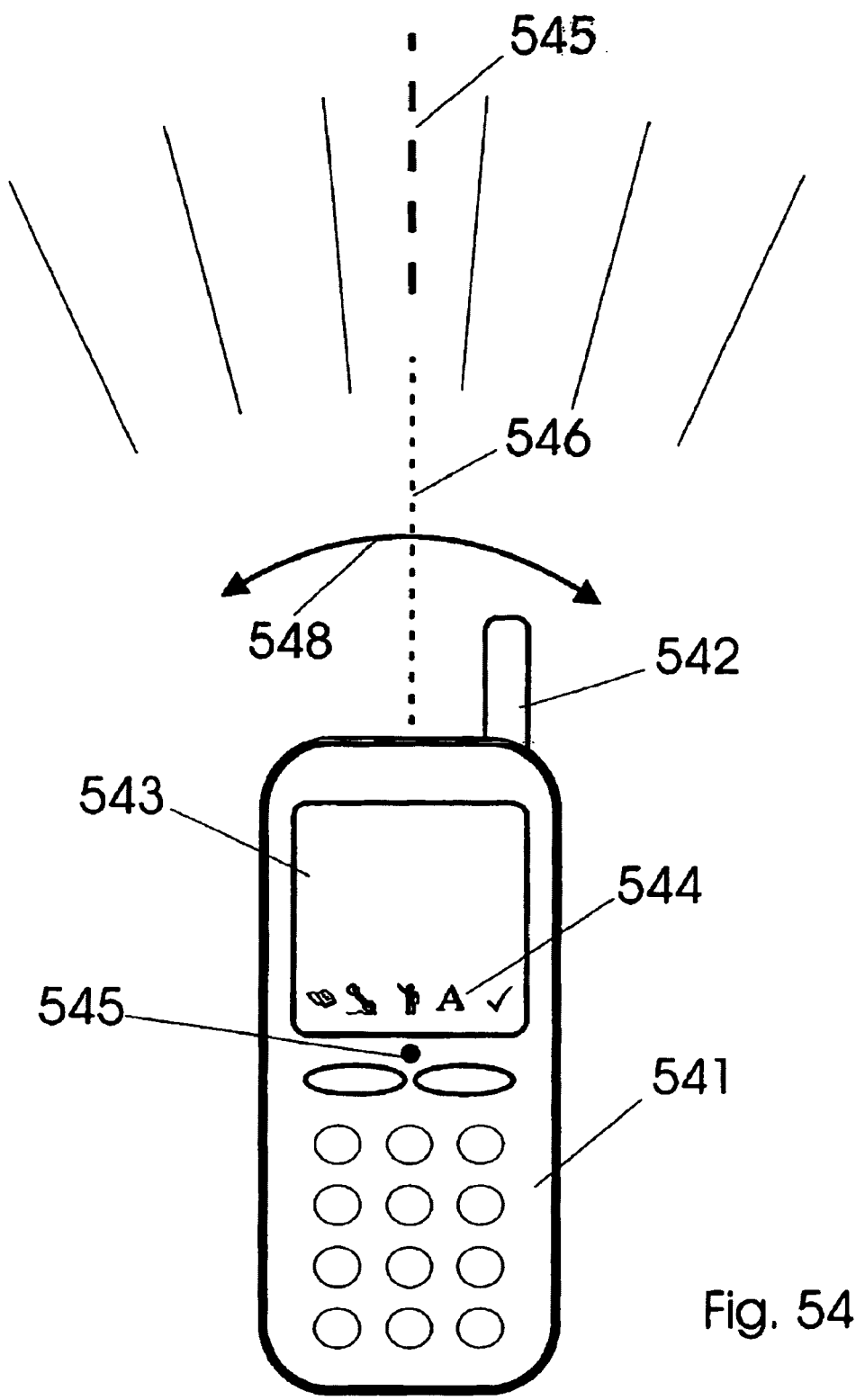
Figure 55:
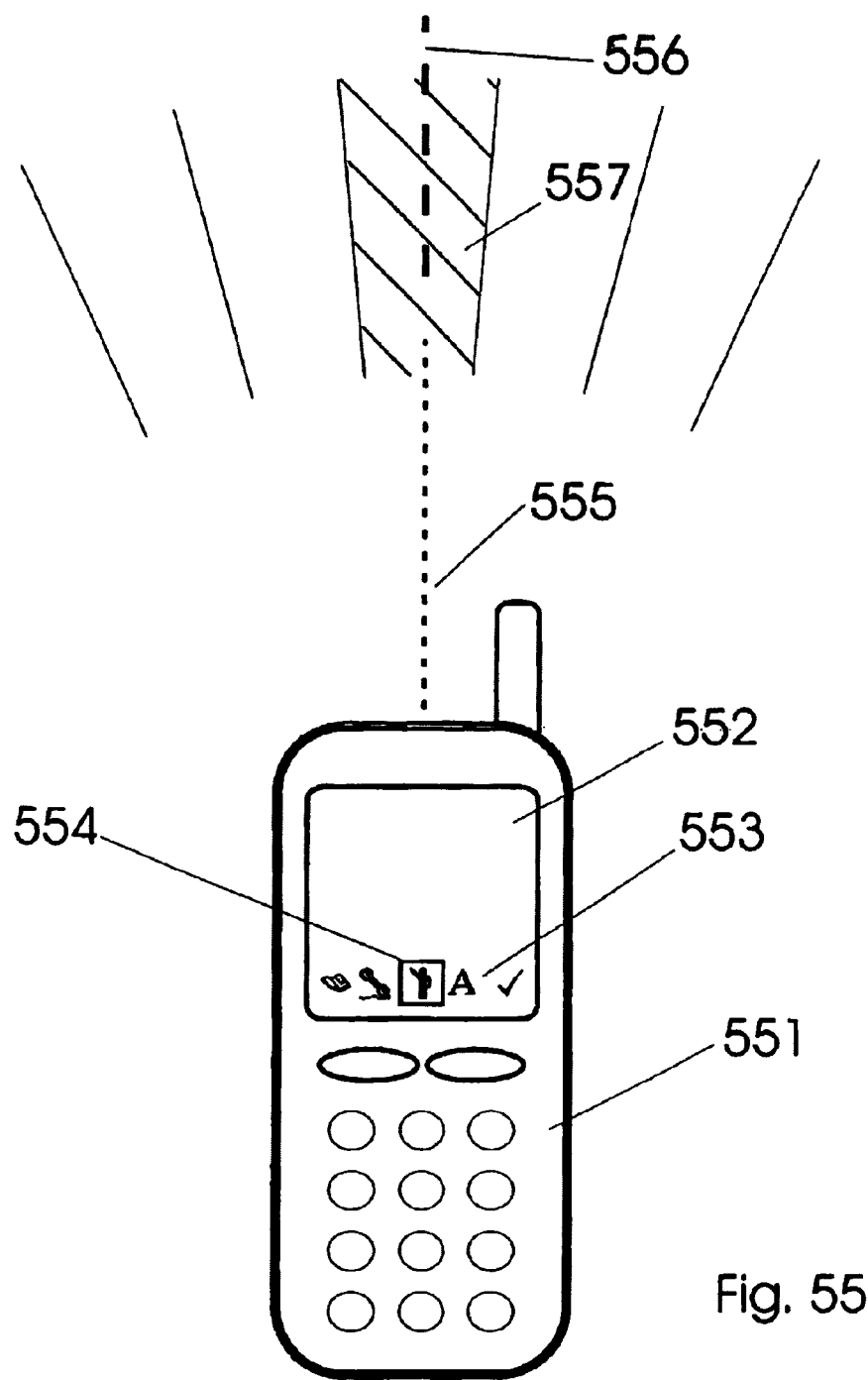

FIG. 54 consists a mobile unit in the form of a telephone. The telephone has a body 541 which is elongated in nature where the length is considerably greater than the width and thickness (not shown). A radio frequency antenna 542 extends from and protrudes outwardly from the telephone body to give a natural feel and a bias with regard to a pointing direction; the antenna suggests a natural pointing direction for the telephone. A display screen 543 is an output type user interface of the type having a pixelized array of discrete picture elements. The a pixelized display screen nicely supports use of icon devices in a toolbar arrangement 544. The mobile unit may have a point reference 545 in the geometric center of the device. In agreement with a natural pointing direction, the mobile unit reference direction 546 is arranged parallel with the antenna on the axis of the elongated telephone body. For purposes of this discussion, the drawing includes five regions separated by thin lines and a special marker dashed line 547.

In an initialization step of this special select mode, a display screen toolbar as well as a direction origin may be set as follows. The mobile unit 551 having a display screen 552 with toolbar 553 having an icon in the center arbitrarily initiated with the 'focus' or the selection cursor 554 (the terminology which includes the word 'focus' is consistent with that used in programming arts and languages to refer to a programming object having the attention of the current process). Upon initialization, mobile unit pointing direction 555 causes an origin direction 556 to become set. The field indicated by stippling in the drawing is the addressed field 557.

Figure 56:
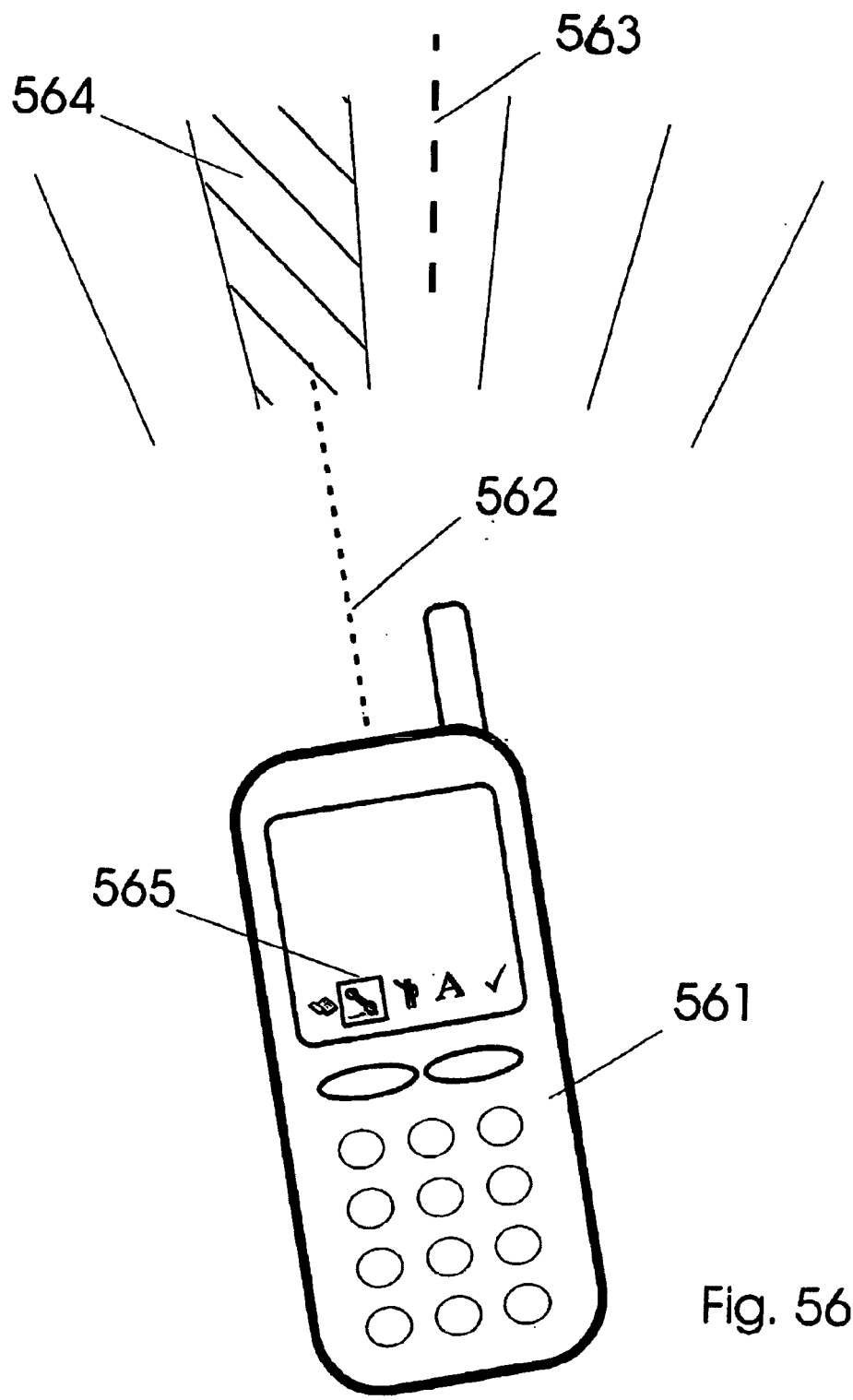

While placed in a special select mode, a user wanting to change the selection cursor from the center icon to either of the other icons can cause such action by merely manipulating the pointing direction of the phone to cause the selection cursor to move accordingly. FIG. 56 illustrates a mobile unit 561 having been initialized as described above and further having been rotated about a vertical axis by approximately ten degrees counterclockwise whereby the telephone pointing direction 562 no longer points towards the origin direction 563 but rather now points to a newly addressed field 564. This rotational displacement to newly addressed field 575 is detected via the attitude determining means and causes the computer to shift the selection cursor 565 to the adjacent icon to the left, the same direction as the angular displacement.

Figure 57:
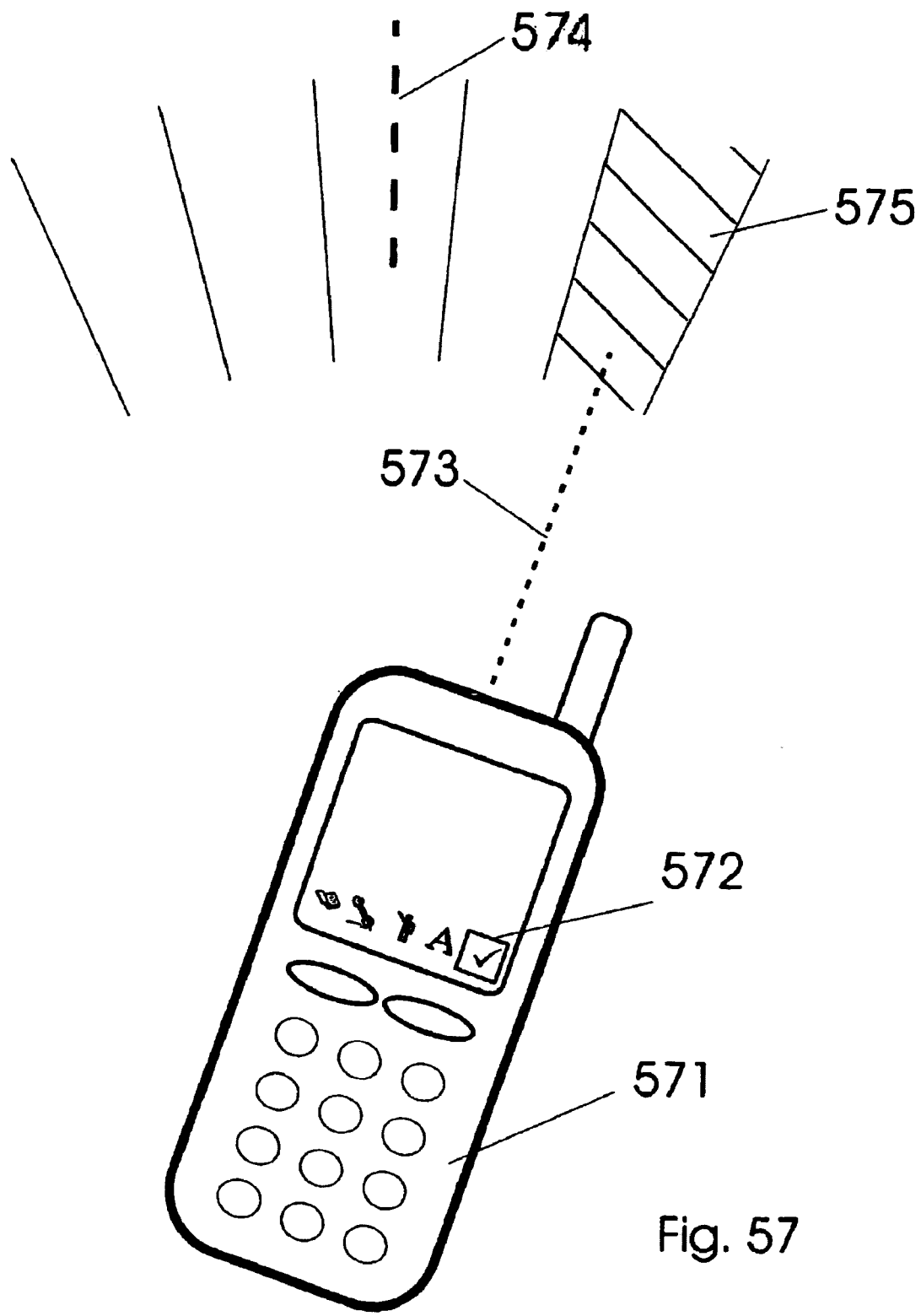
Figure 58:
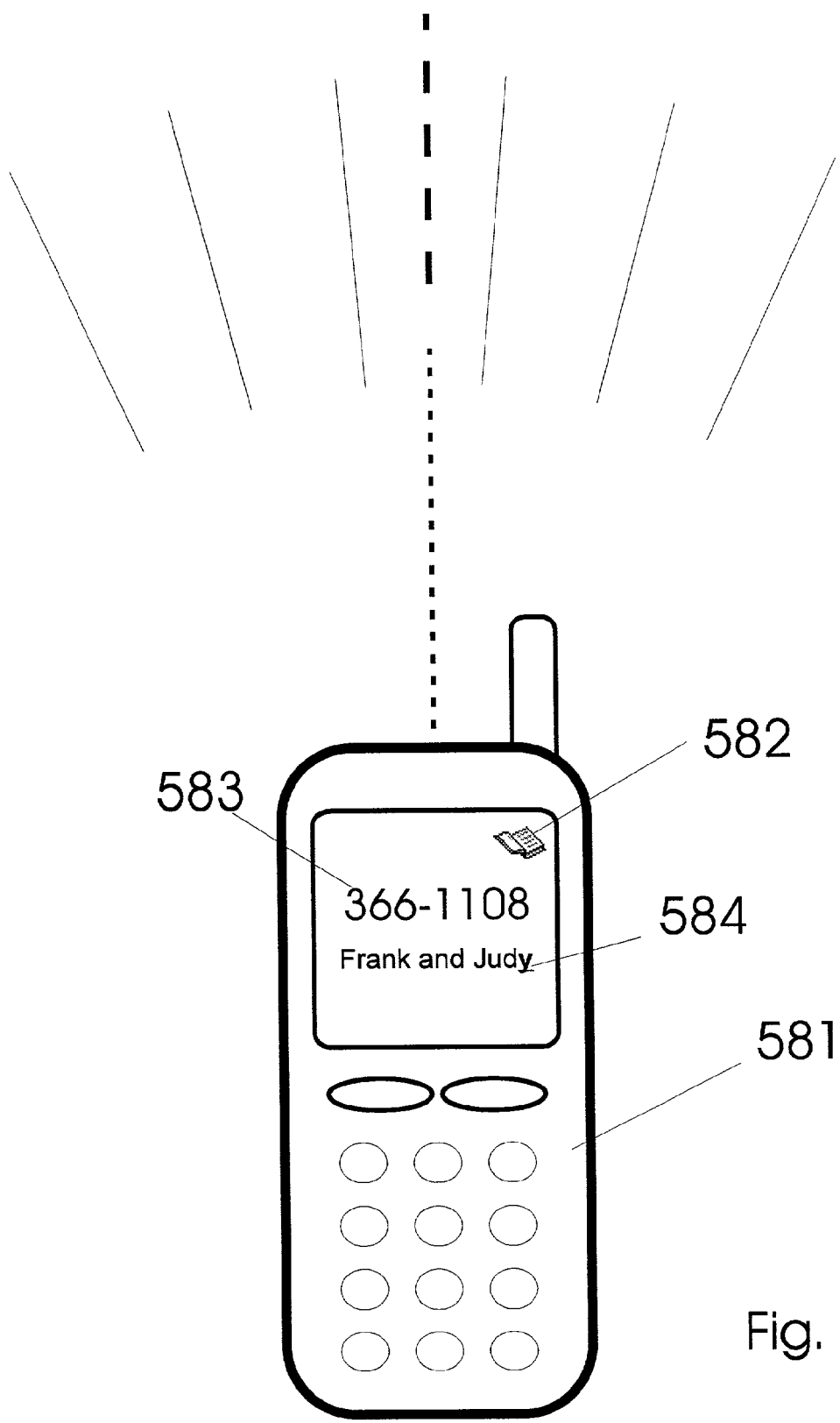

Similarly, a user can use the mobile telephone 571 of FIG. 57 to cause the selection cursor 572 to engage a 'check' icon. In accordance, pointing direction 573 has been displaced from origin direction 574 by approximately 20 degrees in a clockwise rotational displacement. Although this manner of choosing from a plurality of function icons is quite useful on its surface, the full utility of this selection mode can be better appreciated in view of the following example directed to a more well-known problem.

When entering alpha-numeric data into a device having a limited keypad there exists the problem of repetitive and complex key stoke combinations to arrive at a certain character. To relieve this problem, a special selection mode has been devised and invented. First consider the telephone 581 depicted in FIG. 58. Imagine this phone has been placed into a phone book data item entry mode as indicated by phone book icon 582. A telephone number "366-1108" 583 is entered as a number to be stored in memory along with the name of persons assigned that telephone number, "Frank and Judy", indicated by name label 584. While in a conventional telephone creating or modifying the name label requires entering alpha-numeric characters via a key pad, these inventions include a special selection mode where entry of alpha-numeric characters is made simple via mere rotational displacements of the telephone.

Figure 59:
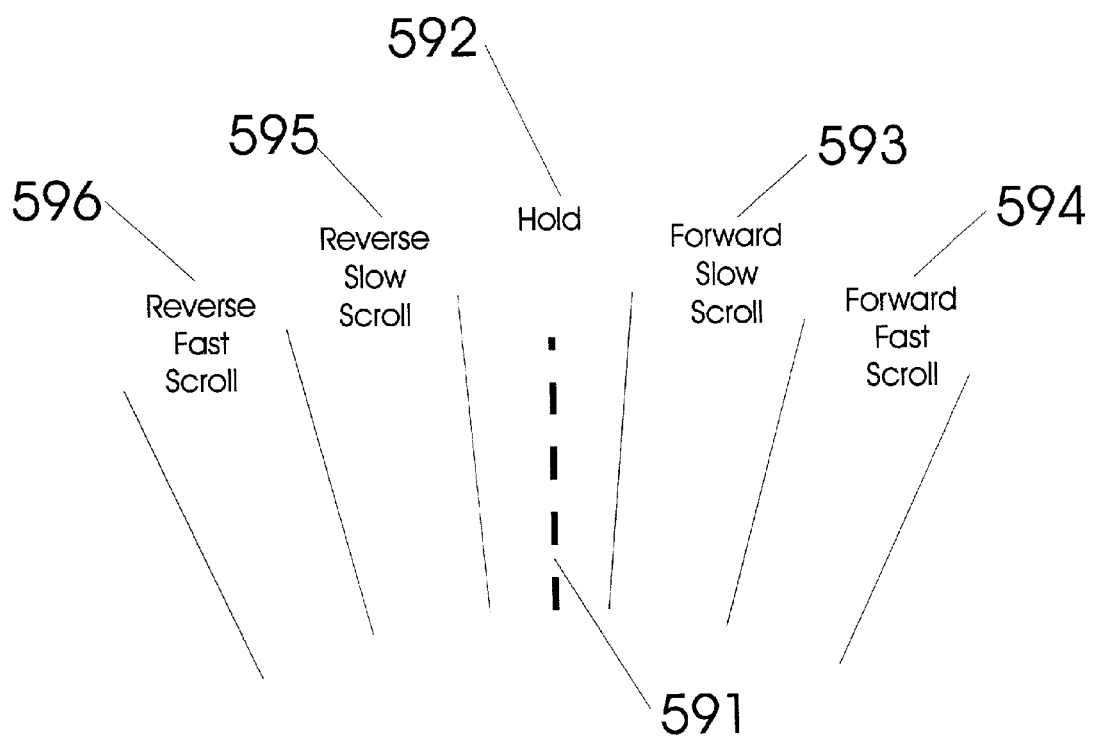

While in a special selection mode, no regard is given to objects being addressed and no database searches are necessary. Rotational movements of the mobile unit cause various scroll activity at the display. With reference to FIG. 59, one preferred technique is illustrated. Similar to the last arrangement a set-up step includes establishing an origin direction 591. While the mobile unit addresses the middle field, a 'hold' function is realized and the character remains unchanged. To advance to another character in a character set one could enter a 'Forward Slow Scroll' 593 function by addressing the field right of and adjacent to the center field.

A rotation further causes a 'Forward Fast Scroll' 594 function to be initiated whereby the characters are rapidly changed from one to a succeeding character. Similarly, a 'Reverse Slow Scroll' 595 and a 'Reverse Fast Scroll' 596 function are achieved via rotational displacements of between about five degrees and fifteen degrees and fifteen degrees and twenty-five degrees respectively in a counter-clockwise sense.

Figure 60:
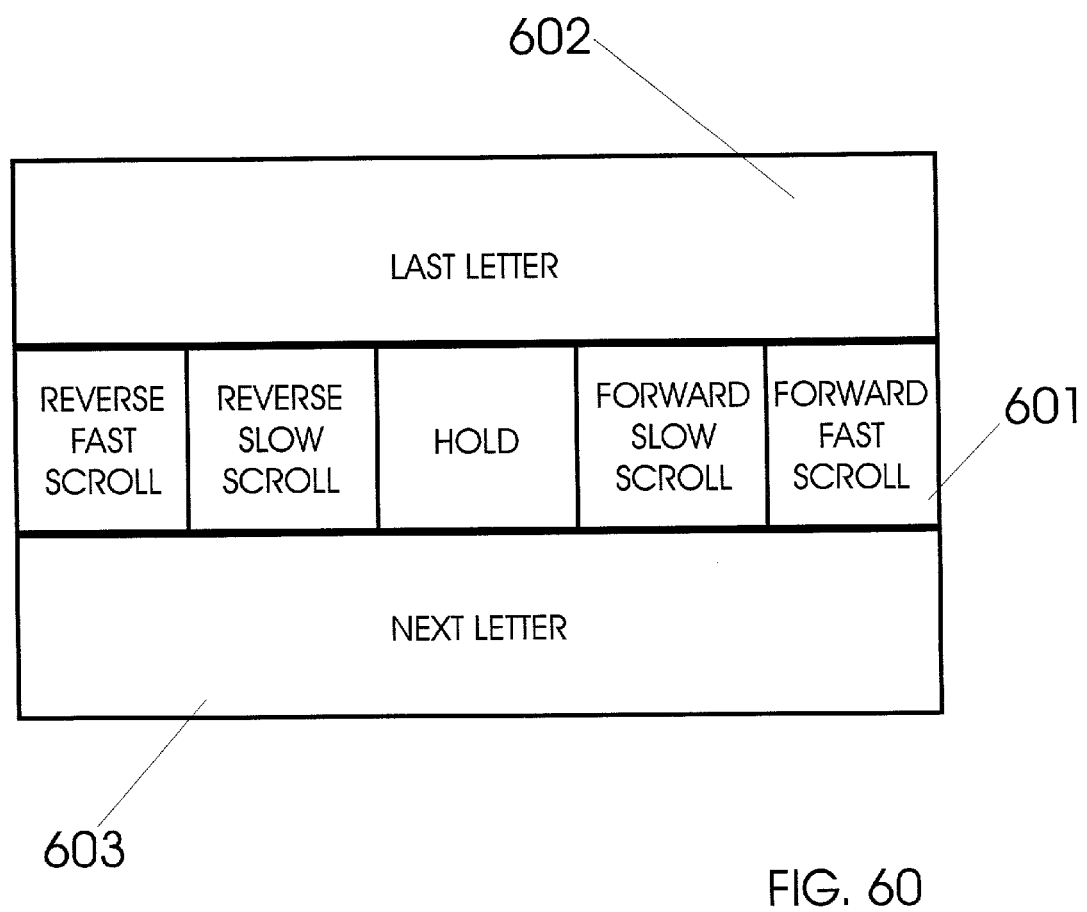

The scheme is not limited to angular rotation in a horizontal plane. Rotations characterized as pitch could also be detected and used to cause additional function. FIG. 60 shows a special grid of labels in a middle row 601 including: 'Reverse Fast Scroll'; 'Reverse Slow Scroll'; 'Hold'; 'Forward Slow Scroll'; and 'Forward Fast Scroll' character advance functions. In addition, a top row 602 corresponds to a 'Last Letter' function and a bottom row 603 corresponds to a 'Next Letter' function.

Figure 61:
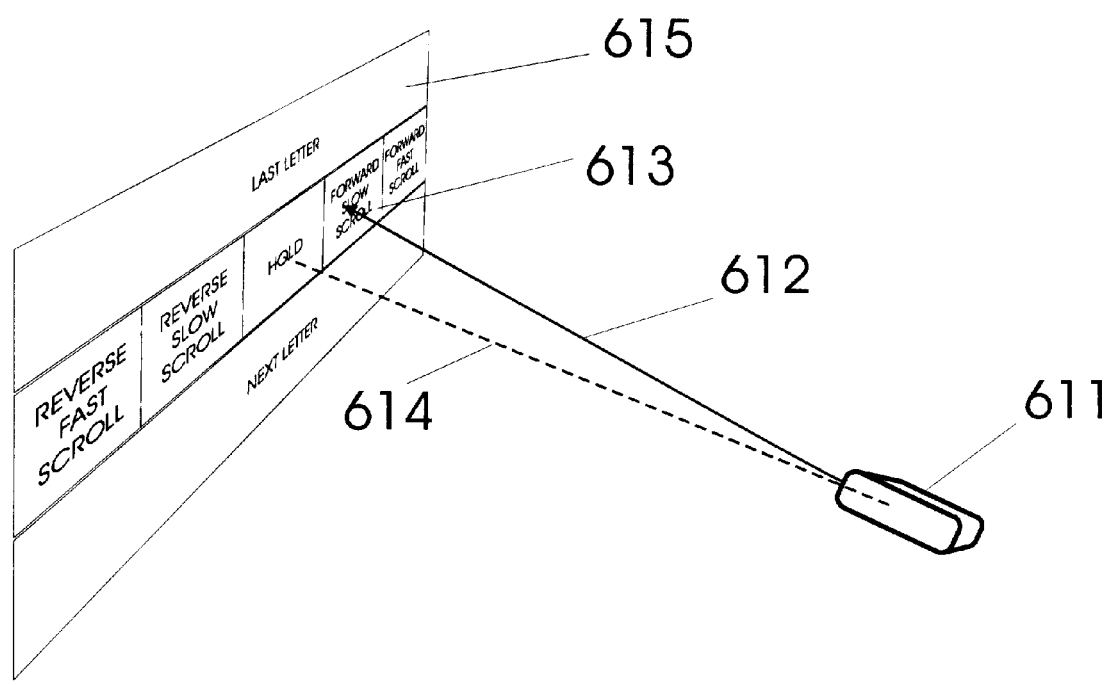

FIG. 61 shows the grid of FIG. 60 in a perspective view with a mobile unit of these inventions 611 pointing indicated by arrow 612 towards 'Forward Slow Scroll' 613 field. The reader will be reminded that the present pointing state is compared to an origin pointing state illustrated as 614. To cause a 'Last Letter' action, the mobile unit is tilted upward at least five degrees causing the 'Last Letter' 615 field to be addressed. It should be noted that this mode ignores position altogether and it can be used wherever a mobile unit is at anytime.

This very important example illustrates that abstract objects such as fields assigned to certain functions may be addressed with mobile units of these inventions. More particularly, a user can enter and exit functional modes of the computer by changing the address state of the mobile unit.

Although the example presented is considered exceptional, of more importance is the fact that general computer function is engaged and controlled via changes to address states. Accordingly, one should be cautious when considering the scope of this part of these inventions. It should not be limited to functions where characters are changed but rather the techniques apply to any computer functions which are to be set into action.

Special Operational Mode #2; Point to Call

Although briefly mentioned in several places above, a 'point-to-call' function can be better understood in view of the following more complete description. As some preferred versions include integration with a common mobile telephone, telephone services may cooperate well with function provided by 'point-and-click' activity. Presently, when a person wishes to contact someone by telephone it is a requirement that a numeric address, a telephone number be entered in order that the call be routed to the desired recipient. Without a telephone number, it is impossible to connect the call. To get the correct telephone number, a user may employ the services of a directory assistance at extra costs, both money and time, to the caller. In addition, it requires the sometimes difficult step of explaining to an operator the correct title of the intended recipient which is not always known to the caller. Due to these difficulties, among others, this process is quite unpopular.

In contrast, a user may easily place a telephone call with the aid of concepts presented here. By simply using a 'point-and-click' action, a user can become connected by telephone to a desired entity. The mobile telephone having a pointing reference is directed by the user towards an object to which a telephone call is to be placed. Objects may includes such entities as hotels, restaurants, ticket agencies, et cetera. Any object which has a telephone associated therewith can become the subject of this special operational mode. Upon a trigger action, the mobile unit determines the object being addressed, recalls from the database data relating to the object including a telephone number, and completes the point to call action by initiating a voice connection to the addressed object via wireless link. The activity remains mostly transparent to the user, who merely has to point the device and click a switch to place a call.

Special Operational Mode #3; Friends and Family

To locate members of a social group, or to facilitate meetings of persons belonging to a club, systems may be arranged to cooperate with this objective. The opposite is also true; where a person is an undesirable contact, a persona non grata, or a person to be avoided such as in the case where a restraining order has been placed against one individual with regard to contact with another, devices can be arranged to aid managing these scenario.

A group of persons operating in conjunction with others from the group may act as follows. By 'registering' with the special operation mode manager a person alerts the system to the desire to be fount by others in the predefined group. When another group member attempts to learn of the whereabouts of others via a point-and-click action, the system may respond by providing indication of the presence or absence of group members or individuals.

In other schema, users are provided via computer functionality the ability to create private virtual objects. For example a user may wish to place a billboard for others to see where the billboard is only known to particular registered users. The data associated with the virtual object, for example text data, may also be created and provided by an initiating user. By applying point-and-click actions, a user in 'the know' enjoys the opportunity to address the virtual object set up by his friend.

Where a court orders a person to refrain from coming into contact with another users of apparatus and methods may check to see if a building is 'clear' of certain persons who may be registered by order of a court.

Special Operational Mode #4; Shopping

Shopping tasks are simplified in view of the devices presented here. By now, most serious shoppers are aware of the bulk warehouse shopping stores sometimes operated under tradenames such as 'Costco' and 'PriceClub'. In these stores, huge palettes of product in extra-large sizes rests in rows upon rows of goods. A shopper will quickly fill a shopping cart or two with items before passing through the entire store. A simpler method for bulk shoppers is to point-and-click on items to be purchased. In this way, a data list is formed which can be brought to a checkout counter. While clearing checkout, store staff assembles and packages the entire order without need for handling the items at the checkstand. Arrangement for delivery may be immediate to the parking lot or postponed for delivery at a remote location. One will appreciate that casually walking the aisles of a superstore while pointing-and-clicking on items will simplify shopping. Accordingly, devices may be arranged to determine position and the pointing attitude of a hand-held device which thereafter is connected to a product offered for sale.

Special Operational Mode #5; Challenge Games

One cannot deny the importance of computer type electronic games which has partly inspired and accompanied the rapid development of the digital age. In that regard, it is important to consider that gaming strategies will quickly be built upon the foundation of the devices first taught and presented in detail here.

Gaming strategy may be developed from infinite sets of rules whereby rules relate in-part to positions of things in relation to positions of other things. When formed in cooperation with systems taught here, gaming strategy offers a completely new dimension to computer game theory. Computer games which bring the user's immediate environment into the action and objectives of the game will be enjoyed by all who carry a telephone. A few examples herefollowing suggest how games will be created to employ the powerful notion of 'point-and-click' in the real world.

Hide and Seek—Although the simplicity of 'Hide and Seek' suggests a child's game, we rely on it here as a clear and straightforward example. Players having mobile devices set out from the start of the game and travel to well dispersed positions; each player taking up a different location. Their mobile device, in communication with a central processing unit, i.e. via a network, reports the position to the game managing code. A geometric descriptor is formed for each player with regard to the position reported. Thereafter, the person who is 'it' must address locations where it is suspected that players are hiding. Upon being addressed, the game managing code makes a determination whether a player is hiding therein. On finding a player in this manner, the both the person 'it' and the player are properly notified. The last player found becomes the new person to be 'it'.

It is important to note that without modification whatever to the devices taught here, a game code running at a server transforms a device into a computer game type device. It should not be considered novel that one may dream up various games arrangements each employing the devices identical to those presented. Thus, the reader is reminded that no attempt has been made to catalogue all possible games scenarios, but rather we respectfully point out that devices of our inventions will be well positioned to be arranged as games of many sorts.

Special Operational Mode #6; Surveying

When configured properly, devices of these inventions are quite useful in surveying techniques and procedure. For example, excavation projects are troubled with the issue of unintentionally digging into facilities which are easily damaged. When digging to replace a aged and broken water pipe in a Point Loma residential neighborhood in California recently, the city workers had to take great care not to puncture a pipe carrying Jet5 type jet fuel; Point Loma is near the San Diego International Airport at Lindberg field. The project suffered considerable delays because the pipes carrying jet fuel could not be easily located.

Equipped with a mobile unit having position and attitude determining means and a connection to a database with detailed information relating to pipes, pipe types and their precise locations, construction staff could immediately determine where the jet fuel pipes were located and hence where it was safe to dig.

Similarly, a geologist can locate previously mapped mineral fields. By simply arriving in a mining field and pointing toward various suspect locations a geologist can receive detailed data found in previous explorations without having to read complex charts and make translations into the real world which are highly subject to error.

In addition, a shipping company can provide a ship with a computerized database of information relating to underwater formations including reefs and wrecks. A ship captain and navigator can point a device toward suspected underwater features to precisely locate them. To the casual observer this may at first seem unremarkable. However, in view of highly dynamic true perspective presentation of information, the systems are extremely powerful.

One will now easily and fully appreciate how systems configured with attitude and position determining means may be arranged in methods and apparatus for the purpose of addressing objects of interest, and further for providing information relating to those objects being addressed, and still further for manipulating information relating to objects being addressed. Although the present invention has been described in considerable detail with clear and concise language and with reference to certain preferred versions thereof including the best mode anticipated by the inventors, other versions are possible. Therefore, the spirit and scope of these inventions should not be limited by the description of the preferred versions contained therein, but rather by the claims appended hereto.

What is claimed is:

1. Pointing systems comprising:
a mobile unit;
a wireless network;
a wireless application gateway;
the Internet;
an application server; and
a database,
said mobile unit being in electromagnetic communication with the wireless network, the mobile unit comprising: a computing facility; a point reference coupled to a position determining means coupled to said computing facility whereby the position of the point reference is conveyed to the computing facility, a direction reference coupled to an attitude determining means coupled to said computing facility whereby the attitude of the pointing reference is conveyed to the computing facility, said attitude determining means is a dipole compass, an elongated case having a longitudinal axis, the mobile unit being operable for transmitting requests with encoded position and attitude information to said wireless network, said wireless network is coupled to a wireless application gateway operable for receiving encoded requests from the wireless network and translating encoded requests into Internet Protocol requests and routing them via the Internet to said application server, said application server being an application specific computer processor operable for receiving requests having position and attitude information therein from mobile units and processing those requests in accordance with a preprogrammed scheme, said database coupled to said application server via a communication link where information may be exchanged, the database having therein preprogrammed information including geometric descriptors associated with data relating to an object where said geometric descriptors are a spatial definition of the object.

2. Pointing systems apparatus comprising:
a) a direction reference;
b) attitude determining means;
c) computer; and
d) display,
said direction reference being movable via influence from a user,
said attitude determining means so coupled to said movable direction reference whereby a measure of pointing direction may be made,
said computer being in communication with said attitude determining means whereby attitude information relating to said direction reference may be conveyed to said computer, said computer further comprising a selection control, said selection control being represented as a graphic, said graphic being a group of icons, said group of icons being a toolbar type arrangement of icons arranged in a linear fashion, whereby each of said plurality of selection items is represented in the group by a single icon, the graphic being displayed at said display comprising:
a plurality of selection items; and
ii) a selection cursor,
said selection cursor is associated with either of said plurality of selection items to form at least one selected item, and
said selection cursor being operable for switching from a first item to a second item in response to a change in pointing direction as determined by said attitude determining means, said switching occurs from a first icon to a second icon in response to rotational displacements about a vertical axis, said displacements are about between 3 degrees and 20 degrees and said display being conventionally coupled to said computer.

3. Pointing systems apparatus comprising:
a) a direction reference;

b) attitude determining means;
c) computer; and
d) display,
   said direction reference being movable via influence from a user,
   said attitude determining means so coupled to said movable direction reference whereby a measure of pointing direction may be made,
   said computer being in communication with said attitude determining means whereby attitude information relating to said direction reference may be conveyed to said computer,
   said computer further comprising a selection control being represented as a graphic played at said display, said graphic being a list of items whereby each of said plurality of selection items appears in the list as a text label,
   said selection control comprising:
   i) a plurality of selection items; and
   ii) a selection cursor,
      said selection cursor is associated with either of said plurality of selection items to form at least one selected item, and
      said selection cursor being operable for switching from a first item to a second item in response to a change in pointing direction as determined by said attitude determining means, said switching occurs from a first text label to a second text label upon rotational displacements about a horizontal axis about between 3 degrees and 20 degrees, and
   said display being conventionally coupled to said computer.

4. Pointing systems apparatus comprising:
a) a direction reference;
b) attitude determining means;
c) computer; and
d) display,
   said direction reference being movable via influence from a user,
   said attitude determining means so coupled to said movable direction reference whereby a measure of pointing direction may be made,
   said computer being in communication with said attitude determining means whereby attitude information relating to said direction reference may be conveyed to said computer, said computer further comprising a selection control, said selection control comprising:
   i) a plurality of selection items; and
   ii) a selection cursor,
      said selection cursor is associated with either of said plurality of selection items to form at least one selected item, and
      said selection cursor being operable for switching from a first item to a second item in response to a change in pointing direction as determined by said attitude determining means, where the effect on the control is applied proportionally with respect to the magnitude of the displacement, and
   said display being conventionally coupled to said computer.

5. Pointing systems of claim 4, where the effect is a rate of change of letters changing serially from one to the next in the order of an alphabet.

6. Pointing systems of claim 4, where the effect is applied to a volume control.

7. Pointing systems of claim 4, where the effect is a brightness control.

8. Methods for triggering computer action relating to an object being addressed comprising the steps:
   determining an address state of a mobile unit;
   forming a request including parameters of the address state;
   transmitting said request to a server computer; and
   processing said request at said server computer to trigger an action in accordance with a program running on said server computer, said computer action is an action taken in a mobile unit and includes a step comprising providing an alert perceptible to a user, said action includes steps relating to a gaming scheme.

9. Methods for triggering computer action relating to an object being addressed comprising the steps:
   determining an address state of a mobile unit;
   forming a request including parameters of the address state;
   transmitting said request to a server computer; and
   processing said request at said server computer to trigger an action in accordance with a program running on said server computer,
   said transmitting said request to a server computer includes systems where the request is transmitted via electromagnetic communication over a wireless network in communication with the Internet,
   said computer action is an action taken in a wireless network,
   said action includes a step comprised of generating a report at said object being addressed the report is a reservation for space at a dining facility.

10. Methods for triggering computer action relating to an object being addressed comprising the steps:
    determining an address state of a mobile unit;
    forming a request including parameters of the address state;
    transmitting said request to a server computer; and
    processing said request at said server computer to trigger an action in accordance with a program running on said server computer,
    said determining an address state includes a step of forming an address indicator which specifies the address state, said address indicator is comprised of parameters from the group including: position, attitude, time, temperature, humidity, atmospheric pressure, velocity, acceleration, audio level and wind velocity.

11. Methods for triggering computer action relating to an object being addressed comprising the steps:
    determining an address state of a mobile unit;
    forming a request including parameters of the address state;
    transmitting said request to a server computer; and
    processing said request at said server computer to trigger an action in accordance with a program running on said server computer,
    said determining an address state includes a step of forming an address indicator which specifies the address state, said forming an address indicator is comprised the step measuring attitude with a dipole compass.

12. Methods for triggering computer action relating to an object being addressed comprising the steps:
    manipulating point and direction references of a mobile unit to cause a spatial alignment with an object of interest;

causing a trigger event while simultaneously holding said spatial alignment;

in response to said trigger event, measuring the address state of said mobile unit;

generating a request in accordance with a program running on a mobile nit computer processor including at least a specification of the address state including position and attitude measurement;

transmitting said request from said mobile unit to a server computer running application programming;

executing a database search including a step performing an intersection test in view of said request against at least one database record including at least one geometric descriptor to produce a result set;

taking an action in agreement with said application programming whereby said action relates to said result set;

returning data produced in said database search and conveying said data to said mobile unit, said manipulating a point and direction reference step is further defined as pointing a mobile telephone handset toward an object of interest whereby said direction reference substantially intersects the space occupied by the object to form a spatial alignment and association between the mobile telephone and the object.

13. Methods of claim 12, said causing a trigger event is further defined as depressing a tactile switch of a mobile telephone handset while said direction reference substantially intersects the space occupied by the object being addressed.

* * * * *